United States Patent [19]

Niimura et al.

[11] Patent Number: 5,537,215
[45] Date of Patent: Jul. 16, 1996

[54] APPARATUS FOR PROCESSING BAND-COMPRESSED SIGNALS HAVING INTER-FRAME AND INTRA-FRAME SIGNALS

[75] Inventors: Kazuharu Niimura, Fukaya, Japan; Mikhail Tsinberg, Riverdale, N.Y.

[73] Assignee: Kabushiki Kaisha Toshiba, Kawasaki, Japan

[21] Appl. No.: 406,795

[22] Filed: Mar. 20, 1995

Related U.S. Application Data

[63] Continuation of Ser. No. 916,461, Jul. 20, 1992, abandoned.

[51] Int. Cl.$^6$ ............................... H04N 5/76; H04N 5/78; H04N 9/79
[52] U.S. Cl. .................... 358/335; 358/312; 360/10.1
[58] Field of Search .................................. 358/342, 335, 358/310, 312; 360/10.1, 10.3, 33.1, 8, 32; 348/384; H04N 7/12, 5/76, 5/78, 5/782, 5/783, 5/85, 5/92, 9/79

[56] References Cited

U.S. PATENT DOCUMENTS

| | | | |
|---|---|---|---|
| 4,931,879 | 6/1990 | Koga et al. | 358/335 |
| 5,140,437 | 8/1992 | Yonemitsu et al. | 358/342 |
| 5,191,436 | 3/1993 | Yonemitsu | 358/335 |
| 5,270,828 | 12/1993 | Mogi | 358/335 |

OTHER PUBLICATIONS

Technical Critique of General Instrument's DigiCipher HDTV System Submitted Aug. 22, 1991 to Birney D. Dayton, Chairman, SS/WP-1 Submitted by WP-1 Analysis Task Force. pp. 1–13.

Technical Critique of American Television Alliance's Channel Compatible DigiCipher HDTV System Submitted May 14, 1992, submitted to Birney D. Dayton, Chairman SS/WP-1, Submitted by WP-1 Analysis Task Force, pp. 1–11.

Advanced Digital Television Prototype Hardware Description Feb. 12, 1992, Developed by Advanced Television Research Consortium at: David Sarnoff Research Center and Philips Laboratories pp. 1–60.

Heller et al., "The DigiCipher™ HDTV Broadcast System," IEEE Transactions on Broadcasting, vol. 36, No. 4, Dec. 1990.

*Primary Examiner*—Thai Q. Tran
*Attorney, Agent, or Firm*—Finnegan, Henderson, Farabow, Garrett & Dunner

[57] ABSTRACT

A band compression signal processor including a band compression circuit for intra-frame-coding and inter-frame-coding an input video signal which forms a picture areas, inter-frame-coding the input video signal which is intra-frame-coded, and repeating the above signal processing adaptively according to a motion evaluation on the input video signal, and a refresh coding circuit for periodically intra-frame-coding signals corresponding to b areas of the a areas for each frame at a period of f frames. A macro-block is formed by adding overhead data indicating the contents of variable length codes of a refresh block and a non-refresh block to the refresh block which has undergone the refresh coding and the non-refresh block which has not undergone the refresh coding.

4 Claims, 70 Drawing Sheets

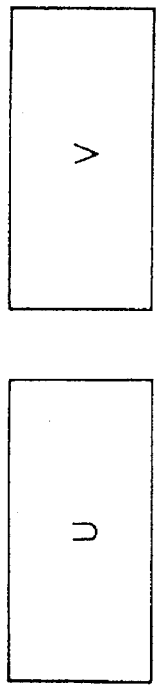
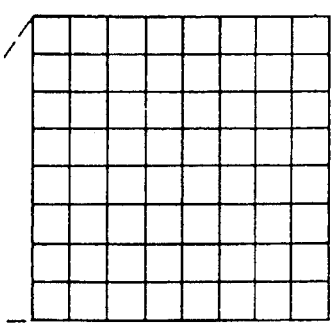
FIG. 2(a)
FIG. 2(b)
FIG. 2(c)
FIG. 2(d)

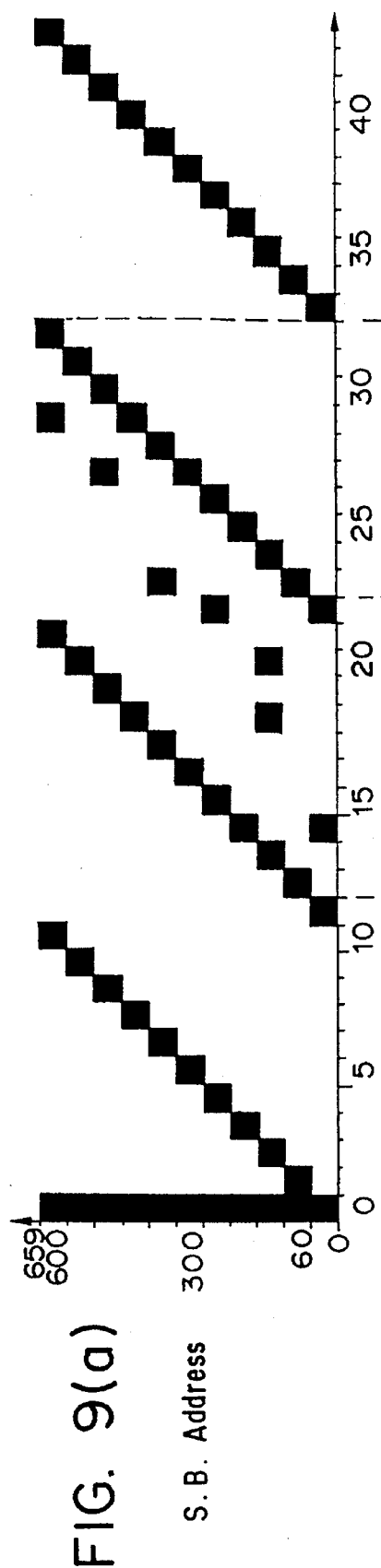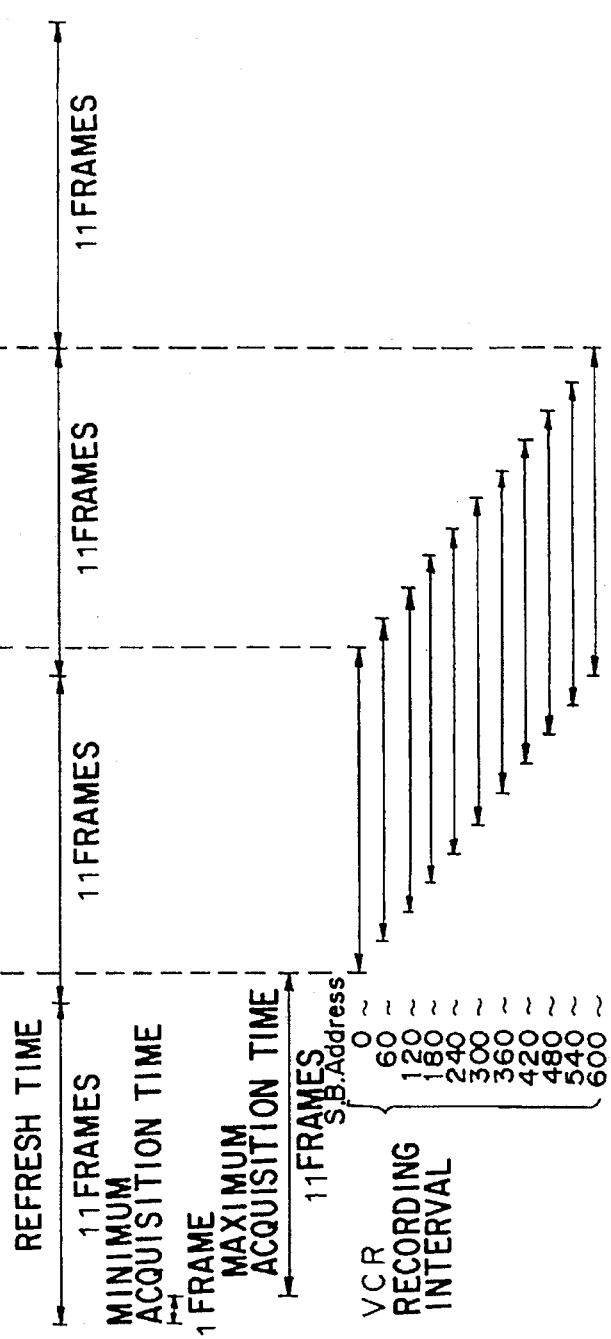
FIG. 9(a)
FIG. 9(b)
FIG. 9(c)
FIG. 9(d)
FIG. 9(e)

|  | SPATIAL FREQUENCY IN HORIZONTAL DIRECTION | | | | | | |
|---|---|---|---|---|---|---|---|
| 0 | 2 | 3 | 9 | 10 | 20 | 21 | 35 |
| 1 | 4 | 8 | 11 | 19 | 22 | 34 | 36 |
| 5 | 7 | 12 | 18 | 23 | 33 | 37 | 48 |
| 6 | 13 | 17 | 24 | 32 | 38 | 47 | 49 |
| 14 | 16 | 25 | 31 | 39 | 46 | 50 | 57 |
| 15 | 26 | 30 | 40 | 45 | 51 | 56 | 58 |
| 27 | 29 | 41 | 44 | 52 | 55 | 59 | 62 |
| 28 | 42 | 43 | 53 | 54 | 60 | 61 | 63 |

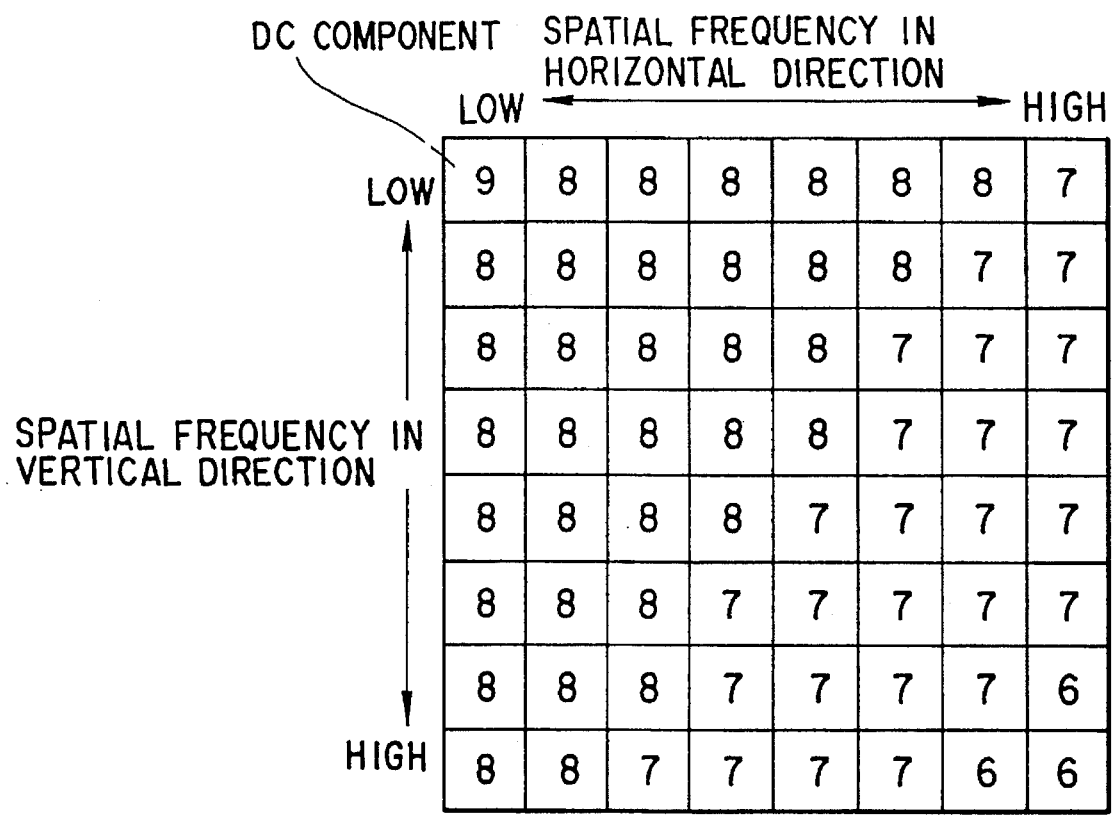
F I G. 13

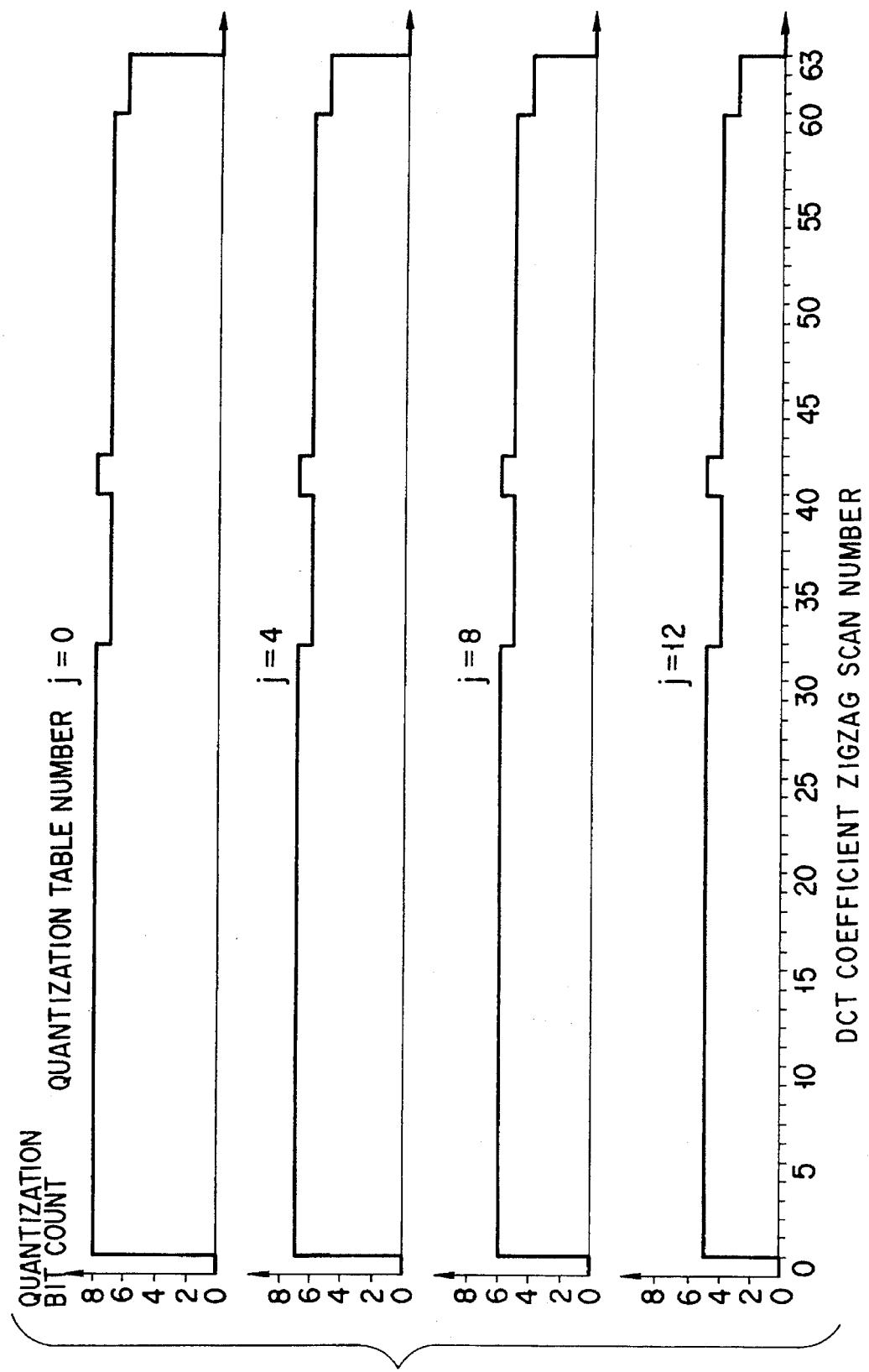
F I G. 14

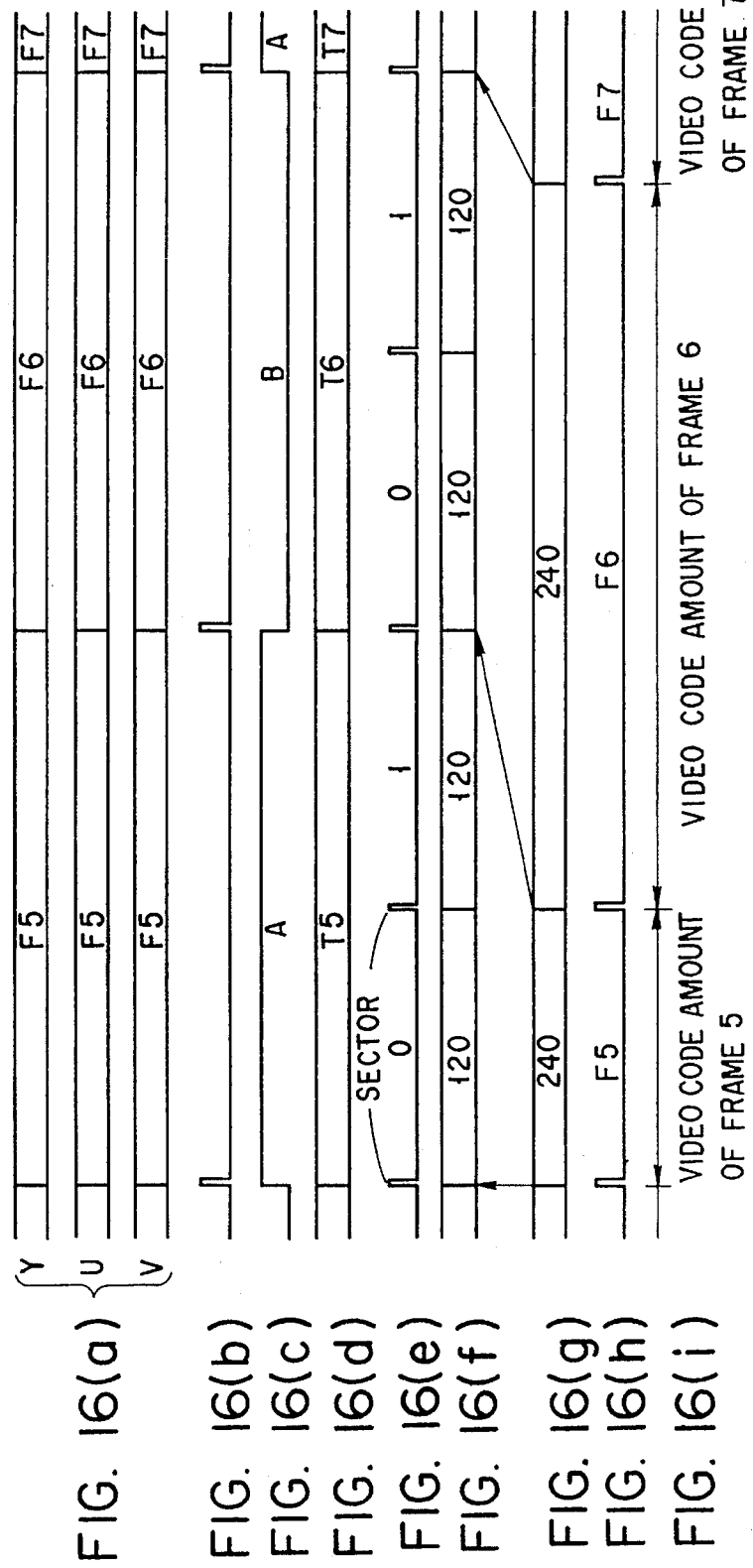

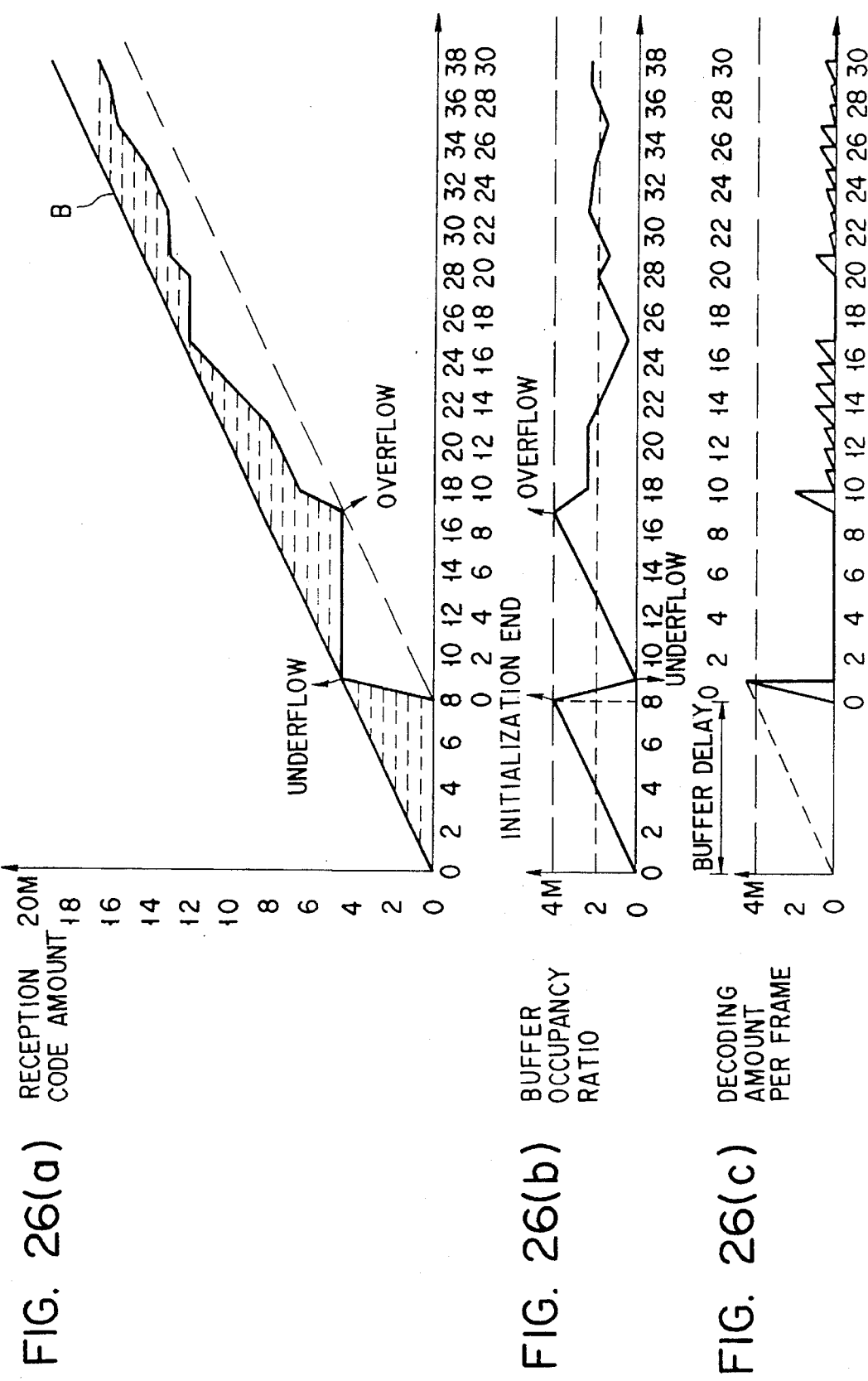

| CONTINUOUS ZERO COEFFICIENT COUNT | AMPLITUDE | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 0 | 2 | 3 | 5 | 5 | 6 | 7 | 7 | 8 | 8 | 9 | 9 | 9 | 10 | 10 | 10 | 10 |
| 1 | 3 | 5 | 6 | 8 | 8 | 9 | 10 | 11 | 11 | 12 | 12 | 13 | 13 | 14 | 14 | 14 |
| 2 | 4 | 7 | 8 | 9 | 11 | 11 | 12 | 13 | 14 | 14 | 15 | 15 | 16 | 16 | 17 | 17 |
| 3 | 5 | 8 | 10 | 11 | 12 | 13 | 14 | 15 | 16 | 16 | 17 | 18 | 20 | 19 | 18 | 19 |
| 4 | 6 | 9 | 11 | 13 | 14 | 15 | 16 | 17 | 18 | 19 | 20 | 21 | 21 | 21 | 22 | 20 |
| 5 | 6 | 10 | 12 | 13 | 15 | 16 | 18 | 18 | 20 | 20 | 22 | 22 | 22 | 22 | 21 | 22 |
| 6 | 7 | 10 | 13 | 14 | 16 | 18 | 19 | 20 | 22 | 21 | 22 | 22 | 22 | 22 | 22 | 21 |
| 7 | 7 | 11 | 13 | 15 | 16 | 17 | 20 | 20 | 21 | 22 | 22 | 21 | 21 | 18 | 20 | 22 |
| 8 | 8 | 12 | 14 | 16 | 18 | 20 | 20 | 21 | 22 | 22 | 22 | 22 | 22 | 22 | 22 | 22 |
| 9 | 8 | 13 | 16 | 18 | 20 | 20 | 22 | 22 | 22 | 22 | 22 | 22 | 22 | 22 | 22 | 22 |
| 10 | 9 | 13 | 17 | 19 | 20 | 19 | 18 | 20 | 22 | 22 | 22 | 22 | 22 | 22 | 22 | 22 |
| 11 | 9 | 13 | 16 | 16 | 20 | 21 | 22 | 21 | 22 | 22 | 22 | 22 | 22 | 22 | 22 | 22 |
| 12 | 9 | 15 | 18 | 21 | 22 | 22 | 22 | 22 | 22 | 22 | 22 | 22 | 22 | 22 | 22 | 22 |
| 13 | 10 | 16 | 20 | 22 | 22 | 22 | 22 | 22 | 22 | 22 | 22 | 22 | 22 | 22 | 22 | 22 |
| 14 | 10 | 17 | 20 | 22 | 22 | 22 | 22 | 22 | 22 | 22 | 22 | 22 | 22 | 22 | 22 | 22 |
| 15 | 11 | 18 | 21 | 22 | 22 | 22 | 22 | 22 | 22 | 22 | 22 | 22 | 22 | 22 | 22 | 22 |

F I G. 29

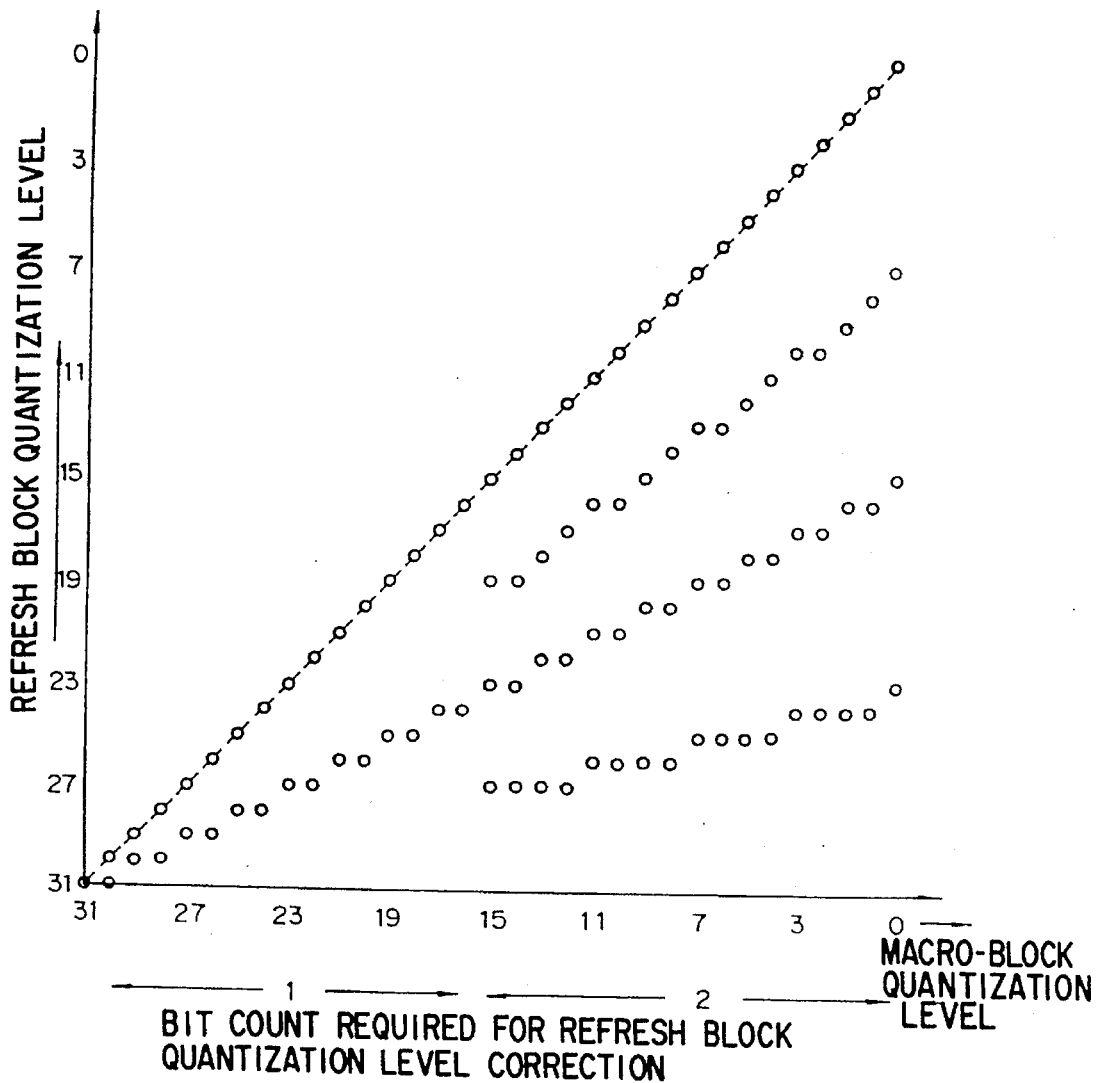
F I G. 32

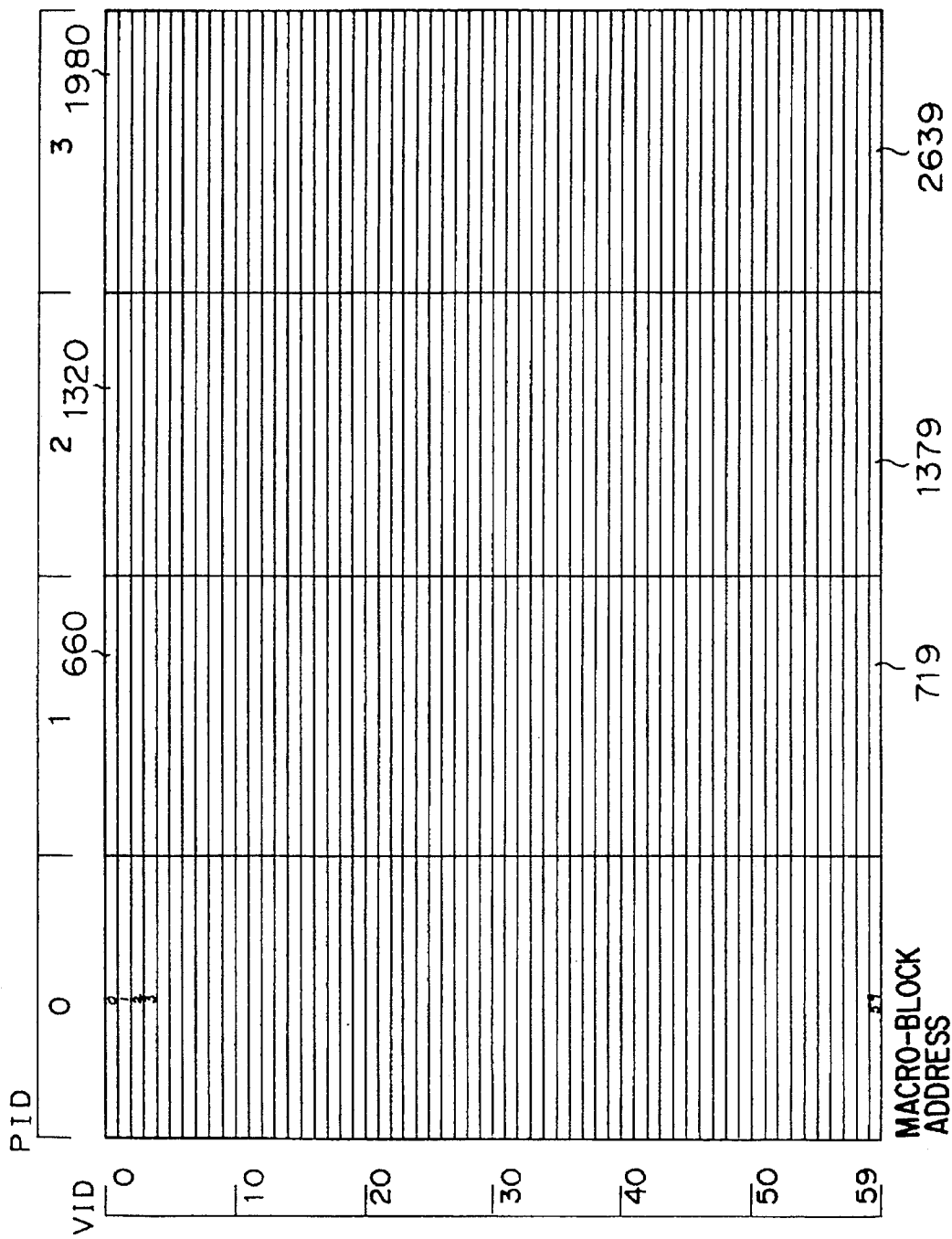

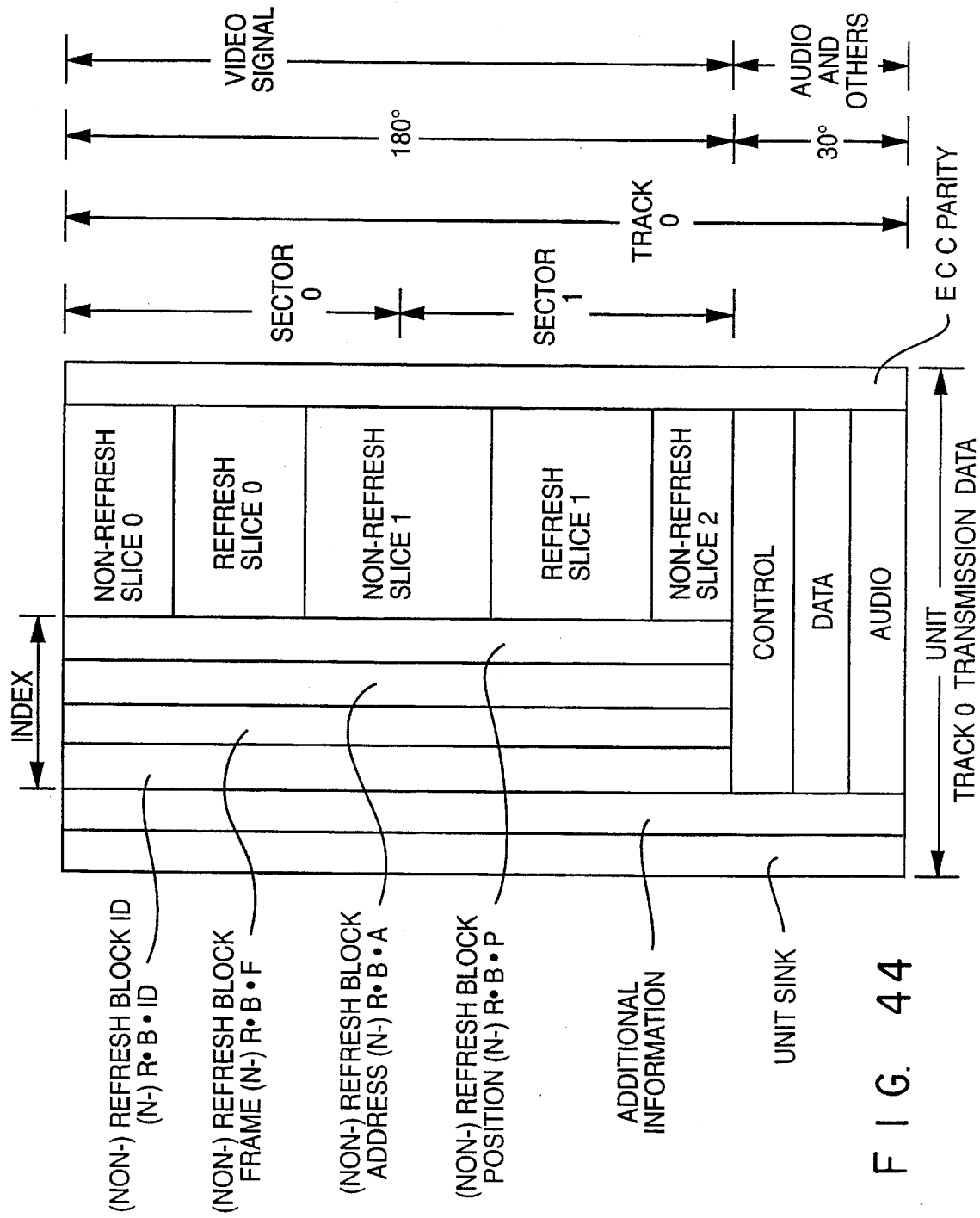
F I G. 44

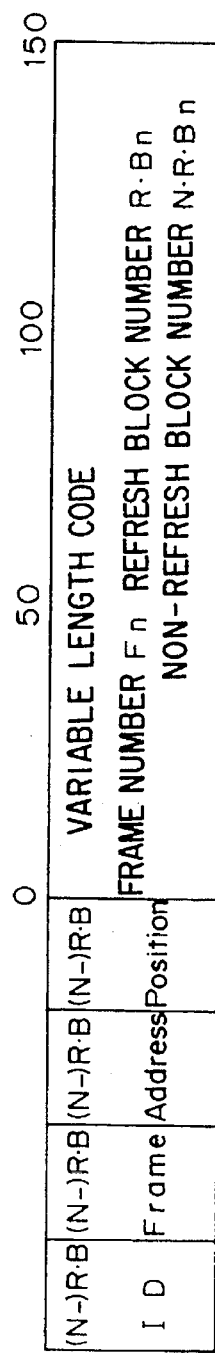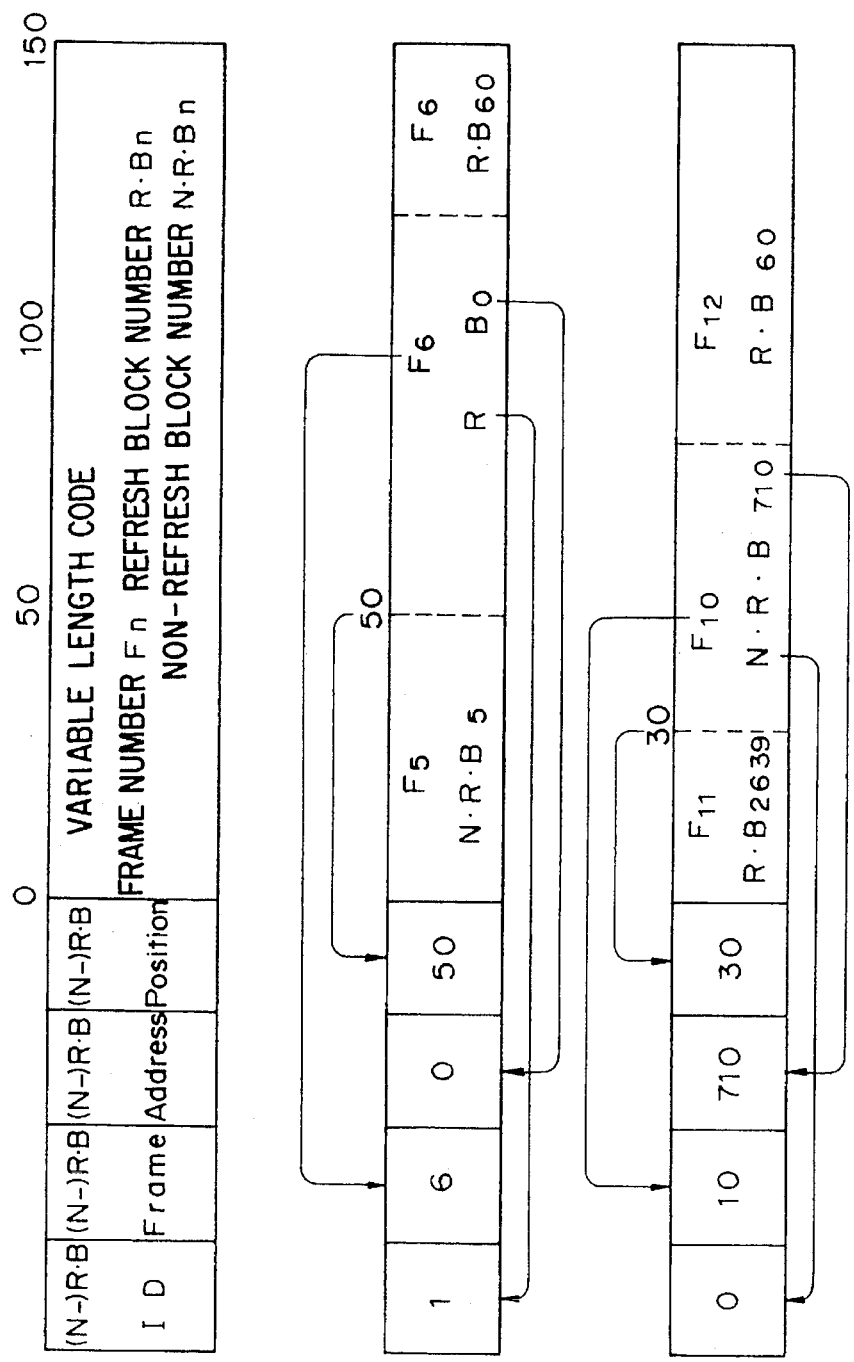
FIG. 45(a)
FIG. 45(b)
FIG. 45(c)

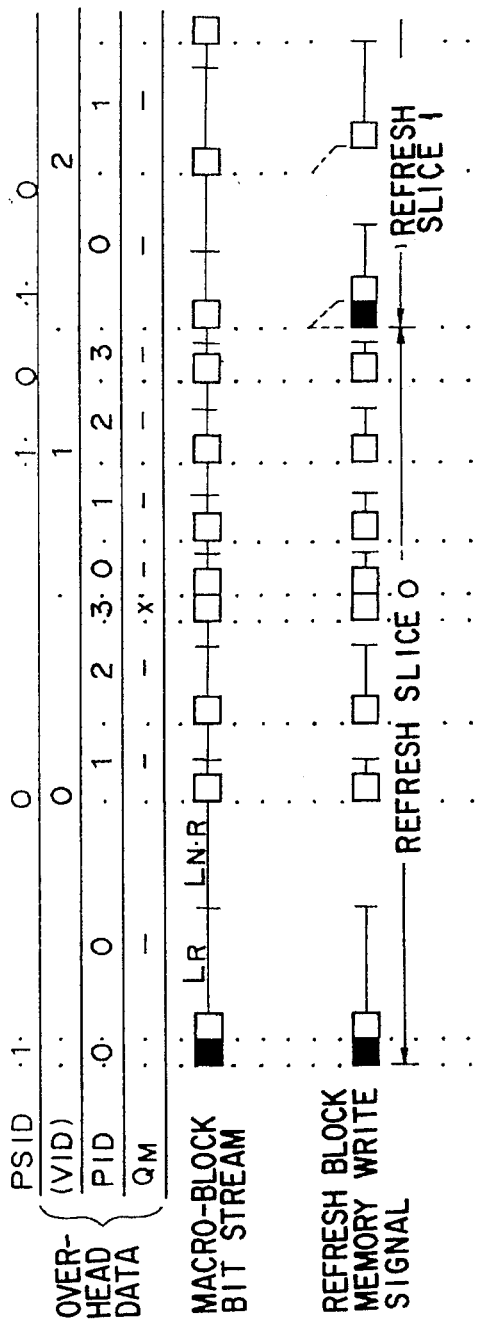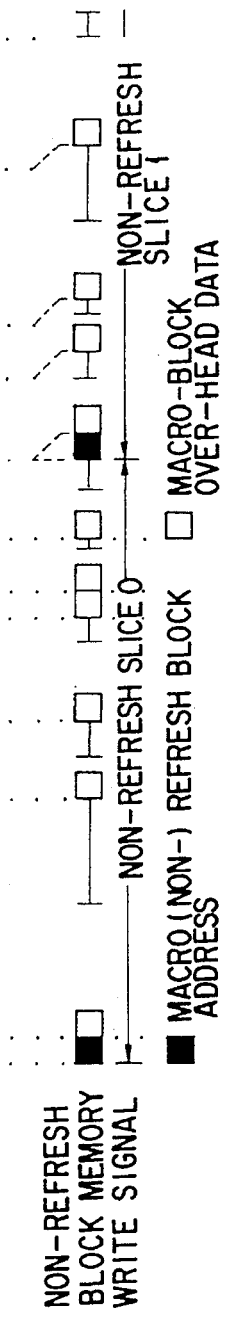

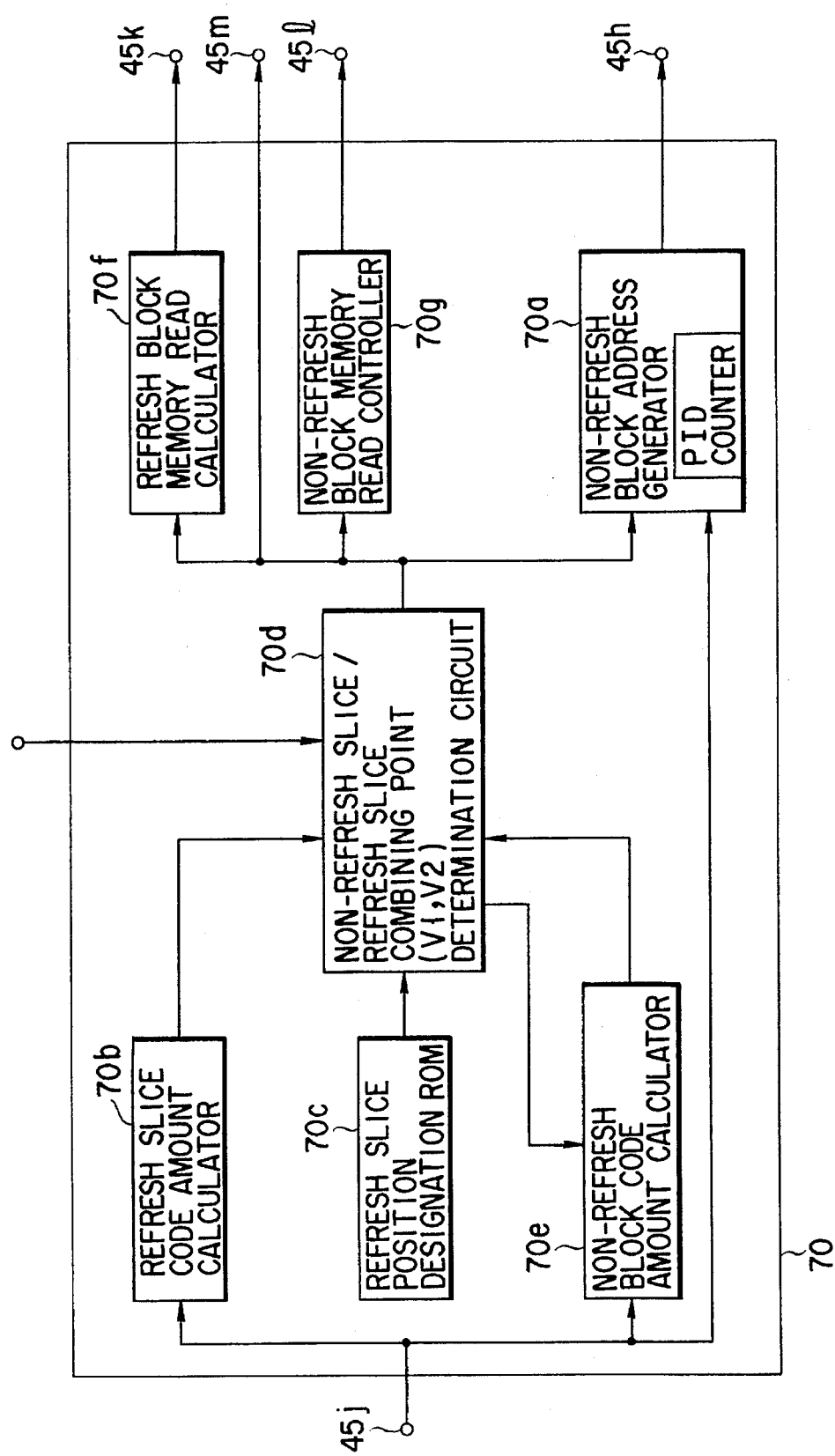
F I G. 48

FIG. 51

| INDEX / OVER-HEAD DATA \ CIRCUIT | CODE LENGTH DETECTION | INDEX DETECTION | OVER-HEAD DATA DETECTION — CODE RE-SWITCHING CIRCUIT WRITE | OVER-HEAD DATA DETECTION — CODE RE-SWITCHING CIRCUIT READ | VARIABLE LENGTH DECODING | INVERSE DCT — INVERSE QUANTIZATION | INVERSE DCT — INTRA/FRAME INTER/FRAME PROCESSING SWITCHING | MOTION COMPENSATION | SKIP PROCESSING — FRAME DELAY CIRCUIT WRITE | SKIP PROCESSING — FRAME DELAY CIRCUIT READ | DE-BLOCKING CIRCUIT |
|---|---|---|---|---|---|---|---|---|---|---|---|
| UNIT SINK | O | | | | | | | | | | |
| (N-) R·B ID | | O | O | | | | | | | | |
| (N-) R·B·FRAME | | | O | O | | | | | | | |
| (N-) R·B·ADDRESS | | | O | O | | | | | O | | |
| (N-) R·B·POSITION | | | O | O | | | | | O | | |
| FRAME ID | | | O | | | | | | O | | |
| PROCESSOR ID | | | | | | | | | O | | |
| (NON-) REFRESH BLOCK ID | | | O | | | | | | | | |
| (NON-) REFRESH BLOCK ADDRESS | | | | O | | | | | | | |
| MACRO QUANTIZATION LEVEL | | | | | | O | | | | | |
| CODE LENGTH | | | | O | O | | | | | | |
| CORRECTION QUANTIZATION LEVEL | | | | | | O | | | | | |
| FIELD/FRAME DISCRIMINATION | | | | | | | | | | O | O |
| PCM/DPCM DISCRIMINATION | | | | | | | O | | | | |
| MOTION VECTOR | | | | | | | | O | | | |

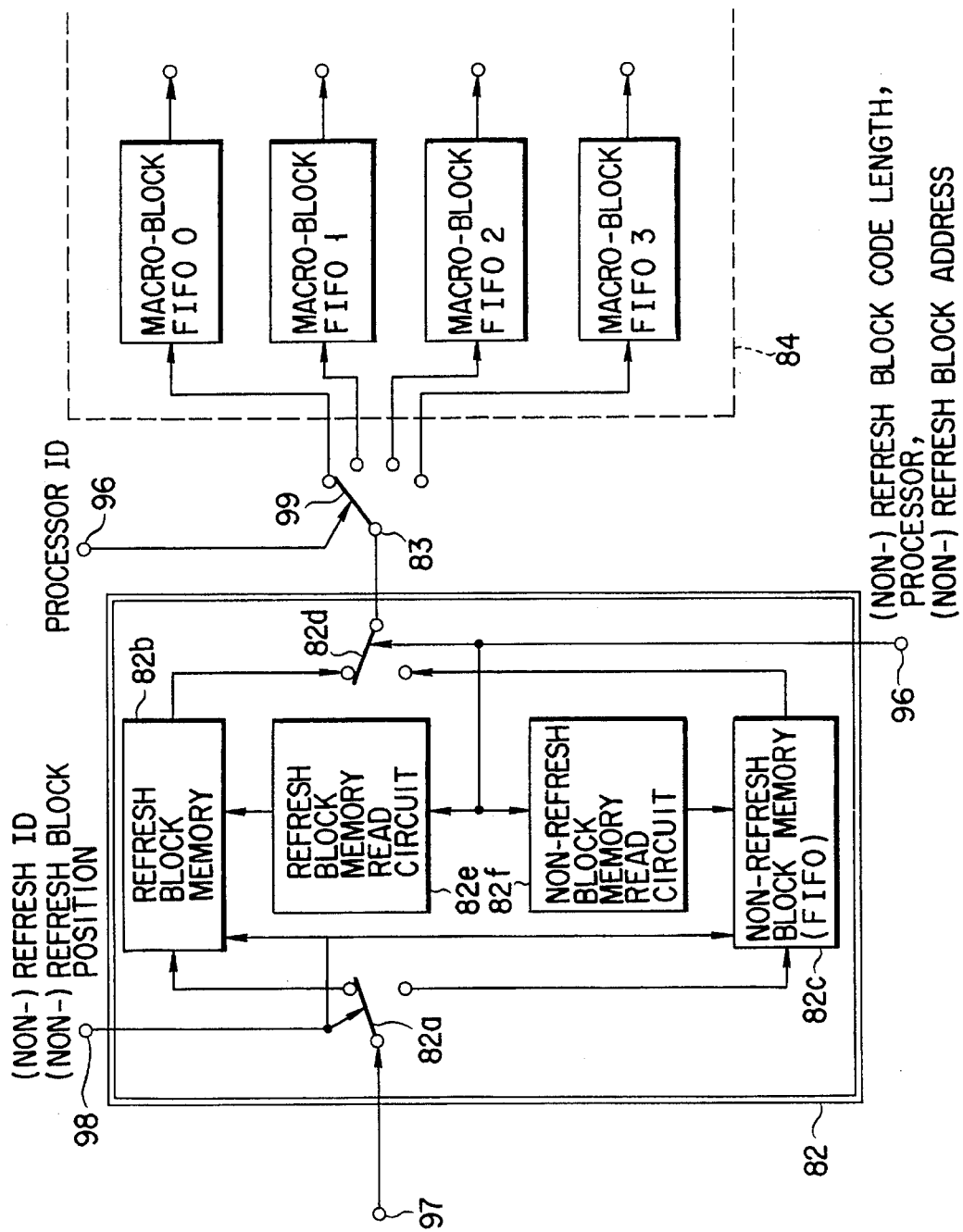
F I G. 52

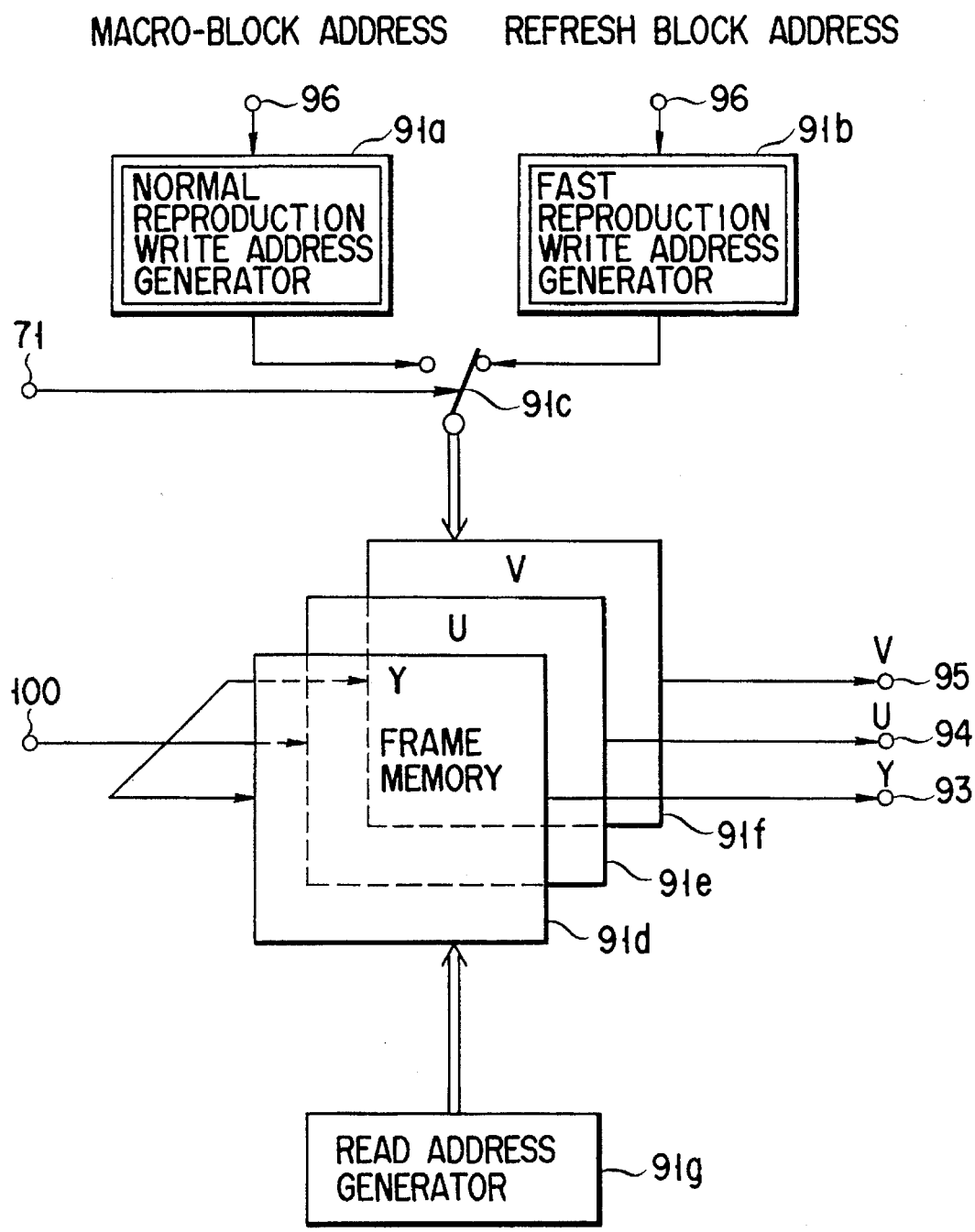
F I G. 54

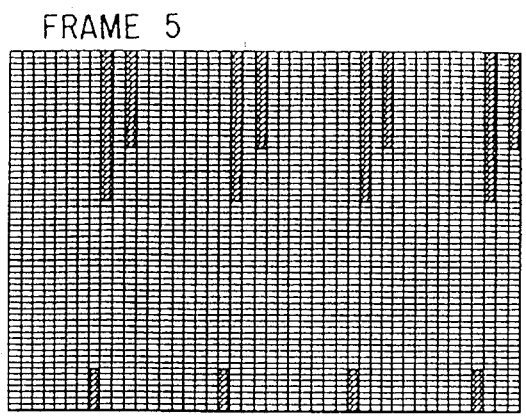
FIG. 65(e) FRAME 5
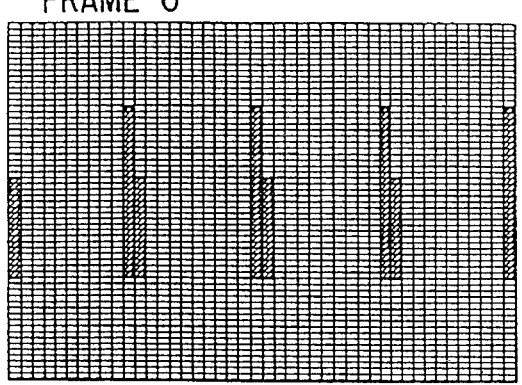
FIG. 65(f) FRAME 6
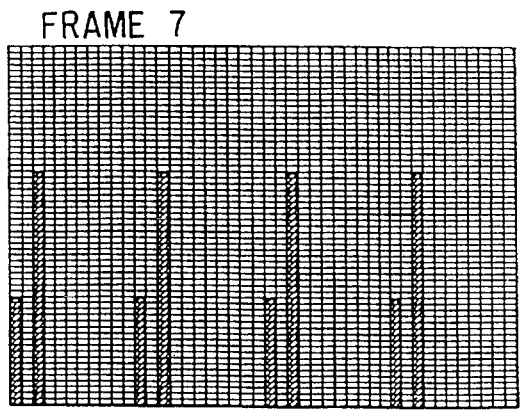
FIG. 65(g) FRAME 7
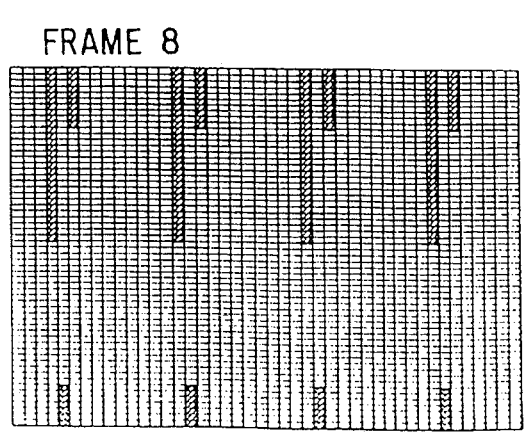
FIG. 65(h) FRAME 8

APPARATUS FOR PROCESSING BAND-COMPRESSED SIGNALS HAVING INTER-FRAME AND INTRA-FRAME SIGNALS

This application is a continuation of application Ser. No. 07/916,416, filed Jul. 20, 1992, now abandoned.

BACKGROUND OF THE INVENTION

The present invention relates to an apparatus for converting a video signal or the like into a digital signal and performing band compression based on a combination of intra-frame-coding processing and inter-frame-coding processing, which apparatus allows a recording/reproducing device to easily obtain a good reproduced image especially in the fast reproduction mode when an output signal from the apparatus is recorded on a tape by a helical scan scheme and is transmitted to the recording/reproducing device for reproducing the signal. In addition, the present invention relates to an apparatus which can record signals in a wide band, used for a high-definition TV or the like, for a long period of time.

Both a transmission method based on a combination of intra-frame and inter-frame coding and a transmission method using a variable length coding scheme have been used to transmit data. Of these methods, the method of performing transmission by performing band compression based on a combination of intra-frame-coding processing and inter-frame-coding processing is associated with a band compression technique, as disclosed in, e.g., "Digital compatible HD-TV Broadcast system", Woo Paik, IEEE Trans. on Broadcasting Vol. 36 No. 4 December 1990. Characteristics features of this technique will be described below. Referring to FIG. 59, a video signal input to an input terminal 11 is supplied to a subtracter 12 and a motion evaluation circuit 13. In the subtracter 12, subtraction processing (to be described later) is performed. An output from the subtracter 12 is input to a DCT (discrete cosine transformation) circuit 14. The DCT circuit 14 receives the data in units of blocks, each consisting of 8 pixels in the horizontal direction×8 pixels in the vertical direction (8×8 pixels=64 pixels), and outputs coefficients obtained by transforming a pixel array from a time axis region to a frequency region. Each coefficient is quantized by a quantizer 15. In this case, the quantizer 15 has 32 types of quantization tables. Each coefficient is quantized in accordance with a selected quantization table. Note that the quantization tables are arranged in the quantizer 15 to set the generation and transmission amounts of information within a predetermined range.

Coefficient data output from the quantizer 15 is zigzag-scanned from a low-frequency region to a high-frequency region in units of blocks and is input to a variable length encoder 16 to be converted into a variable length code constituted by a set of a zero coefficient count (run length) and a non-zero coefficient. Note that the encoder 16 is a variable length encoder designed to change the code length in accordance with the frequency of occurrence of Huffman codes and the like. The variable-length-coded data is input to a FIFO (fast-in/fast-out) circuit 17 to be read out at a predetermined rate, and is subsequently supplied to a multiplexer (not shown) on the next stage (designed to multiplex a control signal, audio data, sync data (SYNC), NMP (to be described later), and the like) through an output terminal 18. The data is then sent to a transmission path. The FIFO circuit 17 serves as a buffer for absorbing the difference between the generation and transmission amounts of codes. This difference is based on the fact that the output rate of the variable length encoder 16 is a variable rate and the transmission rate of the transmission path is a fixed rate.

An output from the quantizer 15 is input to an inverse quantizer 19 to be inversely quantized. An output from the inverse quantizer 19 is input to an inverse DCT circuit 20 to be restored to the original signal. This signal is input to a frame delay circuit 22 through an adder 21. An output from the frame delay circuit 22 is supplied to a motion compensation circuit 23 and the motion evaluation circuit 13. The motion evaluation circuit 13 compares the input signal from the input terminal 11 with the output signal from the motion compensation circuit 23 to detect the overall motion of a corresponding image, thus controlling the phase position of the signal output from the motion compensation circuit 23. If the image is a still image, compensation is performed to cause the current image and an image one frame ahead thereof to coincide with each other. An output from the motion compensation circuit 23 is supplied to the subtracter 12 through a switch 24 and is also fed back from the adder 21 to the frame delay circuit 22 through a switch 25.

The basic operation of the system will be described below. The basis operation of this system includes intra-frame-coding processing and inter-frame-coding processing. Intra-frame-coding processing is performed as follows. During this processing, both the switches 24 and 25 are kept off. A video signal input to the input terminal 11 is transformed from a time axis region to a frequency region by the DCT circuit 14 and is quantized by the quantizer 15. The quantized signal is variable-length-coded and is output to the transmission path through the FIFO circuit 17. The quantized signal is restored to the original signal by the inverse quantizer 19 and the inverse DCT circuit 20 and is delayed by the frame delay circuit 22. That is, intra-frame coding is equivalent to a process of directly converting the information of an input video signal into a variable length code. This intra-frame processing is performed at a proper period, e.g., for every scene change of an input video signal or in units of predetermined blocks. Periodic intra-frame processing will be described later.

Inter-frame-coding processing will be described next. When this processing is to be started, both the switches 24 and 25 are turned on. As a result, a signal corresponding to the difference between an input video signal and a video signal one frame ahead thereof is obtained by the subtracter 12. This difference signal is input to the DCT circuit 14 to be transformed from a time axis region to a frequency region. The signal is then quantized by the quantizer 15. In addition, since the difference signal and the video signal are added together by the adder 21 and the resultant signal is input to the frame delay circuit 22, a predictive video signal predicting the input video signal on which the difference signal is based is generated and input.

FIGS. 60(a) and 60(b) show line signals sent to the transmission path. The signals are obtained by performing intra-frame coding and inter-frame coding of a video signal as a high-definition television signal in the above-described manner. This line signal is a signal on the transmission path and is obtained by multiplexing a control signal, an audio signal, a sync signal (SYNC), a system control signal, an NMP, and the like. FIG. 60(a) shows the first line signal. FIG. 60(b) shows each of the second and subsequent line signals. If this video signal is obtained by intra-frame coding, a proper video signal can be obtained by performing inverse conversion of the video signal. If the video signal has undergone inter-frame coding, inverse conversion of the signal will only reproduce a difference signal. Therefore, if a video signal (or a predictive video signal) reproduced one frame before the current frame is added to this difference signal, a proper video signal can be reproduced.

According to the above-described system, the entire information of an intra-frame-coded signal is variable-length-coded, and signals subjected to inter-frame coding in the subsequent frames transmit difference information, thus realizing band compression.

The definitions of sets of pixels to be processed by the band compression system will be described below:

Block: A block is a 64-pixel area constituted by 8 pixels in the horizontal direction×8 pixels in the vertical direction.

Super block: A super block is an area of a luminance signal constituted by 4 blocks in the horizontal direction and 2 blocks in the vertical direction. This area includes one block of a color difference signal U and one block of a color difference signal V. The image motion vectors obtained by the motion evaluation circuit 13 are set in units of super blocks.

Macro-block: A macro-block is constituted by 11 super blocks in the horizontal direction. When codes are to be transmitted, DCT coefficients in a block are transformed into codes determined by continuous zero coefficient counts and the amplitudes of non-zero coefficients and are transmitted in sets. An end-of-block signal is added to the end portion of each block. Motion vectors obtained by motion compensation in units of super blocks are added and transmitted in units of macro-blocks.

Features especially associated with the transmission signals shown in FIGS. 60(*a*) and 60(*b*) will be described in more detail. The sync signal (SYNC) of the first line indicates a frame sync signal in a decoder. All the timing signals for the decoder are generated by using one sync signal per frame. The NMP signal of the first line indicates a video data count from the end of the first line signal to a macro-block of the next frame. Since codes are generated by adaptively switching intra-frame-coding processing and inter-frame-coding processing, the code amounts of frames differ from each other, and the positions of codes vary. For this reason, the NMP signal indicates the positions of codes corresponding to one frame.

In addition, periodical intra-frame processing is performed to cope with a case wherein a user changes a channel. In this band compression system, as described above, 11 super blocks in the horizontal direction are called a macro-block, and 44 super blocks are present in one frame in the horizontal direction. That is, 4 macro-blocks in the horizontal direction ×60 macro-blocks in the vertical direction, i.e., a total of 240 macro-blocks, are present in one frame. In this band compression system, as shown in FIGS. 61(*a*) to 61(*h*) and 62(*a*) to 62(*c*), refreshing is performed for every vertical array of super blocks in units of 4 macro-blocks, and all the super blocks are refreshed at a period of 11 frames. That is, when the refreshed super blocks of 11 frames are accumulated, the intra-frame processing in all the areas is completed, as shown in FIG. 62(*d*). For this reason, in the normal reproduction mode of, e.g., a VTR (video tape recorder), the above-described intra-frame-coding processing is performed at a period of 11 frames, reproduced images can be watched without problems.

Note that head data is inserted in a start portion of each macro-block described above. This head data includes a collection of the motion vectors of the respective super blocks, field/frame determination data, PCM/DPCM determination data, quantization levels, and the like.

The above-described band compression system is used as an encoder for band compression of a television signal. At the receiving end, a corresponding decoder is used. Consider a case wherein the above-described transmission signal is recorded by a VTR. A general VTR employs a recording scheme in which a one-field video signal is converted into a fixed length code to generate a predetermined amount of information, and the information is recorded on X (X is a positive integer) tracks.

In contrast to this, if a transmission signal obtained by the band compression system is directly recorded/reproduced by the VTR, since a variable length code is used as a code processed by intra-frame coding and inter-frame coding, the position at which a code periodically intra-frame-coded is recorded is not fixed. Therefore, in the fast reproduction mode, blocks which are not refreshed are generated.

FIG. 63 shows track patterns obtained when the signal variable-length-coded in the above described manner is helically recorded on a magnetic tape 26. In track patterns $T_1$ to $T_{11}$, thick lines indicate positions where frames $F_1$ to $F_{11}$ are switched. The reason why the switching positions of the frames $F_1$ to $F_{11}$ are not aligned with each other is that recording data is prepared by variable length coding. In the normal reproduction mode of the VTR, since all the track patterns $T_1$ to $T_{11}$ of the magnetic tape 26 are sequentially scanned by a magnetic head, a proper video signal can be reproduced without problems by decoding the reproduction output using a decoder. That is, in the normal reproduction mode, all the codes processed by intra-frame coding and inter-frame coding and recorded on the magnetic tape 26 can be reproduced so that a proper image can be constructed by using all the codes.

In the VTR, however, only limited tracks are sometimes reproduced as in a double-speed reproduction mode as a special reproduction mode. In this mode, the magnetic head jumps over tracks to pick up recorded signals. In this case, if intra-frame-coded signals recorded on tracks are sequentially reproduced, no problems are posed. If, however, inter-frame-coded signals recorded on tracks are reproduced, only images reproduced by difference signals can be obtained.

FIGS. 64(*a*) and 64(*b*) show traces $X_1$ to $X_{11}$ of the magnetic head in the double-speed reproduction mode. Referring to FIGS. 64(*a*) and 64(*b*), since intra-frame-coded signals are separately recorded on frames $F_1$ to $F_{24}$, the position of an intra-frame-coded portion reproduced within a frame is indefinite. FIGS. 65(*a*) to 65(*h*) and 66(*a*) to 66(*c*) show intra-frame-coded signals which can be reproduced in the double-speed reproduction mode. When the signals of 11 frames are accumulated, as shown in FIG. 66(*d*), there are portions in which codes obtained by periodical intra-frame coding are not present, i.e., refreshed super blocks are not present, thus generating portions in which reproduced images cannot be constructed.

SUMMARY OF THE INVENTION

As described above, in a helical scan type recording/reproducing device having a conventional band compression system, it is difficult to perform fast reproduction such as double-speed reproduction.

The present invention has been made in consideration of the above situation, and has as its object to provide a band compression signal processor which can easily obtain a good reproduced image in a fast reproduction operation. It is another object of the present invention to provide a band compression signal processor which can record a wide-band signal for a high-definition TV for a long period of time.

According to the present invention, there is provided a band compression signal processor comprising:

band compression means for forming $\underline{a}$(where $\underline{a}$ is a positive integer)picture areas for a frame, for generating a refresh signal by intra-frame-coding a video signal at a period of $\underline{f}$ frames (where $\underline{f}$ is an integer $\geq 2$) using an inter-frame-coded signal and an intra-frame-coded signal, for outputting said refresh signal, said inter-frame-code signal, and said intra-frame-coded signal of $\underline{a}$ picture areas, from a band compression encoder at a predetermined transmission sequence during normal transmission, for inputting the output refresh signal, inter-frame-coded signal, and intra-frame-coded signal to a band compression decoder, and then for obtaining a decoded picture;

said video signal being formed of a set of successive pictures, said inter-frame-coded signal being formed by inter-frame-coding the video signal using a difference between a video signal of a present picture and that of a predicted picture, said intra-frame-coded signal being formed by intra-frame-coding the video signal using intra-frame information; and wherein said signal processor comprises a flag for indicating a special reproducing mode which includes a high-speed reproducing mode and a high-speed inverse reproducing mode, while recording and reproducing the decoded signal on a recording medium and transmitting the decoded signal.

In addition, according to the present invention, there is provided a band compression signal processor for recording/reproducing intra-frame-coded and inter-frame-coded signals, comprising:

band compression means for forming $\underline{a}$($\underline{a}$ is a positive integer) picture areas for a frame, for generating a refresh signal by intra-frame-coding a video signal of $\underline{b}$ picture areas ($\underline{b}$ is an integer $\underline{a}>\underline{b}>0$) out of said $\underline{a}$ picture areas for a frame at a period of $\underline{f}$ frames ($\underline{f}$ is an integer$\geq 2$) using an inter-frame-coded signal and an intra-frame-coded signal, for outputting said refresh signal, inter-frame-coded signal and intra-frame-coded signal of $\underline{a}$ picture areas, from a band compression encoder at a predetermined transmission sequence during normal transmission, inputting the output refresh signal, inter-frame-coded signal, and intra-frame-coded signal to a band compression decoder, and then for obtaining a decoded picture, said video signal being formed of a set of successive pictures, said inter-frame-coded signal being formed by inter-frame-coding the video signal using a difference between a video signal of a present picture and that of a predicted picture, said intra-frame-coded signal being formed by intra-frame-coding the video signal using intra-frame information, wherein said signal processor comprises a flag for indicating a special reproducing mode which includes high-speed reproducing mode and high-speed inverse reproducing mode, adds and records an address signal indicating a position of said refresh signal of $\underline{b}$ picture areas for a frame, on a frame, designates a special reproducing mode using the flag during high-speed reproducing process, determines the picture areas on the frame using said address signal, and displays the refresh signals of one of part of and all picture areas of the determined picture areas.

According to the above-described arrangement, since an intra-frame-coded signal can be accurately obtained, a good reproduced image can be obtained.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 2(a) to 2(d) are views respectively showing pixel arrangements in the embodiment;

FIGS. 9(a) to 9(e) are charts for explaining a forcible refreshing operation for each processor in the embodiment;

FIG. 10 is a table showing a scanning sequence for zigzag-scanning DCT coefficients;

FIG. 11 shows quantization tables;

FIG. 13 is a table showing a case wherein the values of the weighting table in FIG. 12 are converted into bit counts;

FIG. 14 is a chart showing the numbers of bits generated by weighting tables;

FIGS. 16(a) to 16(i) are timing charts for explaining an operation of the embodiment;

FIGS. 26(a) to 26(c) are graphs showing an operation of a rate buffer on the decoder side;

FIG. 29 is a chart showing the generation amounts of codes in variable length coding;

FIG. 32 is a graph showing quantization levels for macro-blocks and refresh blocks;

FIG. 34 is a chart for explaining macro-block addresses;

FIG. 44 is a chart showing the structure of transmission data of the VCR;

FIGS. 45(a) to 45(c) are charts showing a structure of transmission data of the VCR;

FIGS. 47(a) to 47(d) are charts showing the write control timing of a (non-) refresh block memory;

FIG. 48 is a block diagram showing the arrangement of a memory read (non-) refresh slice combining controller;

FIG. 51 is a table showing the relationship between index/overhead data and each circuit;

FIG. 52 is a block diagram showing a detailed arrangement of a code re-switching circuit;

FIG. 54 is a block diagram showing a detailed arrangement of a frame delay circuit;

FIGS. 61(a) to 61(h) are charts showing refresh blocks, of frames 1 to 8, which can be reproduced in a normal reproduction operation in the conventional system;

FIGS. 65(a) to 65(h) are charts showing refresh blocks, of frames 1 to 8, which can be reproduced in a double-speed reproduction operation in the conventional system.

DESCRIPTION OF THE PREFERRED EMBODIMENTS

An embodiment of the present invention will be described in detail below with reference to the accompanying drawings.

1. Basic Arrangement

Figure 1:
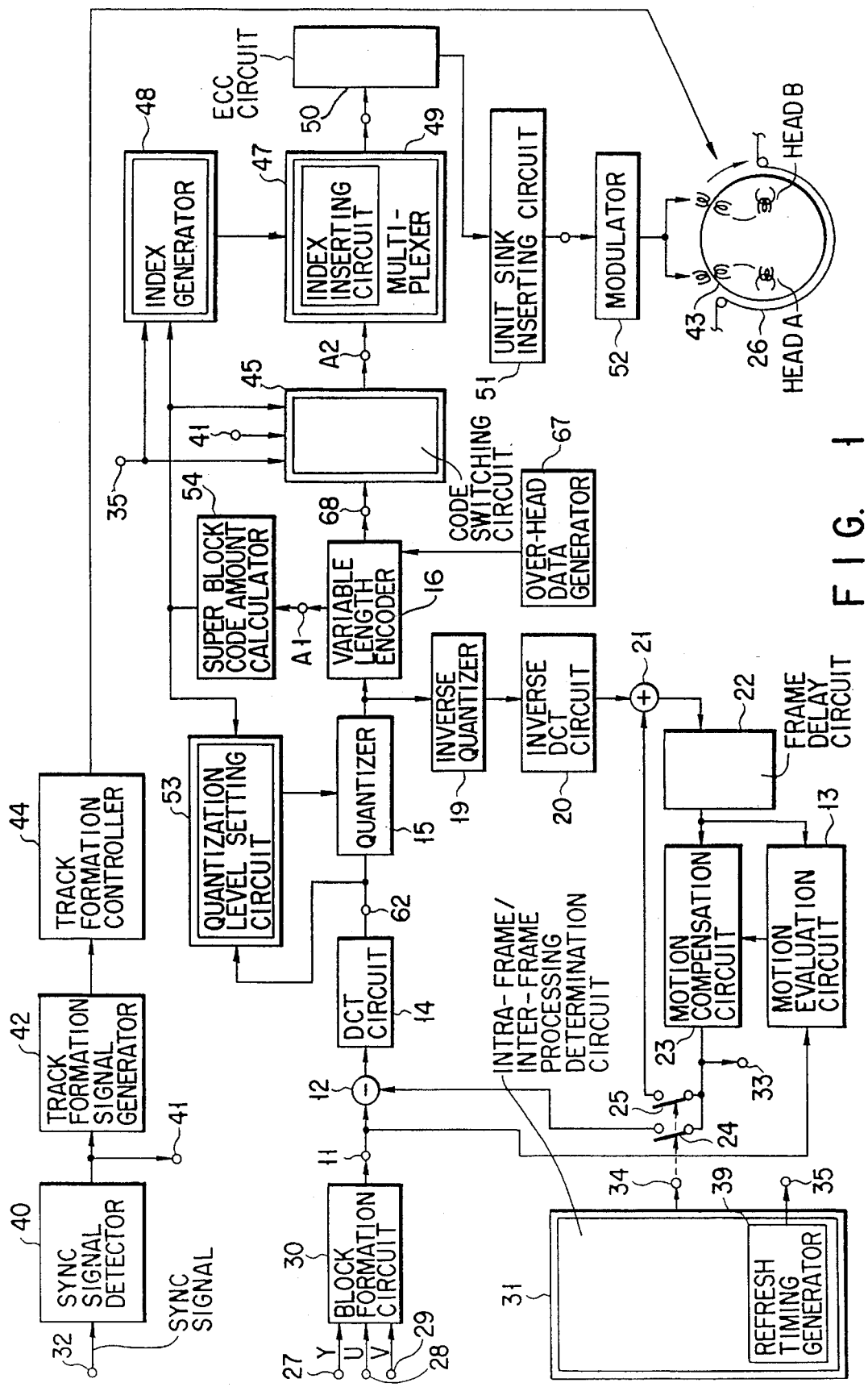
FIG. 1 is a block diagram showing the arrangement of a recording/reproducing apparatus according to an embodiment of the present invention.

FIG. 1 shows the basic arrangement of the present invention.

A luminance signal Y and color difference signals U and V for a high-definition TV are respectively input to video input terminals 27, 28, and 29.

After necessary pre-processing of these signals is performed, the resultant signals are formed into blocks having pixel arrangements (to be described later in Part 2) by a blocking circuit 30. The blocks are then input to an input terminal 11.

The video signal input to the input terminal 11 is supplied to a subtracter 12 and a motion evaluation circuit 13. The subtracter 12 performs subtraction processing (to be described later). The resultant output is input to a DCT (discrete cosine transformation) circuit 14. The DCT circuit 14 receives the data in units of blocks, each consisting of 8 pixels in the horizontal direction×8 pixels in the vertical direction (8×8 pixels=64 pixels), and outputs coefficients obtained by transforming a pixel array from a time axis region to a frequency region. Each coefficient is quantized by a quantizer 15. In this case, the quantizer 15 has 10 or 32 types of quantization tables. Each coefficient is quantized in accordance with a selected quantization table. Note that the quantization tables are arranged in the quantizer 15 to set the generation and transmission amounts of information within a predetermined range.

Coefficient data output from the quantizer 15 is zigzag-scanned from a low-frequency region to a high-frequency region in units of blocks and is input to a variable length encoder 16 to be converted into a variable length code constituted by a set of a zero coefficient count (run length) and a non-zero coefficient. Note that the encoder 16 is a variable length encoder designed to change the code length in accordance with the frequency of occurrence of Huffman codes or the like. The variable-length-coded data is input to a memory (not shown) stored in code switching circuit 45 be read out at a predetermined rate. The data is then supplied to a multiplexer on the next stage (for multiplexing a control signal, audio data, sync data (SYNC), NMP (to be described later), and the like) and is sent to a transmission path. The memory serves as a buffer for absorbing the difference between the generation and transmission amounts of codes, which difference is based on the fact that the output rate of the variable length encoder 16 is a variable rate, and the rate of the transmission path is a fixed rate.

In addition, an output from the quantizer 15 is input to an inverse quantizer 19 to be inversely quantized. An output from the inverse quantizer 19 is further input to an inverse DCT circuit 20 to be restored to the original signal. This signal is input to a frame delay circuit 22 through an adder 21. An output from the frame delay circuit 22 is supplied to a motion compensation circuit 23 and a motion evaluation circuit 13. The motion evaluation circuit 13 compares the input signal from the input terminal 11 with the output signal from the frame delay circuit 22 to detect the overall motion of a corresponding image, thus controlling the phase position of the signal output from the motion compensation circuit 23. If the image is a still image, compensation is performed to cause a current image and an image one frame ahead thereof to coincide with each other. An output from the motion compensation circuit 23 is supplied to the subtracter 12 through a switch 24 and is fed back from the adder 21 to the frame delay circuit 22 through a switch 25.

A basic operation of the above system will be described below.

2. Pixel Arrangement

A signal input to the input terminal 11 constitutes blocks, super blocks, and macro-blocks respectively consisting of a plurality of effective pixels within a frame. Although this block arrangement is based on DigiCipher, it is clear that the block arrangements used for MPEG, DSC-HDTV: Zenith +ATT, and the like may be employed.

The block arrangement will be defined with reference to FIGS. 2(a) to 2(d).

One frame: FIG. 2(a)

A frame is constituted by 1,050 scan lines, which are interlaced.

Effective pixels are constituted by 1,408 pixels in the horizontal direction and 960 pixels in the vertical direction.

A video signal for one frame is processed by four processors.

Figure 3:
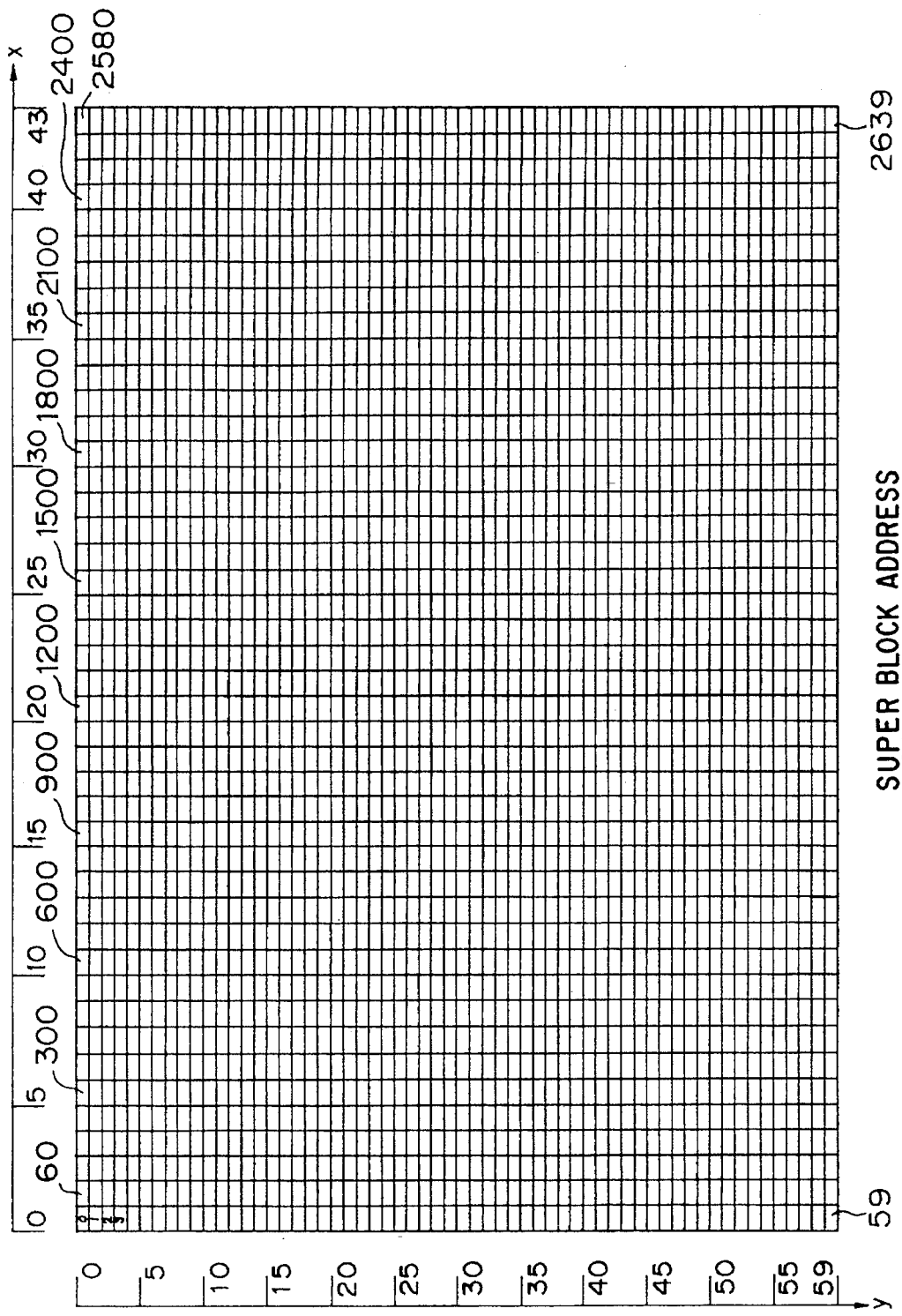
FIG. 3 is a chart for explaining super block addresses in the embodiment.
Figure 4A:
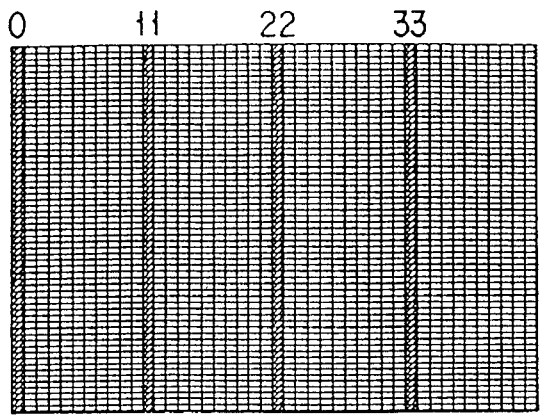
FIGS. 4(a) to 4(h) are views for explaining a refreshing operation in the embodiment.
Figure 4B:
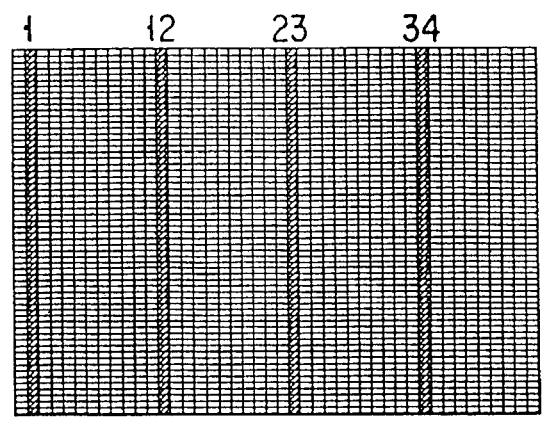
Figure 4C:
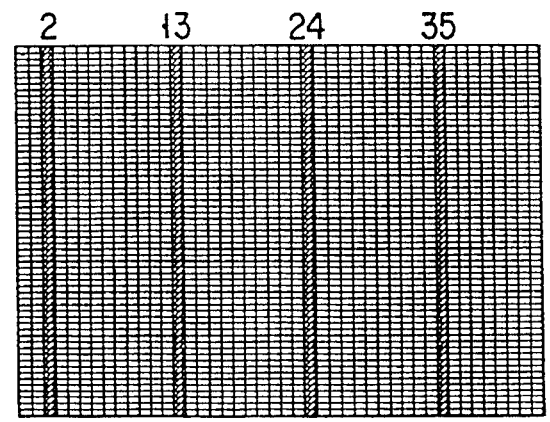
Figure 4D:
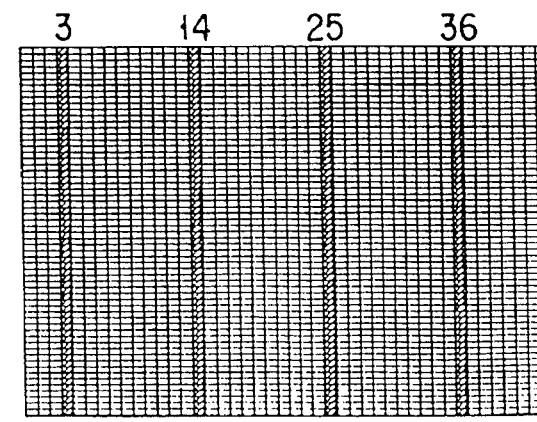
Figure 4E:
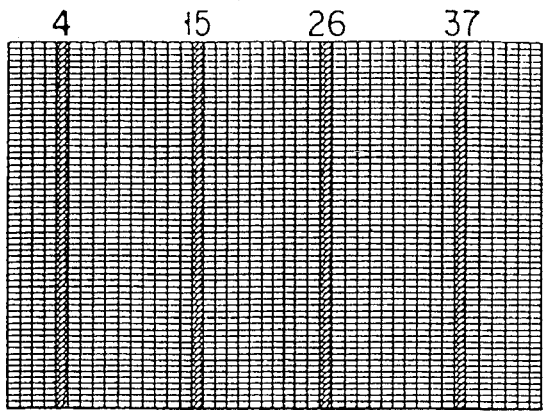
Figure 4F:
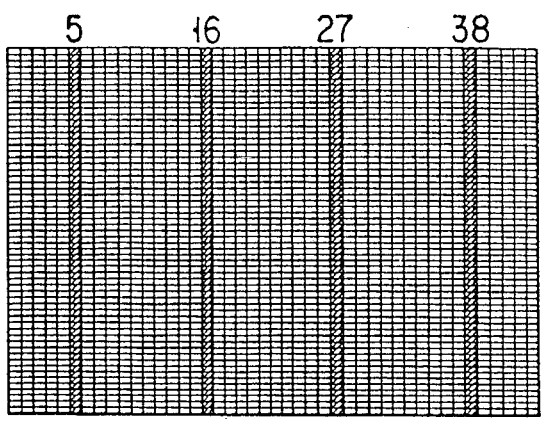
Figure 4G:
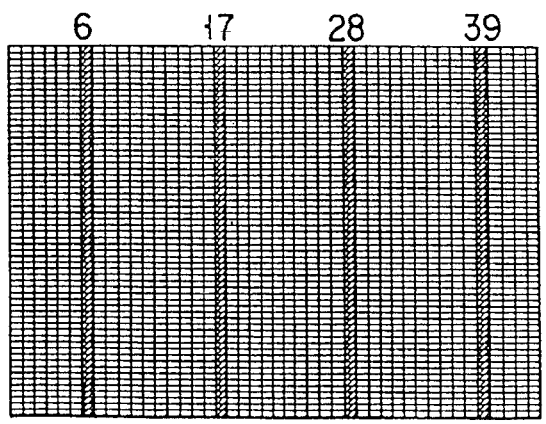
Figure 4H:
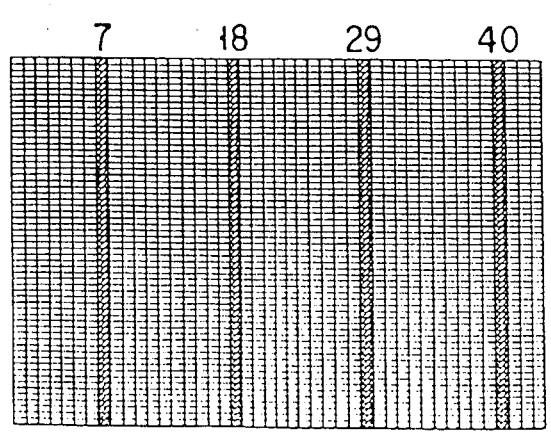

FIG. 3 shows the relationship between one frame and super block addresses (to be referred to as S.B.As hereinafter).

There are 44 super blocks in the horizontal direction, and 60 super blocks in the vertical direction. That is, 2,640 super blocks are present in one frame. S.B.As are assigned to the respective super blocks.

If super block addresses in the horizontal and vertical directions are respectively represented by x and y, their relationship is expressed as follows:

$$S.B.A.=60 \cdot x+y$$

Block: As shown in FIG. 2(d), a block is a 64-pixel area constituted by 8 pixels in the horizontal direction ×8 pixels in the vertical direction.

Super block: As shown in FIG. 2(c), a super block is an area of a luminance signal constituted by 4 blocks in the horizontal direction×2 block in the vertical direction. This area includes one block of a color difference signal U and one block of a color difference signal v. The image motion vectors obtained by the motion evaluation circuit 13 can be set in units of super blocks.

Macro-block: As shown in FIG. 2(b), a macro-block is constituted by 11 super blocks in the horizontal direction. In transmission of codes, the DCT coefficients of a block are transformed into codes determined by zero coefficient counts and the amplitudes of nonzero coefficients, and the codes are transmitted in sets, with an end-of-block signal added to the end of the block. Motion vectors for motion correction set in units of super blocks are added and transmitted as overhead data in units of macro-blocks.

Figure 5A:
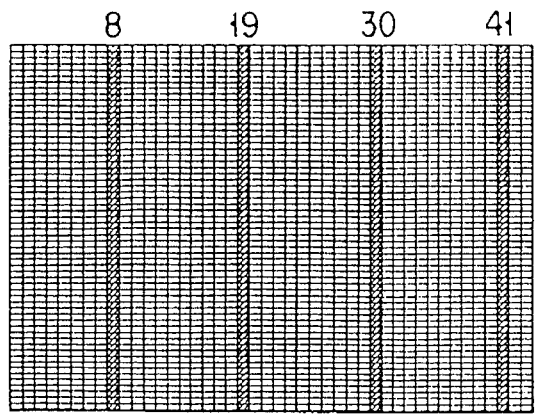
FIGS. 5(a) to 5(d) are views for explaining a refreshing operation in the embodiment.
Figure 5B:
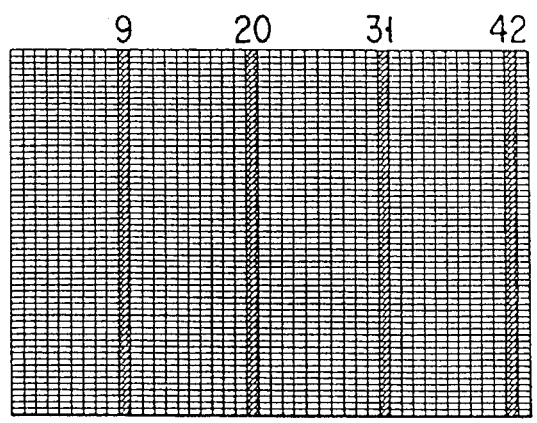
Figure 5C:
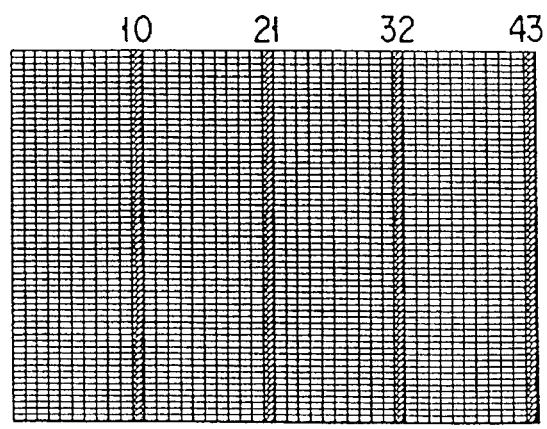
Figure 5D:
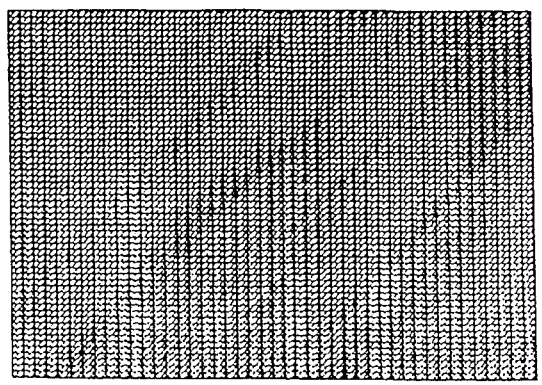

As described above, in this band compression system, a set of 11 super blocks in the horizontal direction is called a macro-block. In one frame, 44 super blocks are present in the horizontal direction. That is, 4 macro-blocks in the horizontal direction×60 macro-blocks in the vertical direction, i.e., a total of 240 macro-blocks, are present in one frame. In the band compression system, as shown in FIGS. 4(a) to 4(h) and 5(a) to 5(c), refreshing is performed for every vertical array of super blocks in units of 4 macro-blocks, and all the super blocks are refreshed at a period of 11 frames. That is, when the refreshed super blocks of 11 frames are accumulated, intra-frame processing in all the areas is completed, as shown in FIG. 5(d).

3. Intra-frame/inter-frame coding

First of all, the basic operation of the system includes intra-frame-coding and inter-frame-coding processes.

Intra-frame-coding processing is performed as follows. During this processing, both the switches 24 and 25 are kept off. A vide signal input to the input terminal 11 is transformed from a time axis region to a frequency region by the DCT circuit 14, and is quantized by the quantizer 15. The quantized signal is variable-length-coded and is output to the transmission path through the FIFO circuit 17. The quantized signal is restored to the original signal by the inverse quantizer 19 and the inverse DCT circuit 20 and is delayed by the frame delay circuit 22. That is, intra-frame coding is equivalent to processing of directly converting the information of an input video signal into a variable length code. This intra-frame processing is performed at a proper period, e.g., for every scene change of an input video signal or in units of predetermined blocks. Periodic intra-frame-coding processing will be described later.

Inter-frame-coding processing will be described next. When this processing is to be started, both the switches 24 and 25 are turned on. As a result, a signal corresponding to the difference between an input video signal and a video signal one frame ahead thereof is obtained by the subtracter 12. This difference signal is input to the DCT circuit 14 to be transformed from a time axis region to a frequency region. The signal is then quantized by the quantizer 15. In addition, since the difference signal and the video signal are added together by the adder 21 and the resultant signal is input to the frame delay circuit 22, a predictive video signal predicting the input video signal on which the difference signal is based is generated and input.

In general, the amount of codes generated in intra-frame coding is larger than that in inter-frame coding.

4. Intra-frame/inter-frame switching processing 4.1 Image adaptive intra-frame processing An intra-frame/inter-frame coding processing switching operation is controlled by an intra-frame/ inter-frame processing determination circuit 31. There are two types of control methods for this operation.

According to the first method, a signal having an inter-frame correlation is subjected to inter-frame processing, and a signal having no inter-frame correlation is subjected to intra-frame processing in accordance with the contents of an input video signal. When a scene change occurs, intra-frame processing is performed.

The intra-frame/inter-frame processing determination circuit 31 compares the predictive error energy between a current frame signal from the input terminal 11 and a predictive signal output from the motion compensation circuit 23 with the energy of the current signal.

Figure 6:
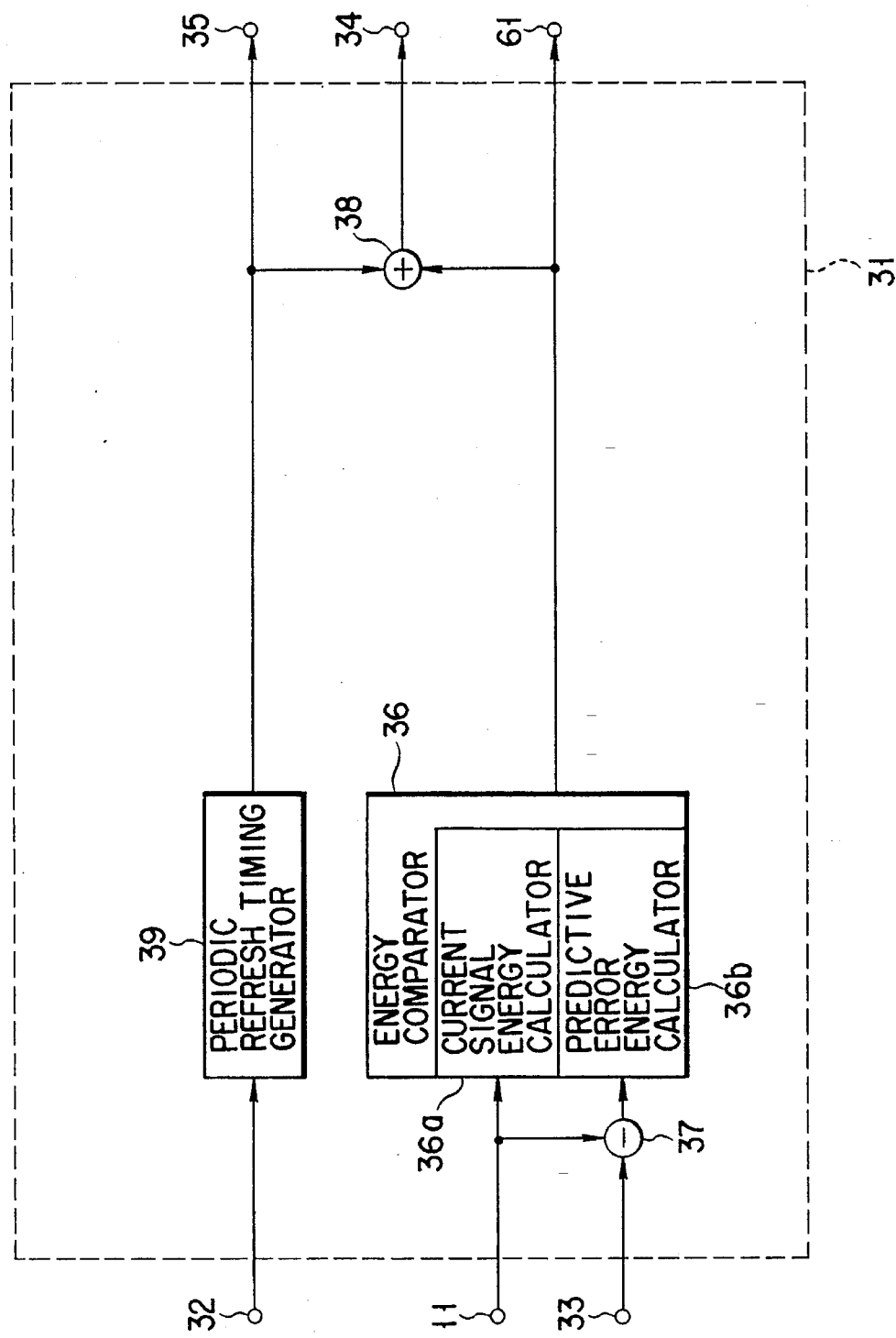
FIG. 6 is a block diagram showing the arrangement of an intra-frame/inter-frame processing determination circuit in the embodiment.

Referring to FIG. 6, input terminals 11, 32, and 33 and output terminals 34 and 35 are the same as input terminals 11, 32, and 33 and output terminals 34 and 35 in FIG. 1.

A current signal is input to the input terminal 11. This current signal is input to an energy comparator 36 and a subtracter 37. A predictive signal output from the motion compensation circuit 23 is input to the input terminal 33. The subtracter 37 then obtains a prediction error as the difference between the current signal and the predictive signal.

The energies of the current signal and the prediction error are respectively calculated by a current signal energy calculator 36a and a prediction error energy calculator 36b to be compared with each other. The energies of the current signal and the prediction error are calculated according to the following equations:

ENERGY OF CURRENT SIGNAL $$0 = \frac{\sum_{k=0}^{7} \sum_{l=0}^{7} 0(k,l)^2}{64} - \left\{ \frac{\sum_{k=0}^{7} \sum_{l=0}^{7} 0(k,l)^2}{64} \right\}$$

ENERGY OF PREDICTIVE ERROR $$\epsilon = \frac{\sum_{k=0}^{7} \sum_{l=0}^{7} \{S(k,l) - 0(k,l)\}^2}{64}$$

O(k,l): COEFFICIENT OF BLOCK OF CURRENT SIGNAL

S(k,l): COEFFICIENT OF BLOCK AFTER MOTION COMPENSATION k: HORIZONTAL POSITION OF BLOCK l: VERTICAL POSITION OF BLOCK; and FIG. 7 shows an intra-frame/inter-frame processing determination method in the energy comparator 36.

Figure 7:
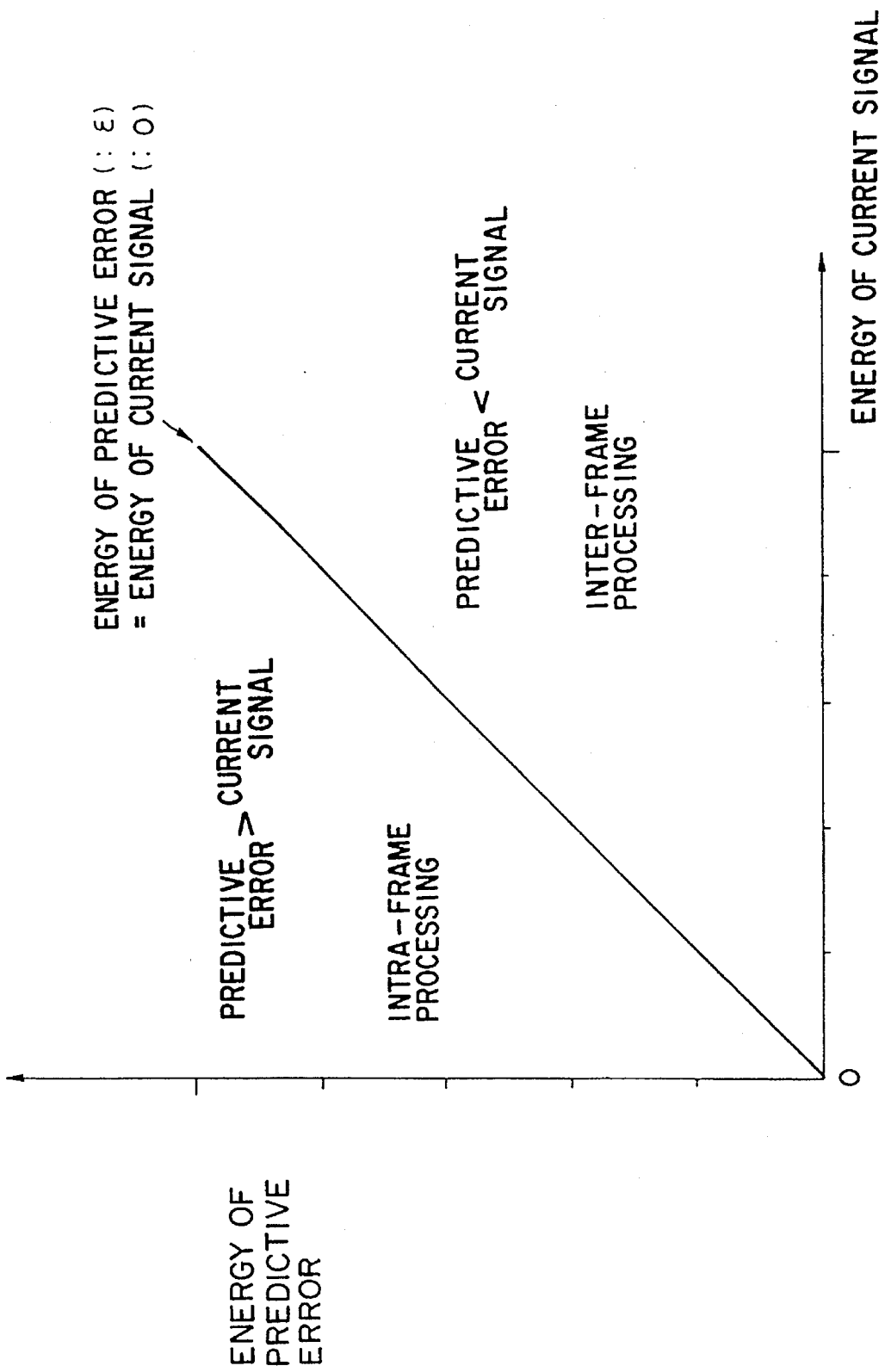
FIG. 7 is a graph showing intra-frame/inter-frame determination characteristics in the embodiment.

Referring to FIG. 7, the abscissa represents the energy of the current signal; and the ordinate, the energy of the prediction error. The solid line obliquely extending from origin O indicates that the energy of the prediction error is equal to the energy of the current signal.

In a region below the solid line, since the energy of the prediction error is lower than that of the current signal, inter-frame processing is performed. In a region above the solid line, since the energy of the current signal is lower, intra-frame processing is performed.

The energy comparator 36 outputs an intra-frame/inter-frame processing determination signal in accordance with the input signal. The output signal is synthesized by an adder 38 and is output from the output terminal 34.

4.2 Forcible intra-frame processing (refresh)

In the second method, intra-frame processing is forcibly performed regardless of the correlation of a video signal. In this case, intra-frame processing is periodically performed with respect to a predetermined area of a frame.

This forcible intra-frame processing is performed for the following two purposes.

1. When a user changes the channel, this processing is required to allow the user to recognize an image within a predetermined period of time. When recording medium such as a VTR or a disk is used, the processing is required to realize special reproduction.

Such forcible intra-frame processing is called refreshing. The time required to refresh a predetermined area is called a refresh time.

As shown in FIG. 6, a periodic refresh timing generator 39 for this refreshing operation is designed to receive a sync signal through the input terminal 32 and generate an intra-frame selection signal at a predetermined period in synchronism with this sync signal. This selection signal is added to the intra-frame/inter-frame processing determination signal output from the energy comparator 36 by the adder 38. The resultant intra-frame/inter-frame processing switching signal is output from the terminal 34.

5. Refreshing

Refreshing in each scheme will be described in detail below.

5.1 Digicipher refreshing

In digiCipher, as described above, a set of 11 super blocks in the horizontal direction is called a macro-block, and 44 super blocks are present in the horizontal direction in one frame. That is, 4 macro-blocks in the horizontal direction ×60 macro-blocks in the vertical direction, i.e., a total of 240 macro-blocks, are present in one frame. In the band compression system, as shown in FIGS. 4(a) to 4(h) and 5(a) to 5(c), refreshing is performed for every vertical array of super blocks in units of 4 macro-blocks, and all the super blocks are refreshed at a period of 11 frames. That is, when the refreshed super blocks of 11 frames are accumulated, intra-frame processing in all the areas is completed, as shown in FIG. 5(d).

The merit of this refreshing is that since refreshing is evenly performed in each frame, only a small-capacity rate buffer is required.

Figure 8:
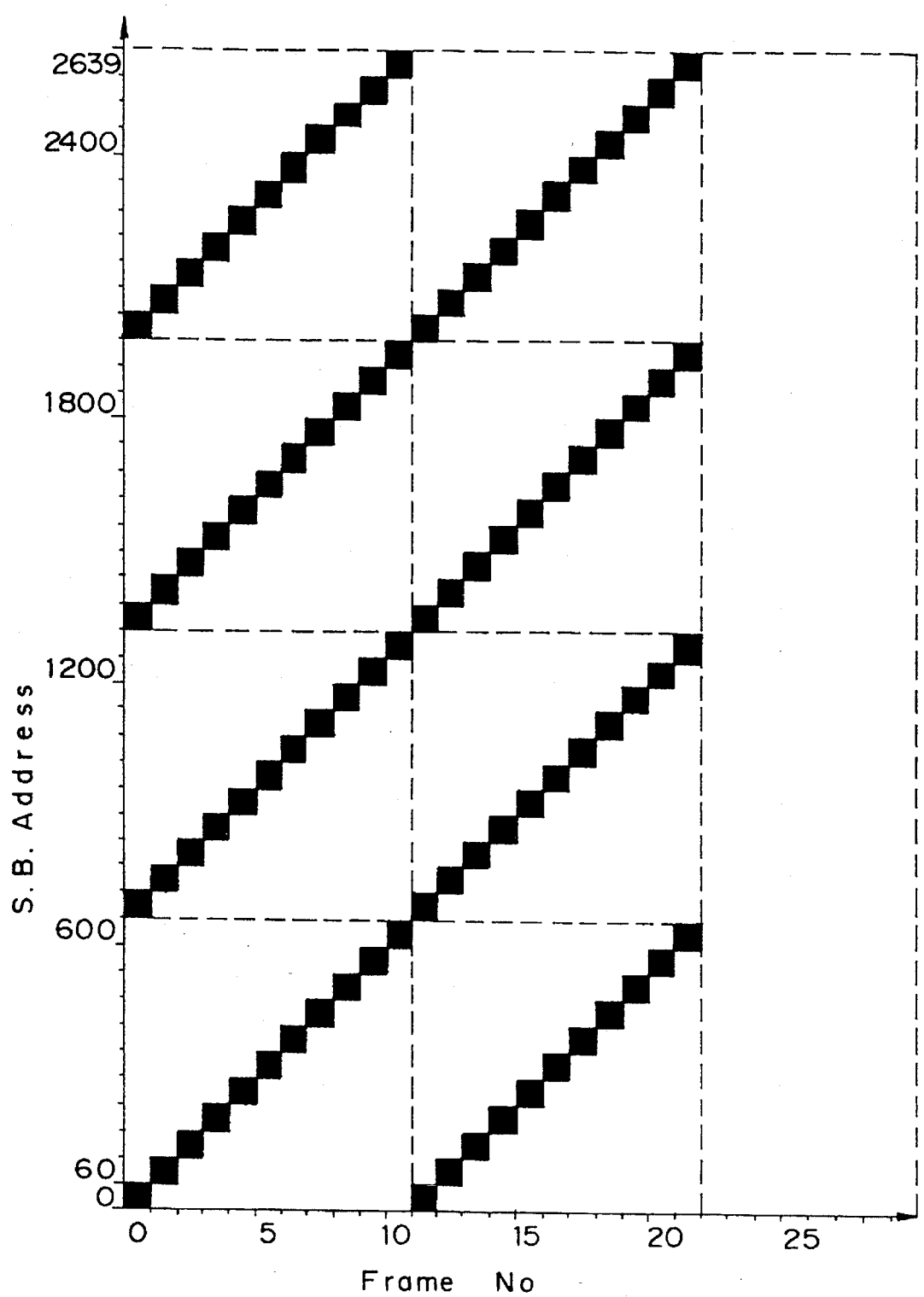
FIG. 8 is a chart for explaining a forcible refreshing operation in the embodiment.

FIG. 8 represents refreshing in DigiCipher by using super block addresses in FIG. 3.

Referring to FIG. 8, the ordinate represents super block addresses; and the abscissa, frame numbers. The black marks indicate portions on which intra-frame processing is performed. FIG. 8 only shows refreshing.

Referring to FIG. 8, refreshing is performed with respect to all the super blocks in each of 11 frames having frame numbers $F_0$ to $F_{10}$.

Since the same processing is performed by four processors, refreshing in DigiCipher will be described below by exemplifying a refreshing operation by one processor as in FIG. 8, with reference to FIGS. 9(a) to 9(e).

That is, portions corresponding to S.B.As =0 to 659 will be described below.

Referring to FIG. 9(a), black marks represent portions on which refreshing and image adaptive intra-frame processing are performed.

For example, at frame number $F_0$, intra-frame processing is performed with respect to all the areas indicated by S.B.As 0 to 659 on the assumption that a scene change occurs. At frame number $F_{14}$, intra-frame processing is performed with respect to areas indicated by S.B.As 0 to 59.

FIG. 9(b) shows the refresh time in DigiCipher. Part of each frame is refreshed, and one refresh processing is completed at a period of 11 frames. Therefore, 11 frames correspond to the refresh time. Refreshing of one frame is completed in any 11-frame period. That is, refreshing is completed either in an 11-frame period of $F_0$ to $F_{10}$ or in an 11-frame period of $F_1$ to $F_{11}$.

As shown in FIG. 9(c), the minimum acquisition time is a 1-frame period, which is obtained when a scene change occurs and initialization is started.

FIG. 9(d) shows the maximum acquisition time which is obtained when no image adaptive intra-frame processing is performed. The maximum acquisition time is an 11-frame period.

Assume that data is recorded by a VCR, and fast reproduction is realized by using only refresh blocks. In this case, as shown in FIG. 9(e), the recording interval of the VCR corresponds to 11-frame periods shifted from each other in terms of time at the respective refresh block addresses.

7. DCT

A two-dimensional DCT circuit (14 in FIG. 1) will be described below.

An image is divided into small blocks constituted by N pixels in the horizontal direction×N pixels in the vertical direction (N×N pixels). Each block is then subjected to two-dimensional DCT. In this case, the value of N is set to be 8 to 16 on the basis of transformation efficiency. In this embodiment, N=8.

A transformation coefficient of two-dimensional DCT is given by equation (1), and its inverse transformation coefficient is given by equation (2).

$$F(u,v) = \frac{4C(u)C(v)}{N^2} \sum_{j=0}^{N-1} \sum_{k=0}^{N-1} f(j,k) \cos\left\{\frac{(2i+1)u\pi}{2N}\right\} \cos\left\{\frac{(2k+1)v\pi}{2N}\right\} \quad (1)$$

$$f(j,k) = \sum_{u=0}^{N-1} \sum_{v=0}^{N-1} (C(u)C(v)F(u,v)) \cos\left\{\frac{(2j+1)u\pi}{2N}\right\} \cos\left\{\frac{(2k-1)v\pi}{2N}\right\} \quad (2)$$

FOR $C(w)$ ½, $w=0$ $1, w=1,2,\ldots,N-1$ (3)

In this case, F(0,0) represents a coefficient of a DC component. F(u,v) includes more horizontal frequency components having high frequencies with an increase in $\underline{u}$, and includes more vertical frequency components having high frequencies with an increase in $\underline{v}$.

The characteristics of the coefficient F(0,0) of a DC component will be described first. F(0,0) corresponds to a DC component representing an average luminance value in an image block. In general, its average power is considerably higher than that of other components.

If a DC component is coarsely quantized, noise (block distortion) unique to quadrature transformation is caused, resulting in a perceptible deterioration in image quality. For this reason, a large number of bits (generally, 8 bits or more) are assigned to F(0,0) to perform uniform quantization.

The characteristics of the transformation coefficient F(u,v) excluding the DC component will be described next. The average value of F(u,v), excluding the DC component F(0,0), is "0" according to equation (1).

When coding is performed by assigning a predetermined number of bits to each small block of an image, in order to efficiently perform coding, a large number of coding bits are assigned to a transformation coefficient of a low-frequency component, and a small number of coding bits are assigned to a transformation coefficient of a high-frequency component. With this operation, a deterioration in image quality can be reduced, and coding can be performed at a high compression ratio.

If an image is converted into small blocks each constituted by 8 pixels in the horizontal direction×8 pixels in the vertical direction, i.e., 8×8=64 pixels, and two-dimensional DCT is performed with respect to the small blocks, 8×8=64 two-dimensional coefficients are obtained in correspondence with the transformed frequency components, as shown in FIG. 10. Referring to FIG. 10, the upper left block is a DC coefficient (DC component), and the remaining 63 blocks are AC coefficients (AC components). The spatial frequency increases toward the lower right block. Since the AC components two-dimensionally spread, they are converted into one-dimensional components by sequentially performing zigzag scanning from block 0 to block 63 in coding and transmission.

Assume that the 64 DCT coefficients are represented by $DCT_i$ [i=0 to 63].

When an image signal is to be processed, each pixel is quantized by using 8 bits as a quantization bit count in many cases.

A DCT coefficient obtained by performing DCT processing of this 8-bit pixel is sometimes expressed by 12 bits.

8. Quantization

The quantizer (15 in FIG. 1) will be described below.

The above-mentioned 64 DCT coefficients are linearly quantized in different step sizes at the respective coefficient positions by using a quantization table in which quantization step sizes are set in units of coefficients.

Although there are two quantization step setting methods, they basically use the same technique.

In the first method, a quantization table in which a quantization step is set for each of the 64 DCT coefficients is used, and a code representing the quantization table is transmitted.

Figure 11:
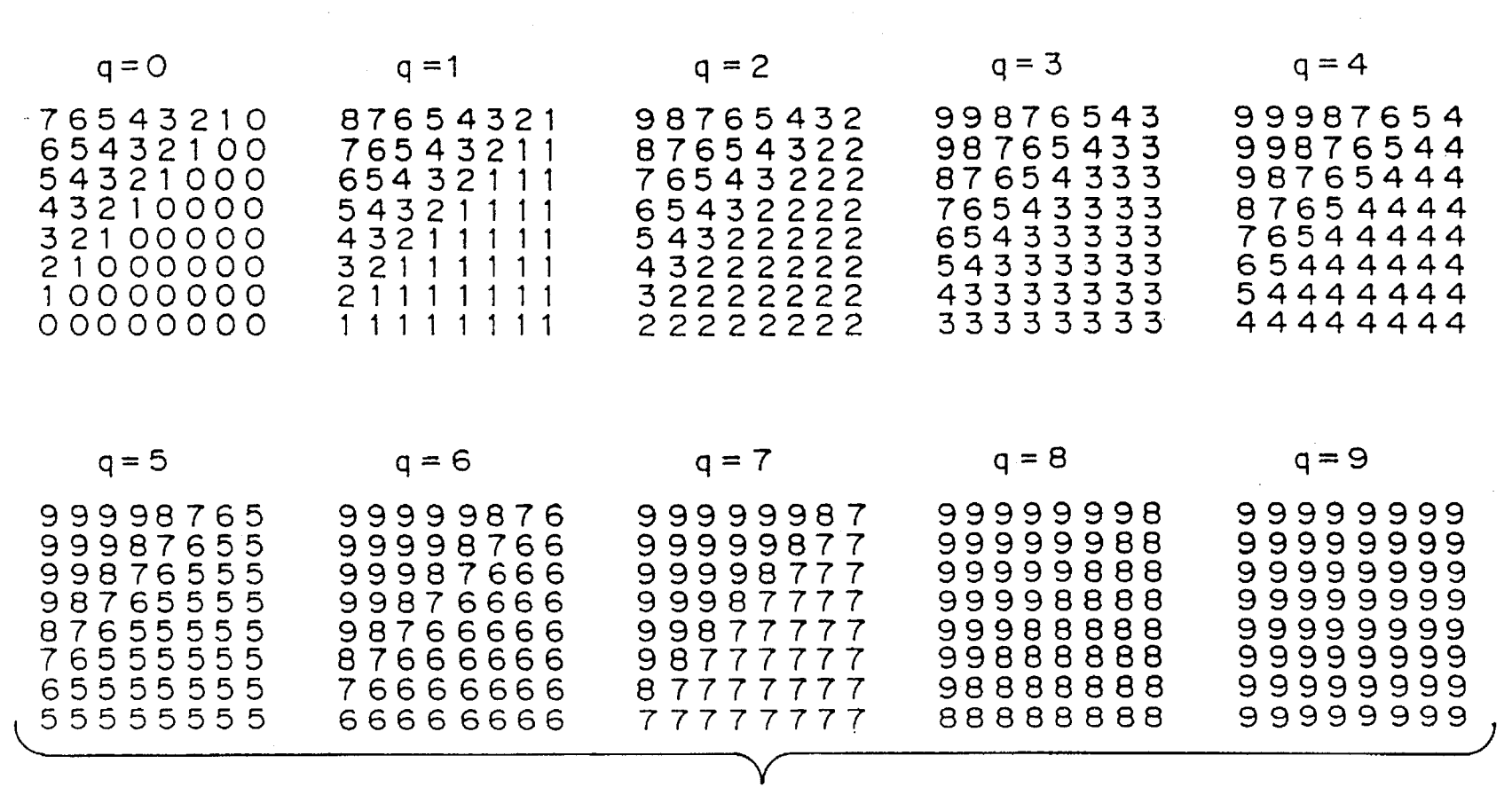

FIG. 11 shows quantization tables. Referring to FIG. 11, q=0 to q=9 are quantization table codes representing the quantization tables. When such a code is transmitted, a decoder can perform inverse quantization.

In FIG. 11, 64 numbers arranged in the form of a square represent quantization bit counts, which respectively correspond to the 64 two-dimensional coefficients shown in FIG. 10. For example, "7" located at the upper left portion in the quantization table represented by q=0 indicates that the DC component is quantized in 7 bits.

Subsequently, each coefficient is quantized with a corresponding bit count indicated by the quantization table in the same manner as described above.

In the second method, the 64 DCT coefficients are weighted by using a weighting matrix.

Subsequently, the respective coefficients are uniformly divided by using quantization width data QS (Quantize-scale), and the resultant coefficients are quantized. When the quantized coefficients are transmitted, a code corresponding to the quantization width data is transmitted. In addition, the default values of the weighting matrix are predetermined. A special type of weighting matrix can also be transmitted.

In MPEG.I, for example, 5 bits are assigned to the code representing the quantization width data QS so that 32 types of codes can be designated. This value is given by $QS_j$ [j=0 to 31]

Quantization width data QS j will be defined below.

A case wherein a DCT coefficient value is quantized with the maximum quantization bit count is represented by j=0.

$QS_0=1$

In addition, j=31 indicates a case wherein no DCT coefficient value is transmitted. In this case, a quantization bit count (to be described later) is given by $QL_{31}=0$ In this case, j is called a quantization level.

Figure 12:
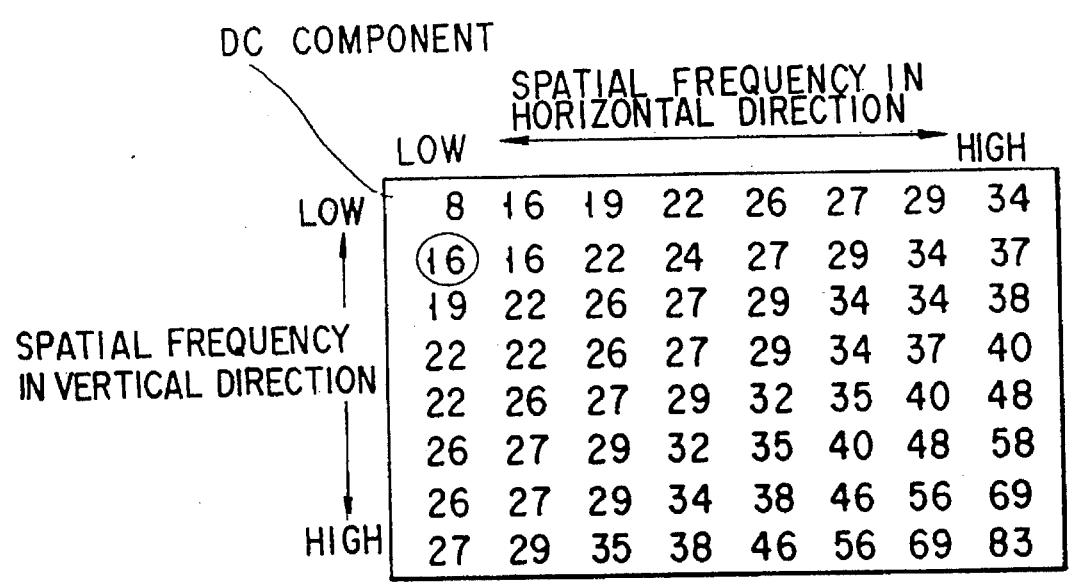
FIG. 12 shows a weighting table.

FIG. 12 shows the default values of a weighting matrix for a luminance signal, which is used in MPEG.I.

Referring to FIG. 12, 8×8=64 numbers correspond to the 64 two-dimensional coefficients shown in FIG. 10 and represent the weights of the respective DCT coefficients.

In an encoder, the respective DCT diaphragms are divided by the corresponding weights and the quantization width data QS.

If the 64 DCT coefficients are represented by $DCT_i$[i=0 to 63]; the respective values of the weighting matrix, $WEIGHT_i$[i=0 to 63]; and the respective quantized values, $Q_i$[i=0 to 63], their relationship is represented by:

$$Q_i = \frac{1}{QSi} \times \frac{DCT_i}{WEIGHT_i} \quad (i=0\sim63) \quad (4)$$

Each quantization bit count in this processing can be given by:

$$QL_i = \log_2 \left( \frac{1}{QS} \times \frac{DCT_i}{WEIGHT_i} \right) \quad (5)$$

$$= \log_2 DCT_i - \log_2 QS - \log_2 WEIGHT_i$$

An example will be described below.

The first AC component of a luminance signal in MPEG.I in the vertical direction is represented by the coefficient $DCT_1$ described with reference to FIG. 10.

A value in the weighting matrix which corresponds to the coefficient $DCT_1$ is $WEIGHT_1$=16. This value corresponds to the portion indicated by the circle in FIG. 12. If quantization width data $QS_O$=1, the following equation is established:

$$Q = \frac{1}{QSj} \times \frac{DCT_l}{WEIGHT_l}$$

$$= \frac{1}{OSj} \times \frac{DCT_l}{16}$$

$$= \frac{DCT_l}{16}$$

Since the coefficient $DCT_i$ is expressed by 12 bits, the maximum value of $\log_2 DCT_i$ is 12. In this case, the quantization bit count is given by $$QL_i = \log_2 DCT_i - \log_2 WEIGHT_l$$

$$= \log_2 DCT_i - 4$$

$$= 12 - 4$$

$$= 8 \text{ BITS}$$

FIG. 13 shows the maximum quantization bit counts required after weighting is performed by using the weighting matrix for the case of $QS_0$=1. FIG. 13 shows a matrix indicating 8×8=64 quantization bit counts, each of which indicates a quantization bit count corresponding to the position of a corresponding one of the DCT coefficients shown in FIG. 10.

Figure 15:
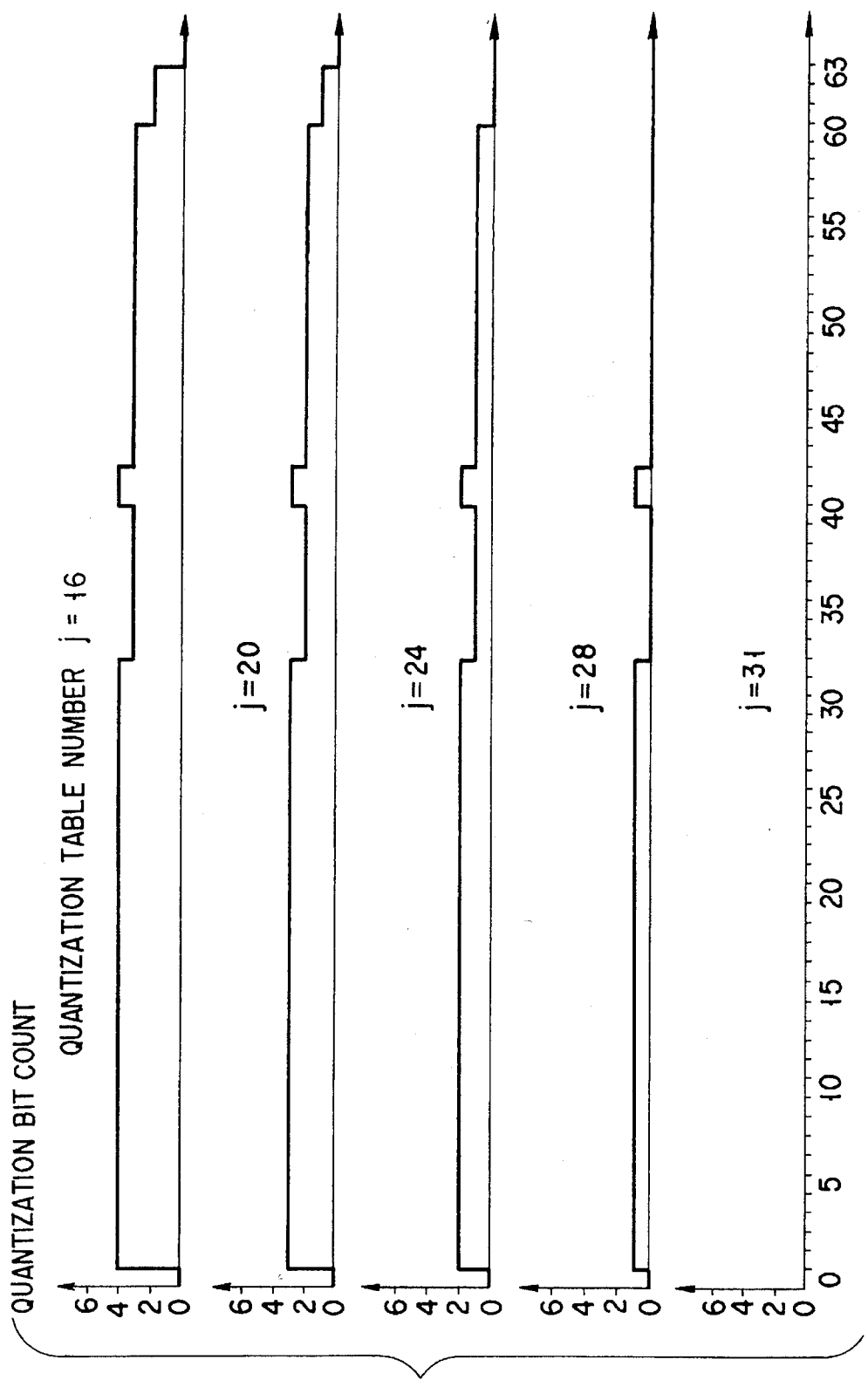
FIG. 15 is a chart showing the numbers of bits generated by weighting tables.

FIGS. 14 and 15 quantitatively show 9 types of typical quantization tables of quantization tables obtained when 32 types of quantization width data $QS_j$ are set.

A case wherein the second method associated with quantization tables will be described below on the assumption that these tables are based on the quantization width data QS.

In this case, j=31 indicates a case wherein no data is generated, which corresponds to processing of r quantizing all the coefficients in 0 bit. In addition, since j=0 corresponds to a case wherein since quantization width data $QS_0$ =1, quantization is performed by using a weighting table. That is, in this case, bits are assigned according to the weighting table shown in FIG. 13.

Referring to FIGS. 14 and 15, the abscissa represents 64 DCT coefficients, which correspond to the zigzag scan sequence in FIG. 10, and the ordinate represents the number of bits to be transmitted at each DCT coefficient.

Note that in quantization of DCT coefficients, bits from the MSB (Most Significant Bit) to the LSB (Least Significant Bit) are present. When the number of bits to be transmitted is to be limited, the MSB is transmitted in preference to other bits, as naturally understood.

As described above, if the quantization bit count for a DC component is reduced, block distortion becomes conspicuous. In some case, therefore, a DC component is independently processed, and a predetermined quantization bit count is assigned to it. Assume, in this case, that 8 bits are assigned to a DC component.

As described above, in the case of a luminance signal in MPEG.I, the maximum value of an AC component is 8 bits.

Quantization bit counts and quantization width data will be quantitatively described below with reference to FIGS. 14 and 15.

The generation amount of codes is maximized when j=0. With an increase in j, the generation amount of codes decreases. When j=31, the generation amount of codes becomes 0, and hence no codes are generated.

By controlling this quantization width data, the generation amount of codes can be controlled.

9. Requirements for fast reproduction

Requirements for fast reproduction will be described next.

9.1 Refresh block code switching

The simplest case will be described first.

In the prior art, since intra-frame coding is performed with respect to 2,640 areas of one frame at a period of 11 frames, an area count a in one frame=2,640 and an intra-frame-coding period f=11 frames. A case wherein one track is divided into two tracks, and an average video code of one frame is recorded on one track will be described below on the assumption that a division count d of one track is 2 and a track count c for recording an average video code of one frame is 1. In this case, a recording medium area count d×c×f=2×1×11=22. The correspondence between refresh block frame areas and recording medium areas will be described by exemplifying a case wherein they have a one-to-one correspondence. A frame area count e arranged in one recording medium area is given by e=a/d×c×f=2640/2×1×11=120. A case where e=120 are made to correspond to each of d×c×f=22 areas will be described.

FIGS. 16 (a) to 16(i) show an operation timing of this system.

A description will be made with reference to FIG. 1. A sync signal of an input video signal is supplied to the input terminal 32. This sync signal is input to a sync signal detector 40 to be detected. The sync signal detector 40 outputs sync pulses in synchronism with the sync signal from the output terminal 41 and supplies it to a track formation signal generator 42.

FIG. 16(a) shows the input video signal. Referring to FIG. 16(a), reference symbol Y denotes a luminance signal; and U and V denote, chrominance signals. The numbers in FIG. 16(a) indicate frame numbers. FIG. 16(b) shows the sync pulses obtained by the sync signal detector 40 and output from the output terminal 41, which pulses are generated in synchronism with the frame switching points of the input video signal shown in FIG. 16(a). FIG. 16(c) shows the track formation signal obtained by the track formation signal generator 42. Referring to FIG. 16(c), reference symbols A and B denote periods during which heads A and B of a rotary drum 43 alternately form tracks. The heads A and B are mounted on the rotary drum 43 to be opposite each other and 180° apart. In this embodiment, the generation timing of the sync pulses shown in FIG. 16(b) is synchronized with the switching timing of the track formation signal shown in FIG. 16(c). FIG. 16(d) shows the tracks formed by the heads A and B. The numbers shown in FIG. 16(d) indicate track numbers.

The track formation signal output from the track formation signal generator 42 is supplied to a track formation controller 44. The track formation controller 44 controls the rotational phase of the rotating drum 43. The recording signal supply timings of the heads A and B are controlled by inputting the sync pulses, obtained by the sync signal detector 40, to a code switching circuit 45.

A code switching method used in this embodiment to allow a VTR to perform fast reproduction will be described below. The luminance signal Y and the chrominance signals U and v supplied to the input terminals 27, 28, and 29 are combined by the block formation circuit 30, and the resultant signal is supplied, as an input video signal, to the subtracter 12 and the motion evaluation circuit 13 through the input terminal 11. As a result, band-compressed video codes are output from the variable length encoder 16.

Figure 59:
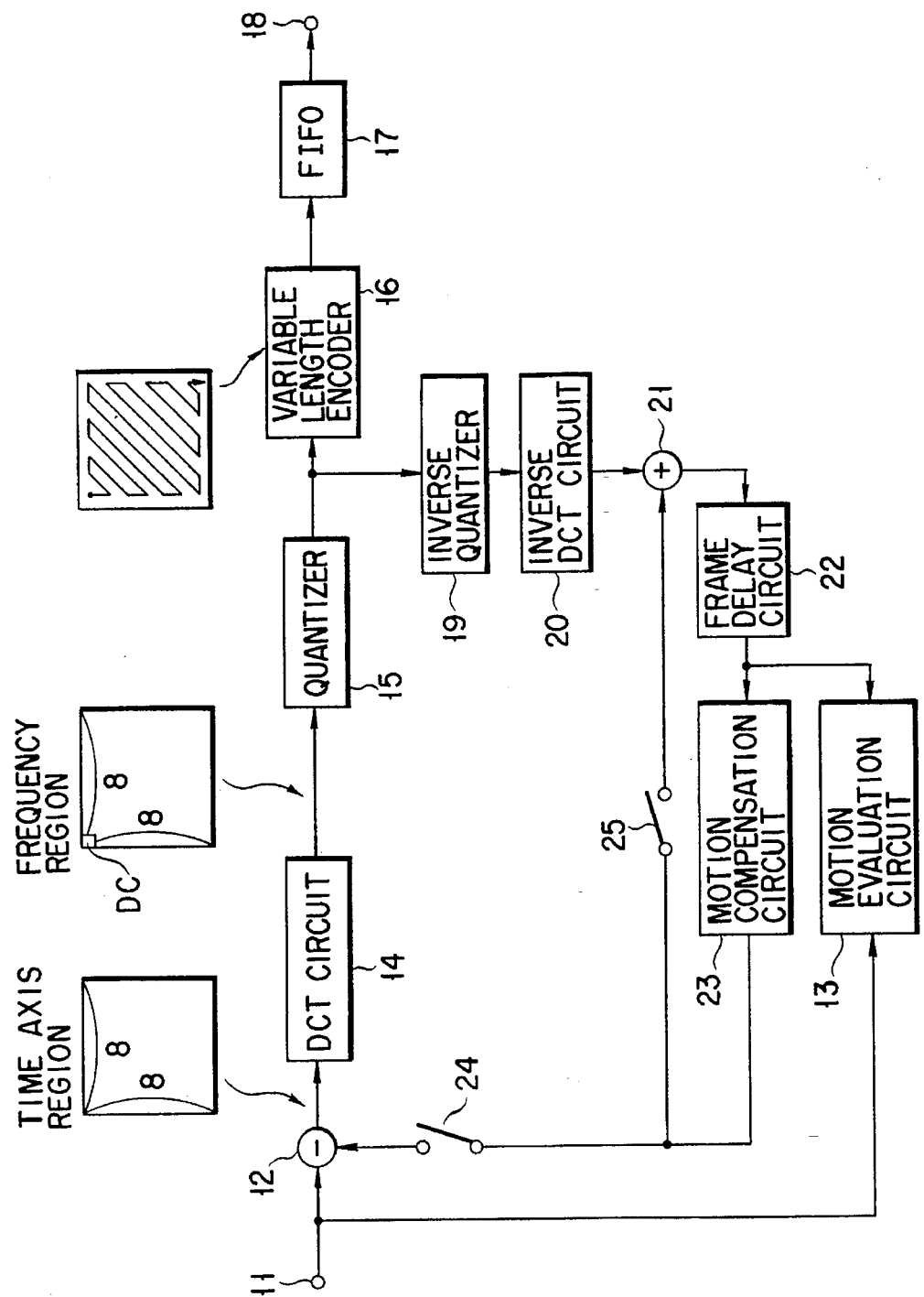
FIG. 59 is a block diagram showing the arrangement of a conventional band compression system.

At this time, according to the conventional band compression system shown in FIG. 59, the video signal is variable-length-coded. Therefore, as shown in FIG. 16(i), the frame switching points of the video codes vary depending on frames. The NMP signal shown in FIG. 16(h) indicates the frame switching points of this video signal. In the conventional system, 2,640 super blocks are present in one frame, and these 2,640 super blocks are present in a one-frame period indicated by the NMP signal shown in FIG. 16(h).

Figures 60A, 60B:
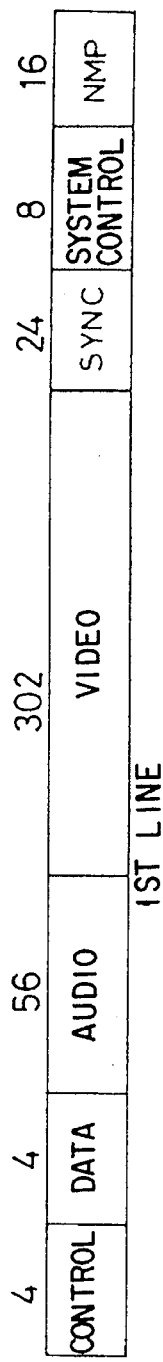
FIGS. 60(a) and 60(b) are charts showing the formats of signals to be transmitted from the conventional system.
Figure 6I:
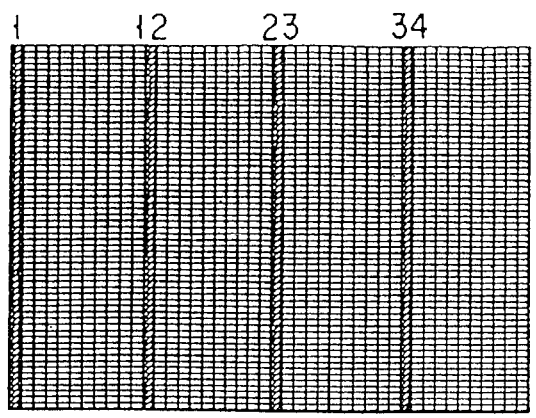
Figure 6I:
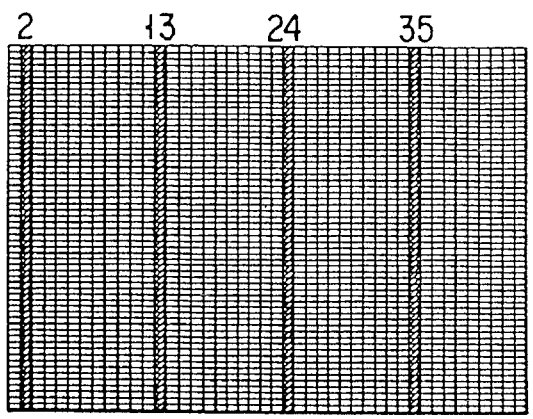
Figure 6I:
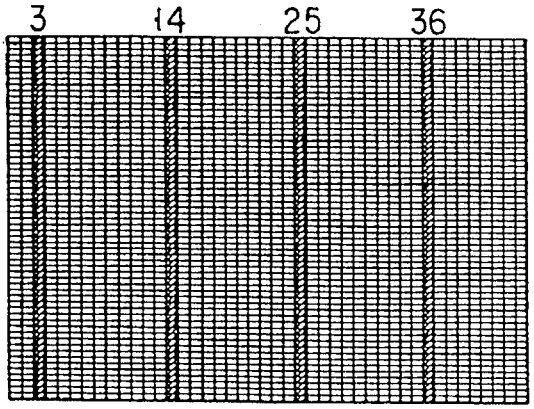
Figure 6I:
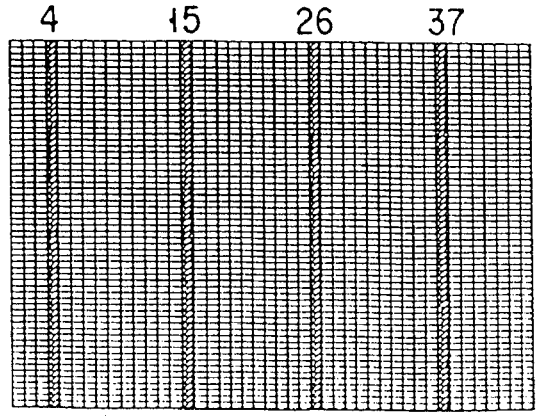
Figure 61E:
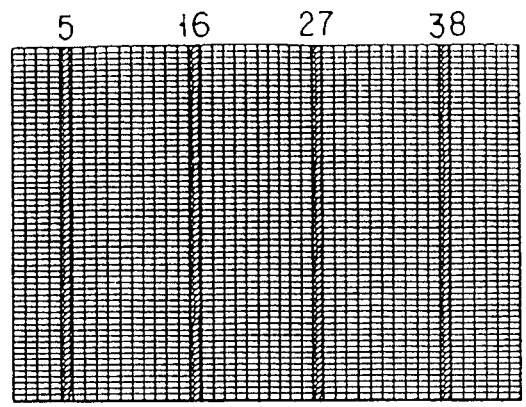
Figure 61F:
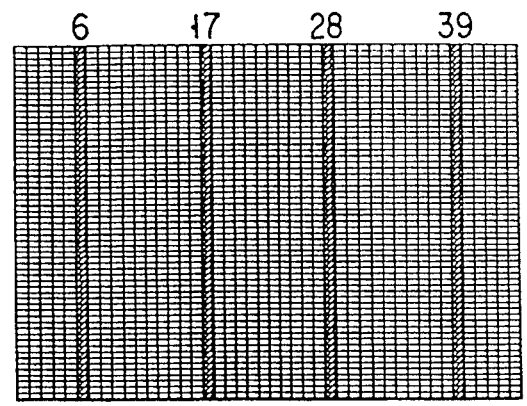
Figure 61G:
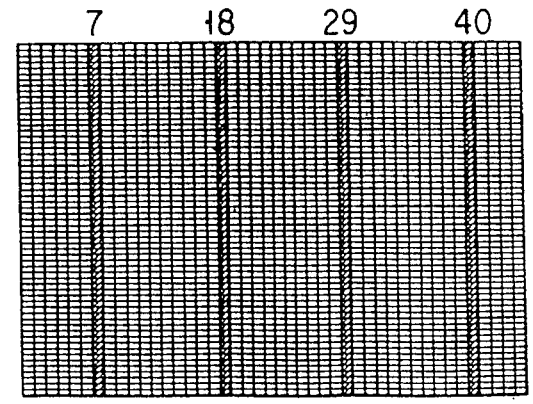
Figure 61H:
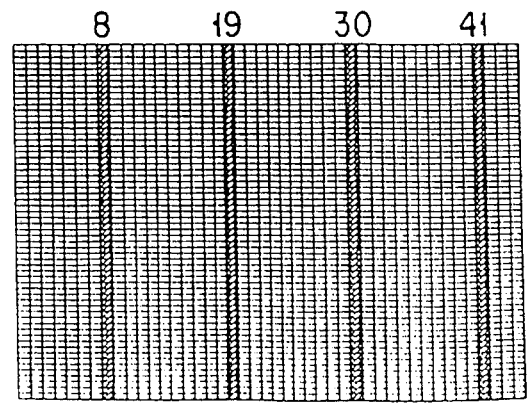
Figure 62A:
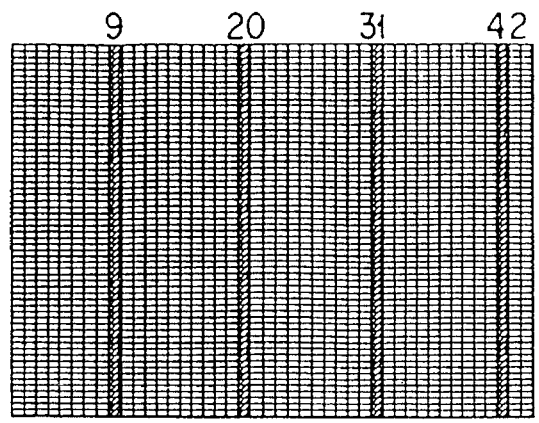
FIGS. 62(a) to 62(d) are charts showing refresh blocks, of frames 9 to 11, which can be reproduced in a normal reproduction operation in the conventional system, and the accumulated refresh blocks of 11 frames.
Figure 62B:
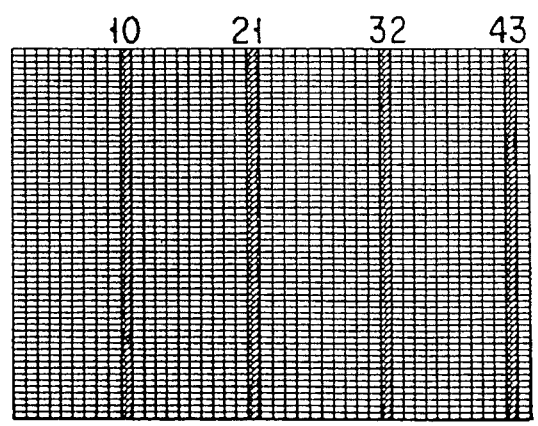
Figure 62C:
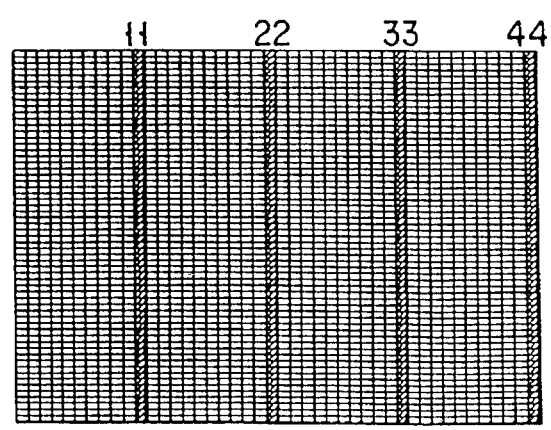
Figure 62D:
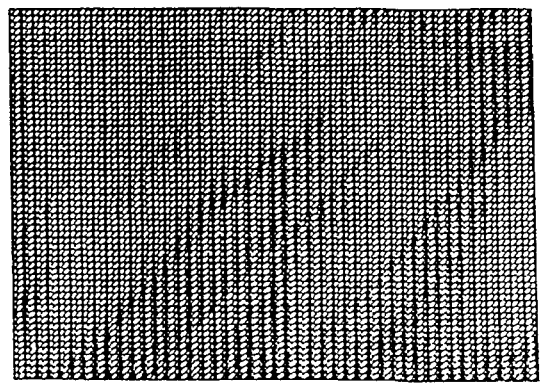
Figure 63:
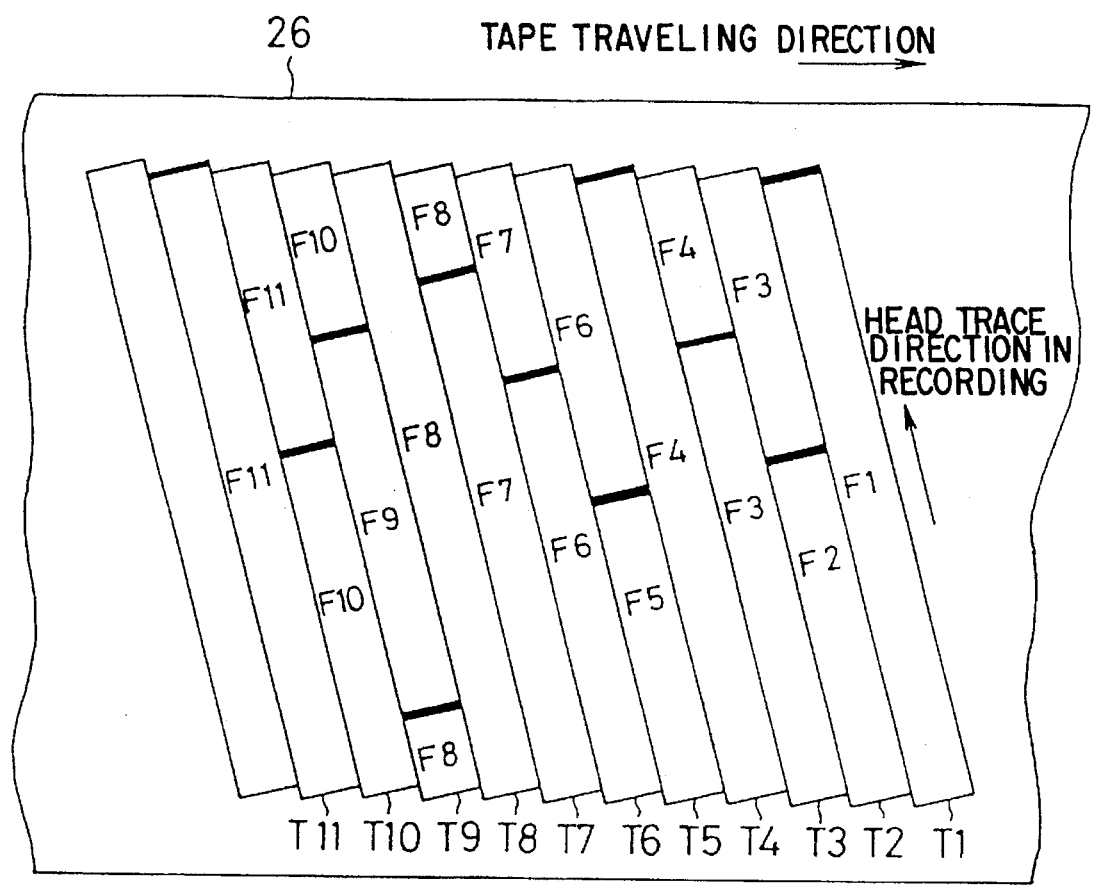
FIG. 63 is a view showing a track pattern in the conventional system.
Figure 64A:
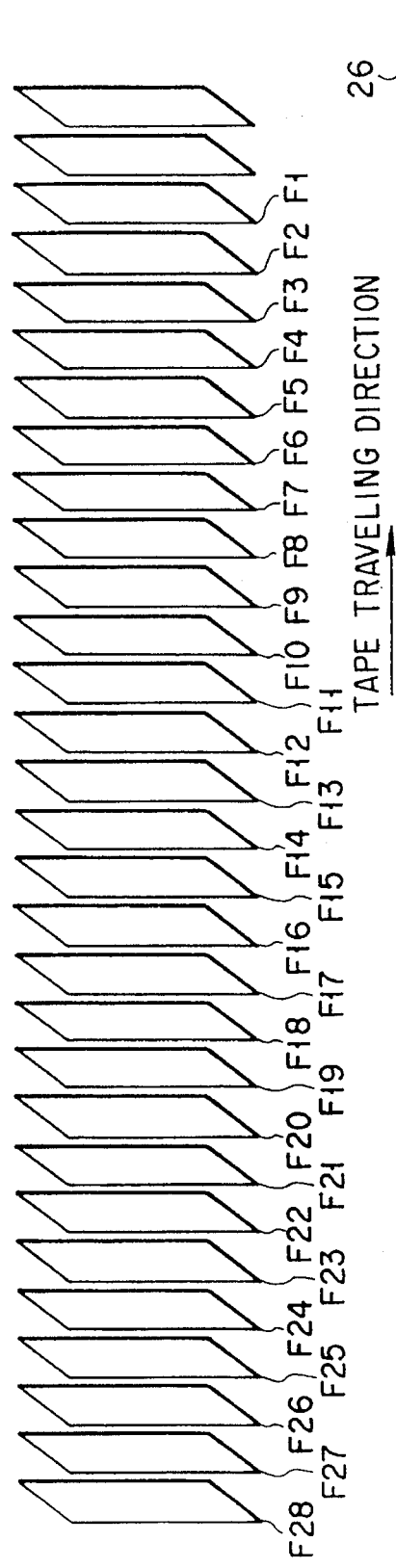
FIGS. 64(a) and 64(b) are views showing head traces in a double-speed reproduction operation in the conventional system.
Figure 64B:
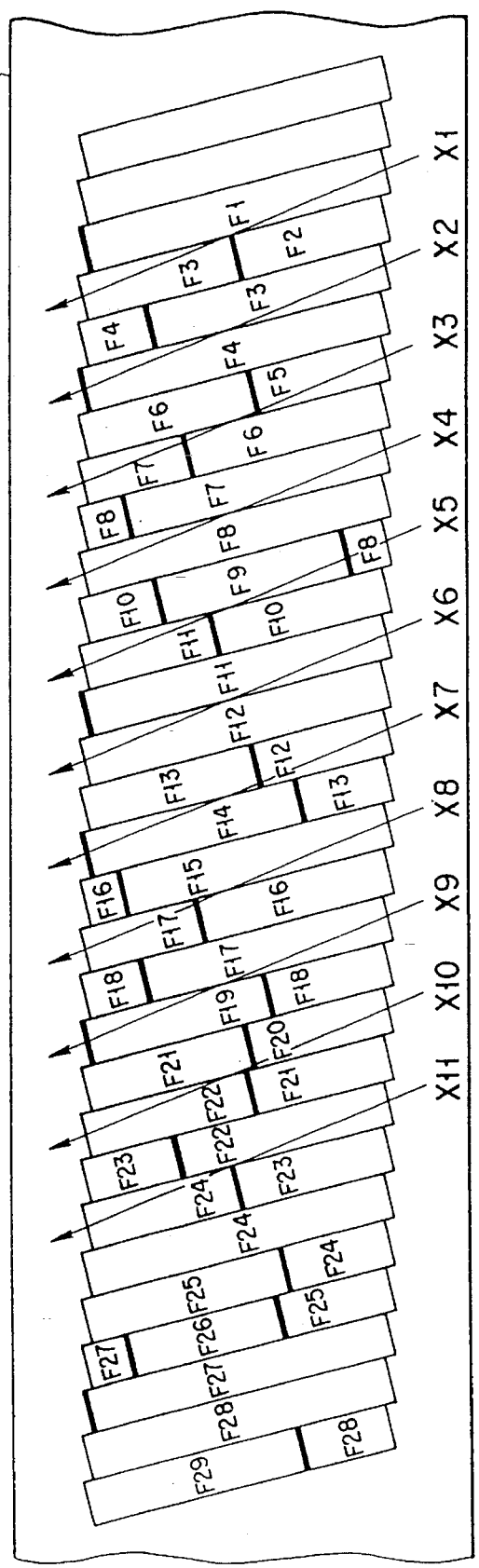
Figure 65A:
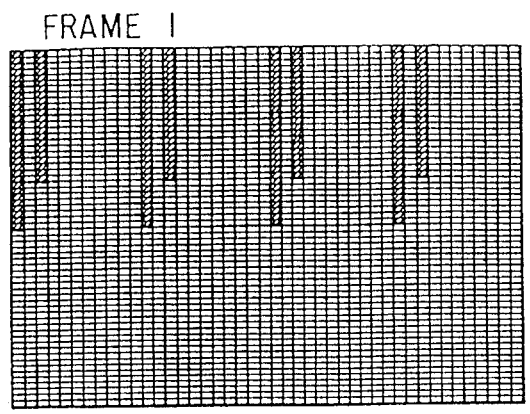
Figure 65B:
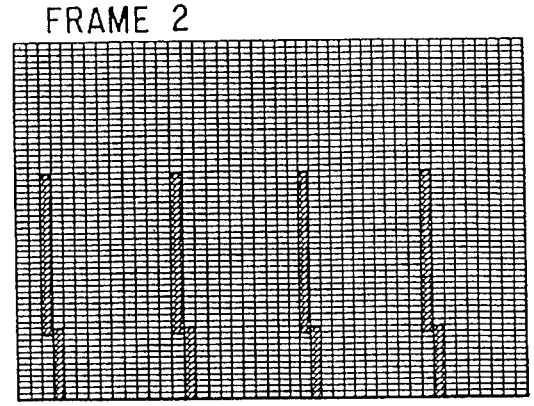
Figure 65C:
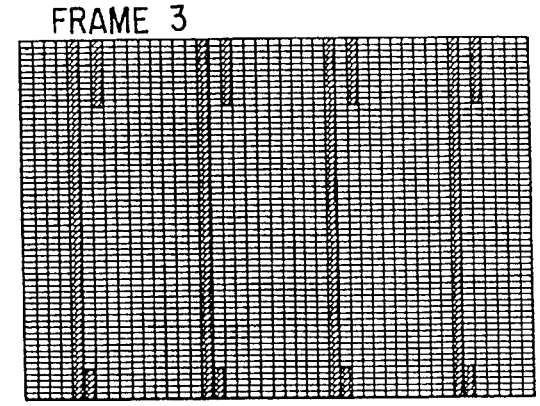
Figure 65D:
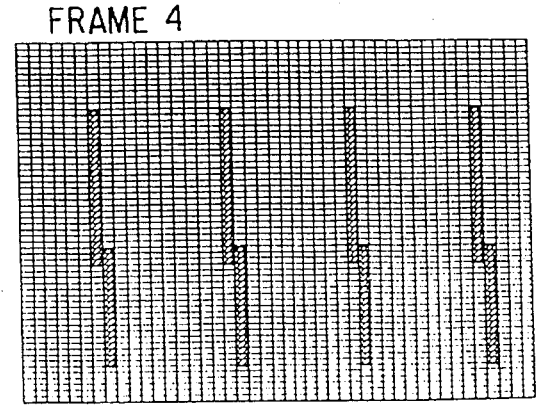

In addition, according to the conventional system, four macro-blocks are present in the horizontal direction on one frame, and each macro-block is constituted by 11 super blocks. One of the super blocks of each macro-block is forcibly subjected to intra-frame processing per frame. Furthermore, the sequence of this forcible use of intra-frame processing is included in the system control signal shown in FIG. 60(a). In this case, a super block which is subjected to this intra-frame processing is forcibly performed is called a refresh block, and a super block which is not forcibly subjected to intra-frame processing is called a non-refresh block. FIGS. 2(a) to 2(d) show the relationship between macro-blocks, refresh blocks, and non-refresh blocks.

Refresh and non-refresh blocks are defined as follows.

Refresh block: When intra-frame processing is forcibly performed in units of super blocks in macro-blocks in a one-frame period, each super block which is subjected to intra-frame processing is called a refresh block. Since each macro-block is constituted by 11 super blocks, intra-frame processing is forcibly performed at a period of 11 frames.

Non-refresh block: Super blocks other than the above-described refresh blocks are called non-refresh blocks. These super blocks include blocks which are subjected to intra-frame processing and inter-frame processing depending on the contents of an image. For example, if a scene change or the like occurs in an input video signal, a corresponding block may be subjected to intra-frame processing. This block is also defined as a non-refresh block.

There are 240 (=2,640÷11) refresh blocks in a one-frame period. In the conventional system, as shown in FIG. 16(g), 240 refresh blocks are present in a one-frame period in FIG. 16(h). If a conventional signal is directly recorded by a VTR, the positions of the refresh blocks are not specified, and fast reproduction cannot be performed, as described above.

Figure 17A:
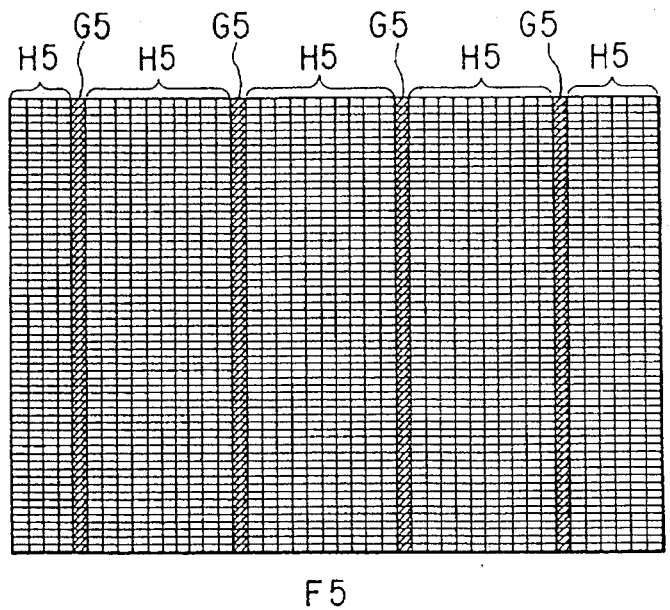
FIGS. 17(a) and 17(b) are charts showing the relationship between frame numbers $F_5$ and $F_6$ and refresh blocks and non-refresh blocks in the embodiment.
Figure 17B:
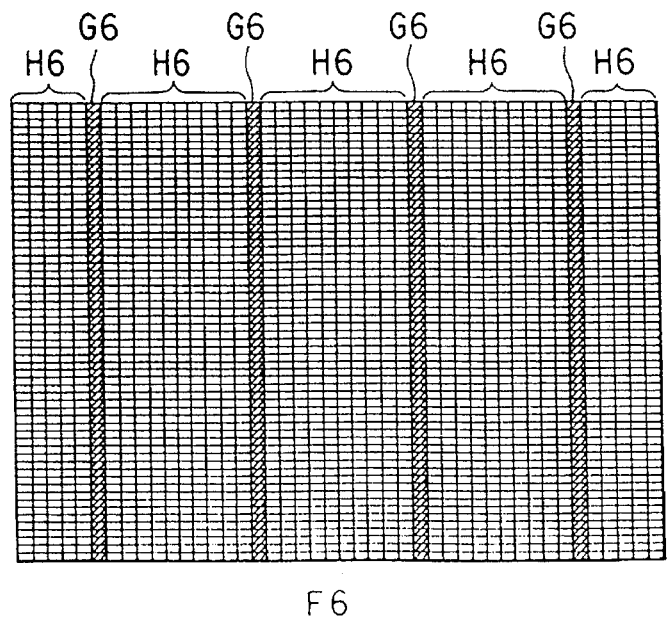

FIGS. 17(a) and 17(b) respectively show video signals corresponding to frame numbers $F_5$ and $F_6$. Referring to FIGS. 17(a) and 17(b), the portions indicated by reference symbols $G_5$ and $G_6$ correspond to refresh blocks. A refresh block number of a frame having frame number $F_n$ ($\underline{n}$ is an integer) is denoted by reference symbol $G_n$, and a non-refresh block number is denoted by reference symbol $H_n$.

In the present invention, refresh blocks and non-refresh blocks are differently arranged on a track.

Figure 66A:
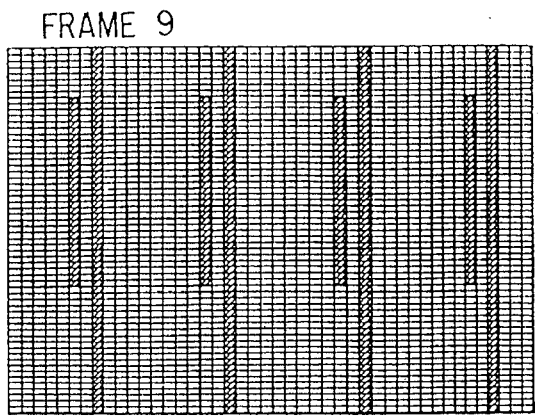
FIGS. 66(a) to 66(d) are charts showing refresh blocks, of frames 9 to 11, which can be reproduced in a double-speed reproduction operation in the conventional system, and the accumulated refresh blocks of 11 frames.
Figure 66B:
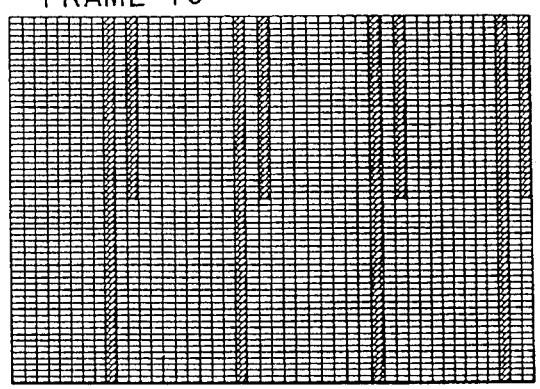
Figure 66C:
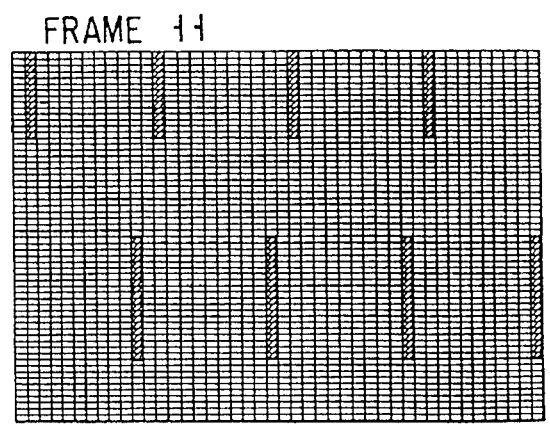
Figure 66D:
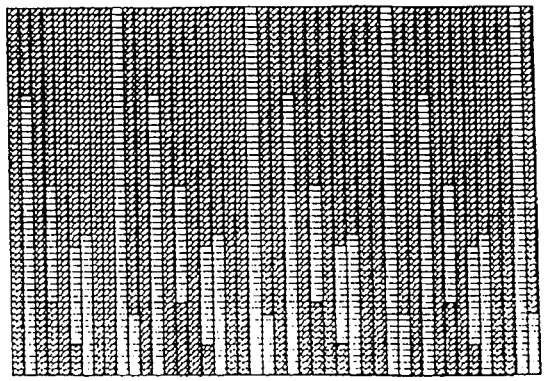

This embodiment exemplifies a case wherein recording is performed while one track is divided into two portions. If one track is divided into two portions, fast reproduction, up to double speed reproduction, can be performed. If, however, fast reproduction is performed at a speed three times or more the normal speed, all the refresh blocks cannot be reproduced, there are some regions in which images cannot be constructed, similar to the case shown in FIG. 66(d). If a fast reproduction mode realizing reproduction at a speed 20 times the normal speed is to be added to the specifications of a VTR, one track may be divided into 20 portions. If faster reproduction is to be realized, refresh blocks may be arranged at equal intervals on a track.

FIG. 16(e) shows a timing pulse signal for dividing one track into two portions. The timing pulse signal serves to divide a one-track period, shown in FIGS. 16(b) and 16(c), into two almost equal periods. Each of the divided periods is called a sector.

That is, a sector is defined as follows.

Sector: A sector is a period obtained by almost equally dividing a one-track period into $\underline{d}$ (two in this case).

In this embodiment, 120 refresh blocks are set in one sector, as shown in FIG. 16(f). With this arrangement, since one track is constituted by two sectors, 240 refresh blocks are inserted in one track. The refresh block count coincides with a refresh block count of one frame of a video signal. That is, if the number of super blocks for which intra-frame processing is periodically performed is represented by $\underline{e}$, and $\underline{b}$ intra-frame-processed signals are recorded on $\underline{c}$ tracks, a refresh block count e in one sector is given by e=b/c×d (240/2×2×120 in this case).

By performing the above-described code switching operation, refresh blocks of one frame can be arranged in a one-track period, unlike conventional systems in which refresh blocks of one frame are arranged in a one-frame period.

Figure 18:
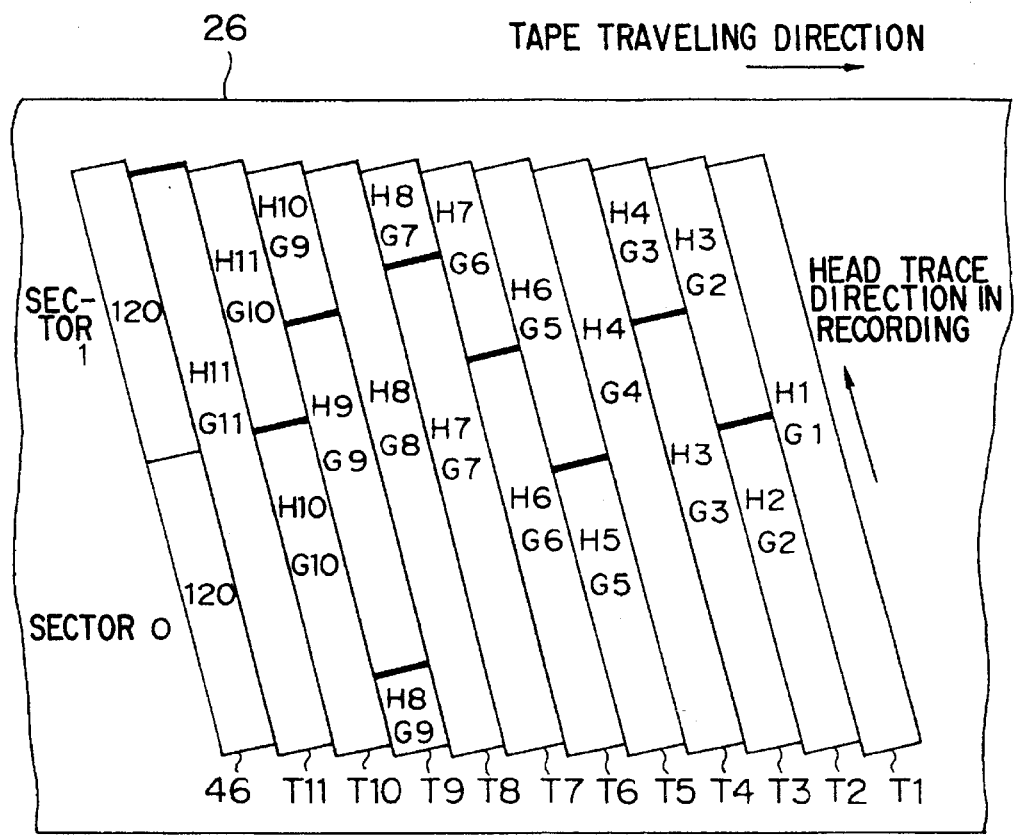
FIG. 18 is a view showing a track pattern in the embodiment.

FIG. 18 shows a track pattern. More specifically, reference symbols $G_1$ to $G_{11}$ in tracks $T_1$ to $T_{11}$ on a magnetic tape 26 correspond to refresh block numbers $G_n$ described above. Refresh blocks and tracks $T_n$ are related to each other in such a manner that a refresh block having number $G_n$ is recorded on a track $T_n$. In addition, reference symbols $H_1$ to $H_{11}$ in the tracks $T_1$ to $T_{11}$ correspond to non-refresh block numbers $H_n$. The switching points of these non-refresh blocks are indicated by the thick lines on the tracks $T_1$ to $T_{11}$.

A track 46 in FIG. 18 exemplifies the relationship between a track and sectors. The track 46 is divided into two portions, i.e., d=2 sectors. In each sector, e=120 refresh blocks are arranged. Non-refresh blocks are arranged between refresh blocks.

The tracks $T_5$ and $T_6$ as examples will be described in detail below. The refresh block $G_5$ of the frame $F_5$ is recorded on the track $T_5$. The refresh block $G_6$ of the frame $F_6$ is recorded on the track $T_6$. Non-refresh blocks are recorded on the remaining portions. The non-refresh blocks $H_5$ and $H_6$ are recorded on the track $T_5$, and the non-refresh blocks $H_6$ and $H_7$ are recorded on the track $T_6$.

In order to realize the above-described recording form, the band-compressed video code obtained by the variable length encoder 16 shown in FIG. 1 is supplied to the code switching circuit 45. The refresh timing generator 39 generates a code position signal for the above-described refresh blocks and outputs it from the output terminal 35. This code position signal is supplied to the code switching circuit 45. The code switching circuit 45 switches the positions of refresh blocks and non-refresh blocks in accordance with the sync pulse signal for variable length codes and the code position signal for refresh blocks.

More specifically, 120 refresh blocks are inserted in each of the two sectors set in one track. This processing is performed as follows. Codes are temporarily stored in a memory (not shown). The codes are then read out from the memory such that 120 refresh blocks are inserted in one sector.

An output from the code switching circuit 45 is supplied to an index inserting circuit 47. The index inserting circuit 47 inserts an index signal in the control data portion of each sector so that it can be detected during reproduction that part of a non-refresh block is separated and recorded. Note that this index signal is prepared by an index generator 48 to which the code position signal from the refresh timing generator 39 is supplied. An output from a multiplexer 49 including the index inserting circuit 47 is recorded on the 10 magnetic tape 26 through an ESC circuit 50, a unit sink inserting circuit 51, and a modulator 52.

Figure 19A:
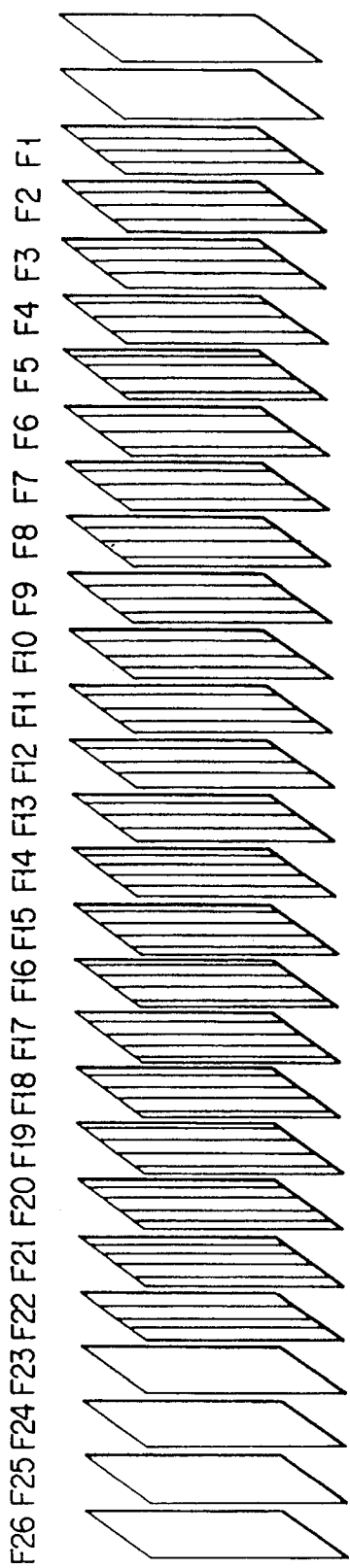
FIGS. 19(a) and 19(b) are views showing head traces in a double-speed reproduction operation in the embodiment.
Figure 19B:
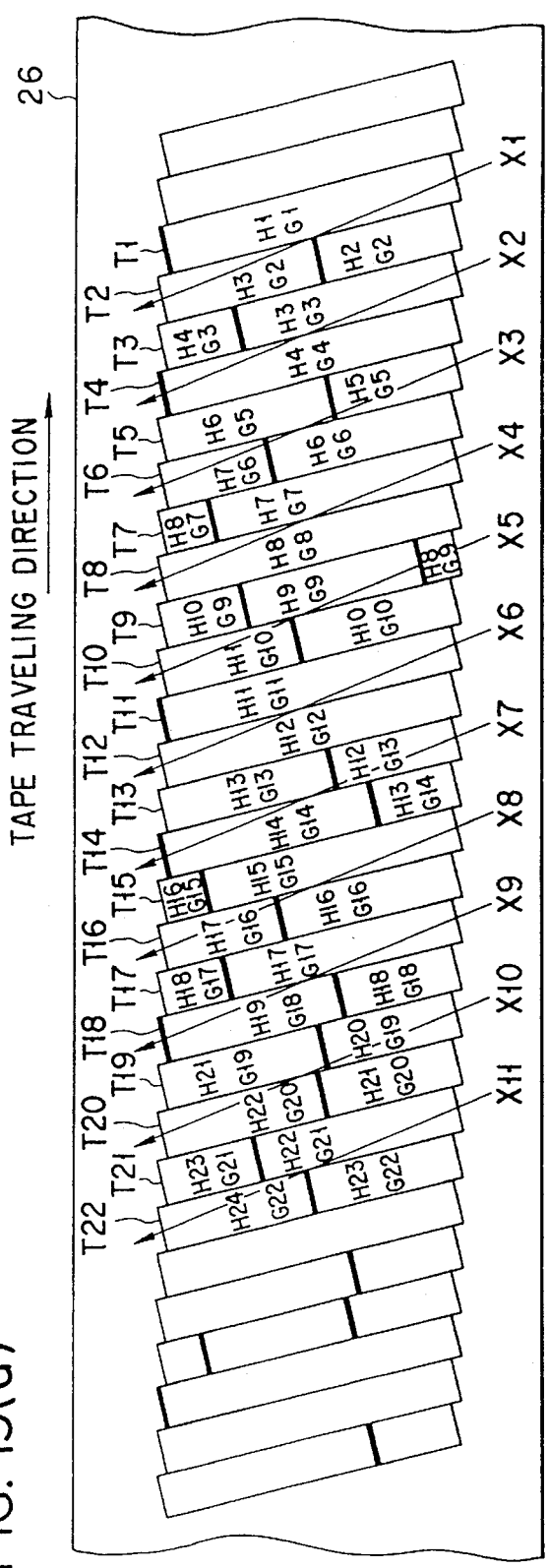
Figure 20A:
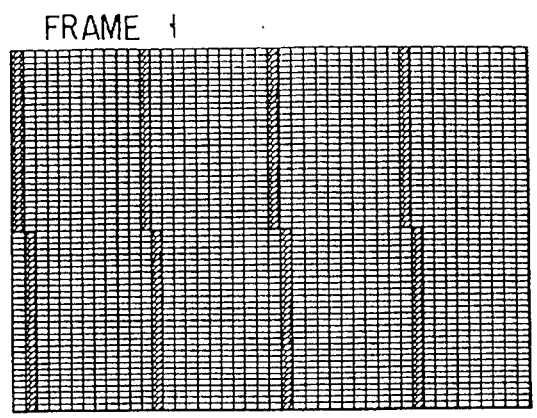
FIGS. 20(a) to 20(h) are charts showing refresh blocks, of frames 1 to 8, which can be reproduced in the embodiment.
Figure 20B:
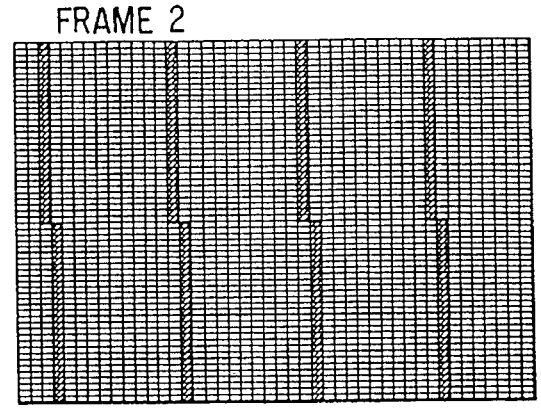
Figure 20C:
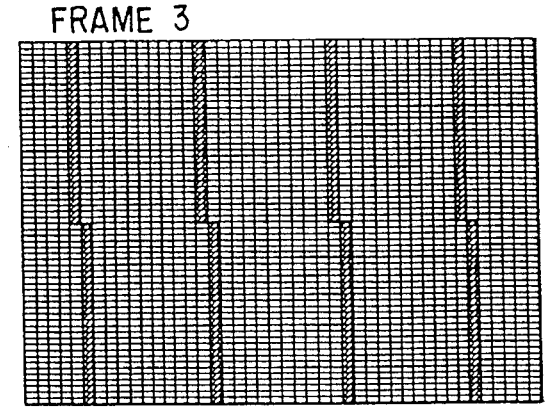
Figure 20D:
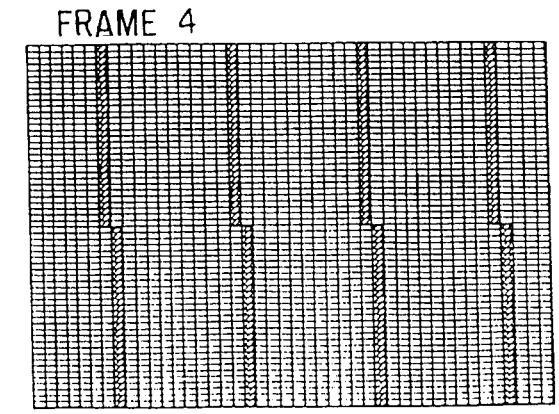
Figure 20E:
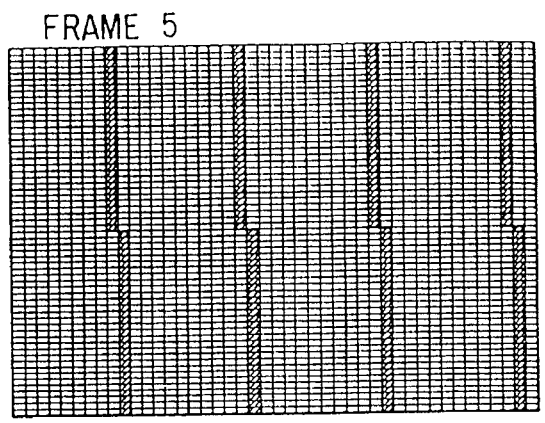
Figure 20F:
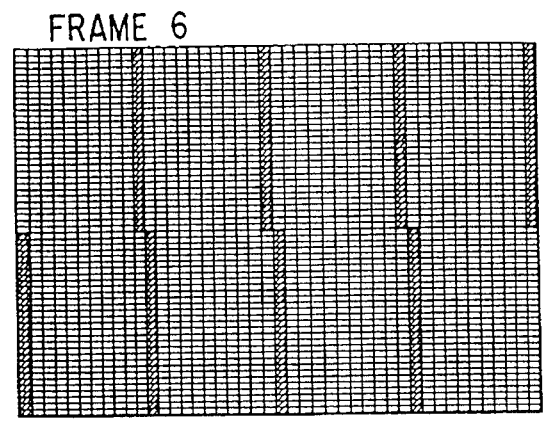
Figure 20G:
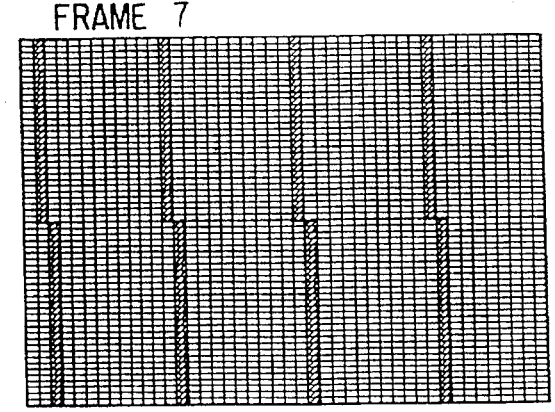
Figure 20H:
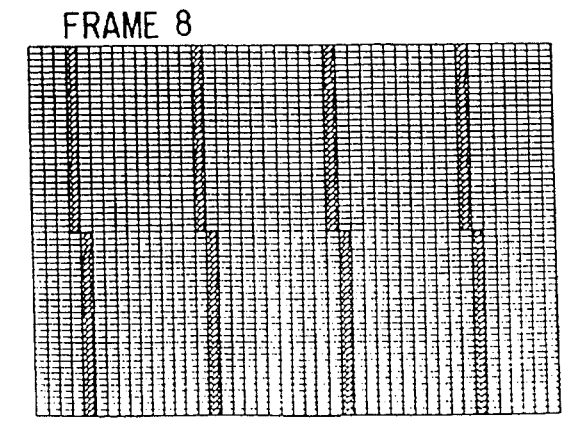

FIGS. 19(a) and 19(b) show traces $X_1$ to $X_{11}$ of a head in the double-speed reproduction mode. Note that refresh blocks $G_n$ and non-refresh blocks $H_n$ are respectively indicated in tracks $T_1$ to $T_{22}$, similar to FIG. 18. Refresh blocks which can be reproduced by the head tracing operation in the double-speed reproduction mode shown in FIGS. 19(a) and 19(b) are shown in FIGS. 20(a) to 20(h) and FIGS. 21(a) to 21(c). Frames 1 to 11 shown in FIGS. 20(a) to 20(h) and FIGS. 21(a) to 21(c) indicate refresh blocks which can be reproduced along the head traces $X_1$ to $X_{11}$ in the double-speed reproduction mode shown in FIG. 19(b).

Figure 21A:
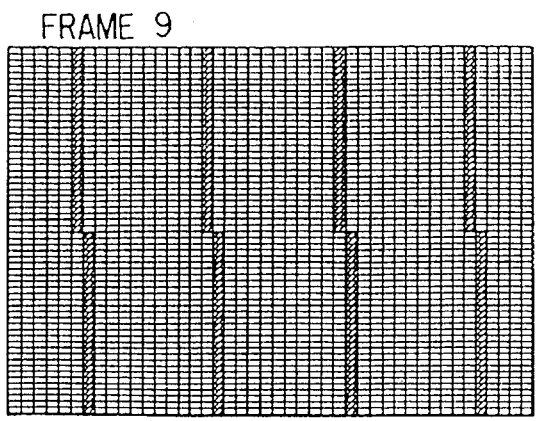
FIGS. 21(a) to 21(d) are charts showing refresh blocks, of frames 9 to 11, which can be reproduced, and accumulated refresh blocks of 11 frames in the embodiment.
Figure 21B:
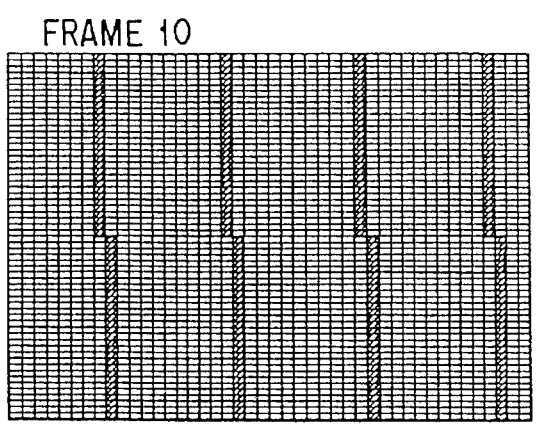
Figure 21C:
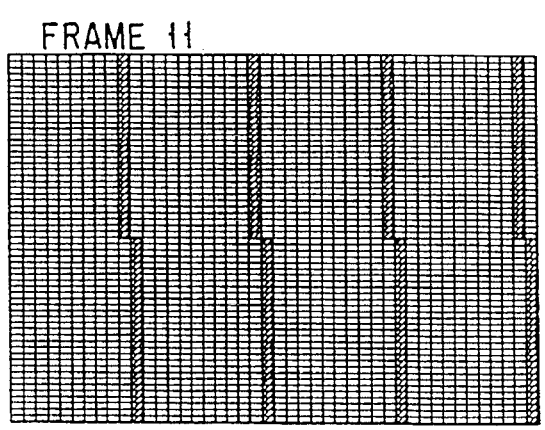
Figure 21D:
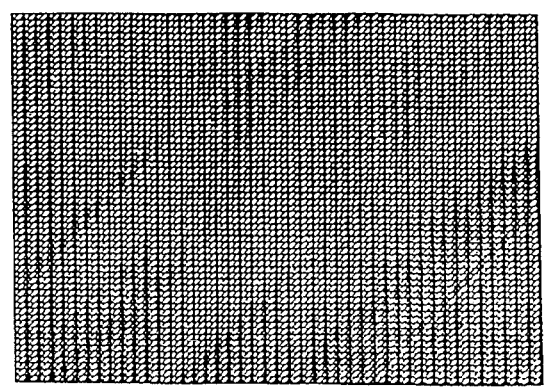

For example, in the frame 1, by making the head trace $X_1$, a refresh block $G_1$ can be displayed on the upper half of the frame, while a refresh block $G_2$ can be displayed on the lower half of the frame. Similarly, in the frames 2 to 11, refresh blocks $G_2$ to $G_{22}$ can be reproduced. Therefore, if refresh blocks, of the frames 1 to 11, which can be reproduced are accumulated, the codes in all the frame areas can be reproduced, as shown in FIG. 21(d).

Codes which are intra-frame-processed in accordance with inter-frame-processed codes and the contents of an image are inserted between codes which are periodically intra-frame-coded. These codes exhibit no correspondence between a picture area and a recording medium area.

Note that a recording medium is not limited to the magnetic tape 26. The present invention can be applied to a video disk. In this case, one rotation of the disk corresponds to one track of the tape.

9.2 Refresh block code amount

Although fast reproduction can be performed by setting refresh blocks in predetermined areas on the tracks of a VTR, it is necessary to prevent a code amount from exceeding the recordable code amount of a predetermined area.

If the code amount of a predetermined refresh block exceeds the recordable code amount of a predetermined area on a recording medium, refreshing is not performed at a position on an image which corresponds to the area in which the recordable code amount is exceeded.

Even if no measures are taken to prevent such a situation, since refreshing is performed at a given position on an image, it is highly possible to determine the contents of the image. However, in order to perform refreshing more reliably, the generation amount of codes of each refresh block must be controlled.

The code amount of a refresh block will be described in detail first.

9.3 Code amount of refresh block

Assume that a video signal is recorded by performing head scanning c=1 times per frame without using a DTF as a servo of a VT, and a reproduction speed i=2 times the normal speed is realized as a special reproduction speed, and that a refresh block code amount is calculated in units of 1/c×i=½-areas of a one-frame image. In this case, if the maximum amount of codes which can be recorded on a P=1 track formed by one scan is represented by $\alpha$, this refresh block code amount of a ½ area of one frame is controlled to be a/c×i=α/2 or less. A case where an average amount of codes of a one-frame video signal is recorded by one scan of the VTR will be described in detail below. In addition, a case where a double speed is realized as a special reproduction speed will be described. In the embodiment, since 240 refresh blocks are present in each frame, 120 refresh blocks are recorded per sector.

Figure 22A:
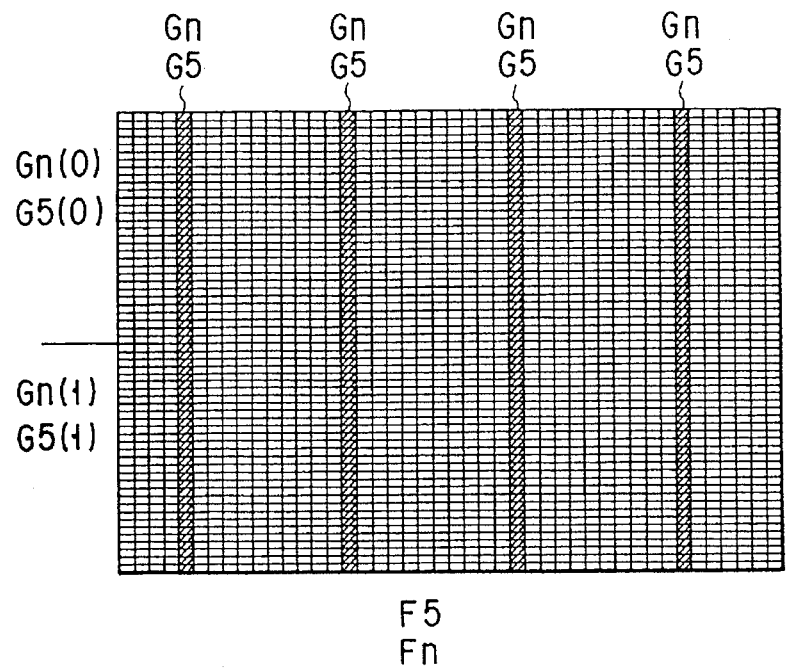
FIGS. 22(a) and 22(b) are charts showing the relationship frame numbers $F_n$ and $F_{n+1}$ in the embodiment; between refresh blocks and non-refresh blocks corresponding to FIG. 23 is a view showing head traces in a double-speed reproduction operation in the embodiment.
Figure 22B:
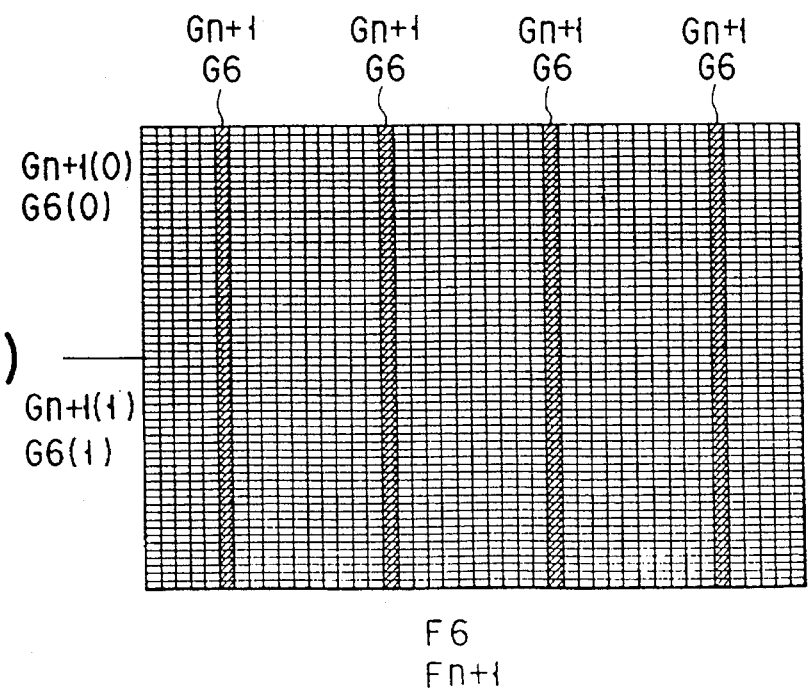

FIGS. 22(a) and 22(b) respectively show refresh blocks in one frame, and a method of dividing each refresh block. Referring to FIG. 22(a), reference symbol $F_n$ denotes an nth frame and $G_n$ denotes refresh blocks in the nth frame. 240 refresh blocks are present in this frame. "Gn(0)" and "Gn(1)" on the left side of the frame respectively indicate the upper and lower halves of each refresh block, of the 240 refresh blocks, which is divided into two equal portions in the vertical direction. More specifically, $G_n(0)$ indicates 120 refresh blocks, of the $G_n$ refresh blocks, which are located in the upper half of the frame, whereas $G_n(1)$ indicates 120 refresh blocks located in the lower half of the frame. FIG. 22(b) shows refresh blocks corresponding to frame number $F_{n+1}$. The definitions of $G_{n+1}(0)$ to $G_{n+1}(1)$ are the same as those described with reference to FIG. 22(a).

Figure 23:
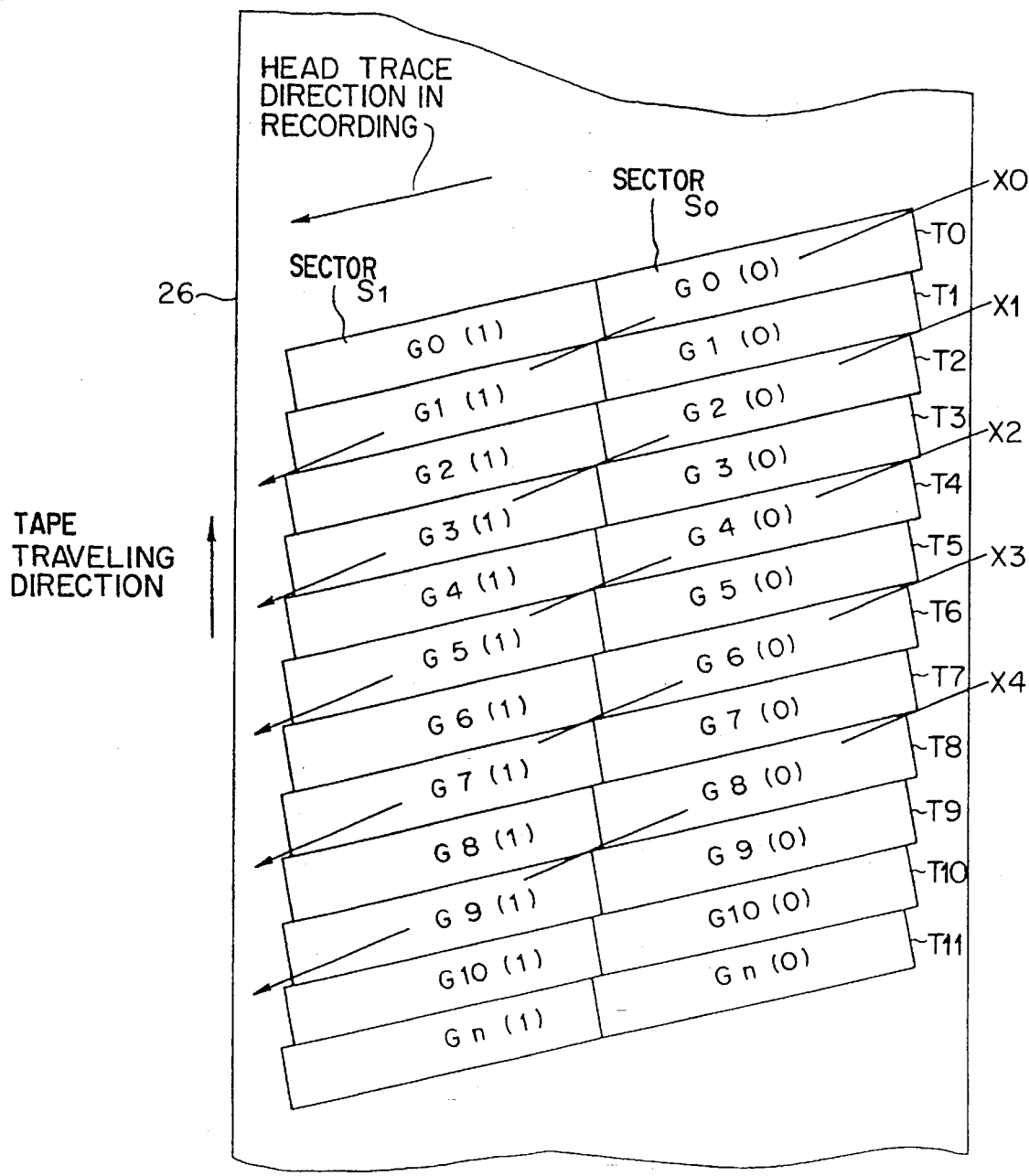

The track pattern of the VTR will be described next. FIG. 23 shows the track pattern of the magnetic tape 26. Reference symbols $T_O$ to $T_{11}$ denote tracks on which codes are recorded by using the rotary drum 43. Assume that the average generation amount of codes of one frame are recorded on one track. That is, a case of c=1 will be described. This case corresponds to the case wherein b=240 refresh blocks are recorded on one track. That is, the refresh blocks $G_n$ corresponding to frame number $F_n$ are recorded on the track $T_n$.

In this arrangement, when double-speed reproduction is to be performed, the reproduction head crosses two tracks. Therefore, while ½ areas obtained by dividing one track into two almost equal areas are reproduced, reproduction signals are obtained from two tracks. If one of two divided areas is called a sector, since each frame constitutes one track, two sector numbers $S_0$ and $S_1$ are assigned, as shown in FIG. 23.

Assume that each area obtained by almost equally dividing one track by $d$ is generally termed a sector.

In order to realize fast reproduction at a speed times the normal speed, since the head crosses $i$ tracks, a 1/i area of one track is reproduced. If the maximum reproduction speed is represented by $i_{max}$, $i_{max} \leq d$ is set. Sector names are represented by $S_0$ to $S_{d-1}$.

The relationship between refresh blocks and a sector will be described below. When the refresh blocks $G_n$ corresponding to frame number $n$ are recorded on one track $T_n$, recording is performed in the order of $G_n(0), \ldots, S_0, G_n(1), \ldots, S_1$.

Assume that a uniform number of refresh blocks are inserted in each sector. In this case, the number of refresh blocks inserted in one sector is set as follows. If the number of refresh blocks per frame is represented by $b$; the number of tracks on which the $b$ refresh blocks are recorded is represented by $c$; the division count of a track is represented by, $d$; and the number of refresh blocks inserted in one sector is represented by, $e$, then $e=b/c \times d$. That is, $e=240/1 \times 2=120$.

Referring to FIG. 23, the head traces $X_0$ to $X_4$ indicate head traces in the double-speed reproduction mode. More specifically, along the head trace $X_0$, the sector $S_0$ (refresh block $G_0(0)$) of the track $T_0$, the sector $S_1$ (refresh block $G_1(1)$) of the track $T_1$, and the sector $S_0$ (refresh block $G_2(0)$) of the track $T_2$ can be reproduced.

In this case, since the recordable capacity of each of the sectors $S_0$ and $S_1$ of the recording medium on the tape 26 is predetermined, the generation amount of codes of the refresh blocks $G_n(0)$ and $G_n(1)$ must be limited to the recordable amount or less.

Assume that a DTF is not used. In this case, if the reproduction speed is set to be a speed $i$ times the normal speed, a $1/i$ area of each of e tracks formed by one scan is traced.

As described above, if the maximum amount of codes that can be recorded on tracks formed by one scan is represented by a, and a video signal is recorded by performing a scan operation $c$ times for each frame, the maximum code amount of a $1/c \times i$ area of refresh blocks of one frame must be limited to $\alpha/i$ or less. Note that in this case, as a special reproduction head, a head having an excessively large head width is not used.

Assume that a DTF as a servo scheme for a VTR is used. In this case, if the maximum amount of codes that can be recorded on $p$ tracks formed by one scan is represented by $\alpha$, and a video signal is recorded by performing a head scan operation $c$ times for each frame, the maximum code amount of refresh blocks in a $1/c$ area of a one-frame image must be limited to $\alpha$ or less.

10. Code amount control

There are two code amount control methods. In the first method, the quantization level is controlled in the same manner as described above. In this case, since the generation amount of codes of refresh blocks is suppressed, the image quality of each refresh block inevitably deteriorates. However, since the difference between an intra-frame-processed signal of refresh blocks and a video signal of the next frame is sent to the next frame, a deterioration in image quality occurs only instantly. This method will be described in detail later.

In the second method, a quantized code is divided into two portions so that the code amount of an MSB or a low-frequency component is limited to a code amount allowing the codes to be read out when fast reproduction is performed by a recording medium such as a VTR. This method will be described in detail in Part 11.

Control of a coded information amount by using the first method will be described next.

10.1 Macro-block code amount control

If highly efficient coding of a video signal is performed by using the variable length coding scheme, the generation amount of information generally varies. This is because the information amount of the video signal varies with time.

When a transmission system with a fixed rate is to be used, coding control is required to limit the coded information amount to a constant level.

According to a general technique for realizing a fixed rate, a buffer memory is prepared at the output of an encoder so that data is input to the buffer memory at a variable rate, and data is output at a fixed rate to level the coded information amount. Since the amount of data in the buffer memory varies depending on the amount of input information, an overflow or an underflow may occur. In order to prevent such a situation, a coding parameter is changed to decrease or increase the coded information amount when an overflow or an underflow tends to occur. For example, the quantization levels may be decreased or increased.

Although the leveling effect is enhanced with an increase in capacity of the buffer memory, limitations are improved on the capacity in terms of coding delay or cost.

Since a relatively small buffer memory can perform fine coding control in accordance with a local characteristic of an image, a buffer memory having a capacity corresponding to about one frame is used in some case.

Macro-block amount control will be described in detail below.

Figure 24:
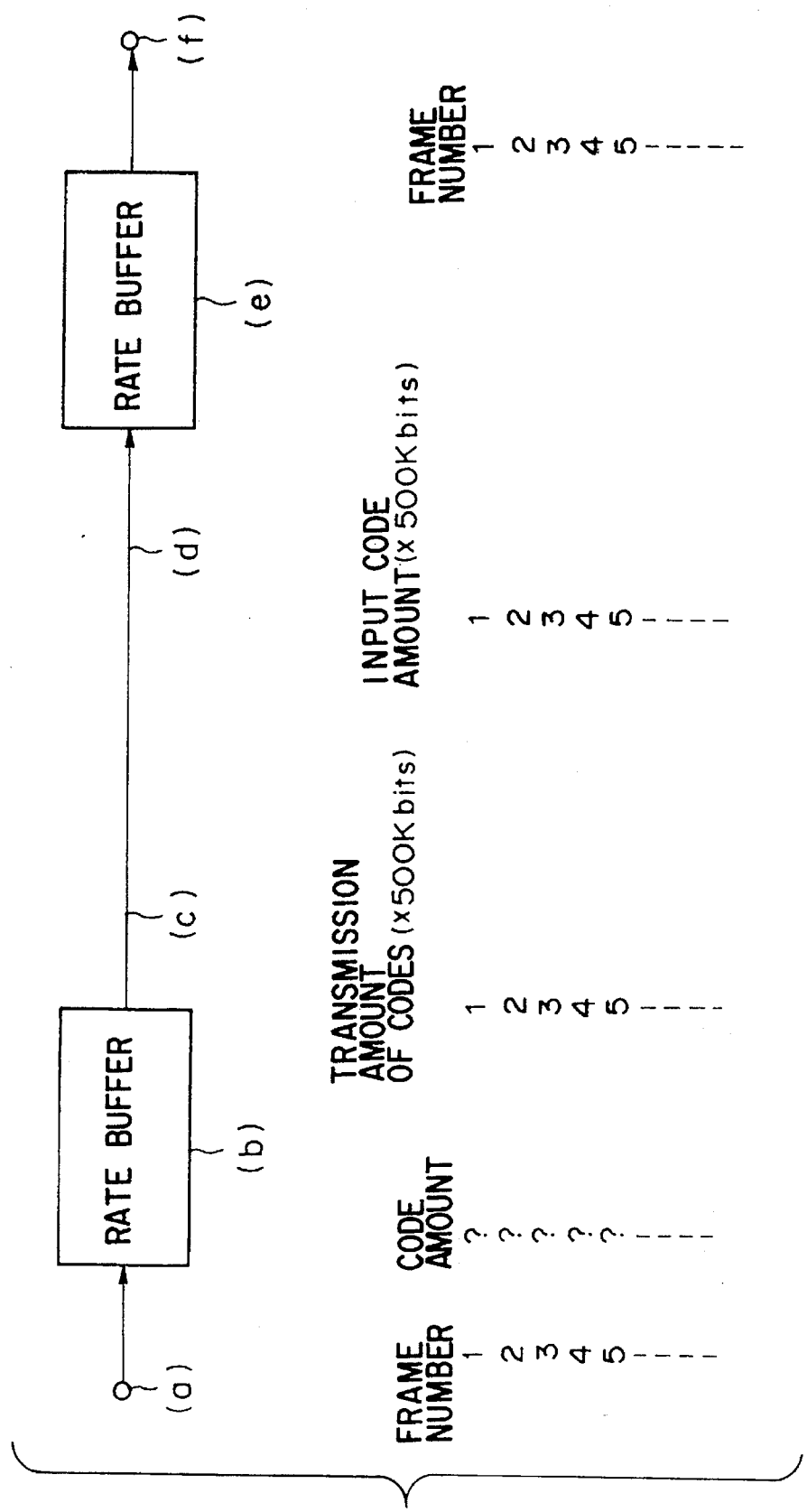
FIG. 24 is a view showing the arrangement of a rate buffer.

Macro-block code amount control is performed by using the capacities of rate buffers. In the method using the rate buffers, as shown in FIG. 24, each of an encoder and a decoder incorporates a rate buffer having the same capacity.

The input/output code amounts and occupancy ratios of the buffers will be described with reference to FIG. 24. Referring to FIG. 24, reference symbol $a$ denotes an input signal to a rate buffer $b$ of the encoder. This signal is an output signal from the variable length encoder 16. The signal is characterized as follows. The respective blocks are input at a predetermined period. However, since the generated codes of each block are variable length codes, a variable length rate is set. In addition, an output signal $c$ from the rate buffer of the encoder is transmission data, and the corresponding codes are output at a fixed rate. Furthermore, an input signal $d$ to a rate buffer $e$ of the decoder is a code input to be input at a fixed rate. An output signal $f$ is a code output to be output at a variable rate.

Encoder- and decoder-side characteristics will be described in detail below with reference to FIGS. 25(*a*) to 26(*c*). Referring to FIGS. 25(*a*) to 25(*c*) and FIGS. 26(*a*) to 26(*c*), the abscissas indicate frame numbers. In FIGS. 25(*a*) to 25(*c*) and FIGS. 26(*a*) and 26(*b*), the frame numbers coincide with the frame numbers of inputs. However, the frame numbers in FIG. 26(*c*) are shifted from them by 8 frames. This shift is required to absorb variations in delay of transmission codes from the encoder and the decoder due to the use of variable length codes.

The ordinates in FIGS. 25(*a*) to 25(*c*) and FIGS. 26(*a*) to 26(*c*) indicate code amounts. In this case, the capacity of each rate buffer is 4 Mbits, and the transmission amount of codes per frame is 0.5 Mbits/frame. Note that FIGS. 25(*a*) to 25(*c*) show the encoder-side characteristics, whereas FIGS. 26(*a*) to 26(*c*) show the decoder-side characteristics.

FIG. 25(*a*) shows the generation amount of codes per frame. The broken line in FIG. 25(*a*) indicates the capacity of the rate buffer as a reference. Since variable length codes are used, the generation amounts of codes of the respective frames vary. At frame numbers $F_1$ to $F_9$ of frame numbers $F_n$, generation amounts of codes which cause an overflow and an underflow in the buffer are indicated. At $F_1$, codes of 4.5 Mbits are generated. At $F_2$ to $F_9$, no codes are generated.

The maximum generation amount of codes of each frame is determined by the sum of the capacity of the buffer and the transmission amount of codes. In this embodiment, since the capacity of each buffer is 4 Mbits and the transmission amount of codes per frame is 0.5 [M bits/frame], the maximum generation amount of codes per frame is 4.5 Mbits. At $F_{20}$ to $F_{30}$, the generation amount of codes of each frame is controlled in accordance with the occupancy ratio of the buffer.

Figures 25A, 25B, 25C:
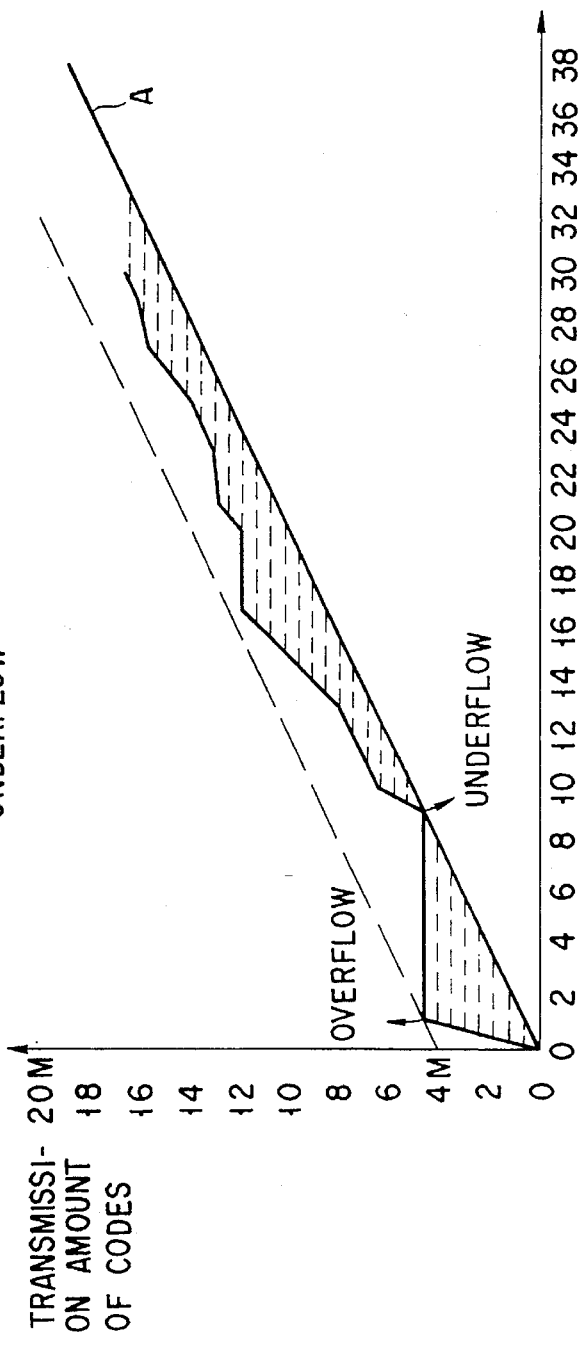
FIGS. 25(a) to 25(c) are graphs showing an operation of a rate buffer on the encoder side.

FIG. 25(b) shows the occupancy ratio of the buffer of the encoder. In this case, the capacity of the buffer is set to be 4 Mbits, and the capacity is indicated by the broken line. Since a large number of codes are generated in the frame having frame number $F_1$, the buffer overflows at a time corresponding to $F_1$. Since no codes are generated in the interval from $F_2$ to $F_9$, the buffer underflows at a time corresponding to $F_9$.

FIG. 25(c) shows the amount of codes transmitted from the encoder. Referring to FIG. 25(c), a solid line A obliquely extending from the origin indicates the accumulated transmission amount of codes. The gradient of the line indicates the transmission amount of codes per frame. In this case, 0.5 Mbits are transmitted per one-frame time. If the frame rate is 30[Mz], the transmission amount of codes is 30×0.5 [M/Frame]=15 [Mbps]. In addition, the broken line in FIG. 25(c) indicates the maximum value determined by the maximum capacity of the buffer.

The polygonal line in FIG. 25(c) indicates the accumulated generation amount of codes. The amount corresponds to the integral value of the generation amount of codes per frame in FIG. 25(a). When the polygonal line indicating this accumulated generation amount codes comes into contact with the broken line, the buffer overflows. When the polygonal line comes into contact with the solid line, the buffer underflows. In addition, the horizontal broken lines drawn between the polygonal line indicating the accumulated generation amount of codes and the solid line indicating the accumulated transmission amount of codes indicate delays in the encoder buffer in transmitting the generated codes. A longer broken line indicates a longer period of time it takes to perform transmission.

Referring to FIG. 26(a), a solid line B indicates the accumulated reception amount of codes. This solid line B coincides with the solid line A in FIG. 25(a). The polygonal line indicates the decoding amount of codes of each frame when an image is output. This amount corresponds to the integral amount of the decoding amount of codes per frame in FIG. 26(c). In addition, the horizontal broken lines indicate delays in decoding received codes. The sum of the delays in the encoder is equal to the sum of the delays in decoder, which is also equal to the buffer delay shown in FIG. 26(b).

FIG. 26(b) shows the occupancy ratio of the buffer of the decoder. When FIG. 25(b) is compared with FIG. 26(b), it is found that if the plot in FIG. 25(b) is shifted by an amount corresponding to the buffer delay, the plots in FIGS. 25(b) and 26(b) have an inverse relationship in the vertical direction. That is, when the encoder overflows, the decoder underflows, and vice versa.

FIG. 26(c) shows the decoding amount of codes per frame. The timing of FIG. 26(c) is delayed from that of FIG. 25(a) by the buffer delay between the encoder and the decoder.

when a subscriber changes the channel, a video signal can be output after a required number of codes are accumulated in the buffer of the decoder. This accumulation amount is equal to the accumulation amount of received codes for the period of time indicated by the broken line in FIG. 26(a). This value has correlation with an NMP signal in the conventional system. That is, a video signal may be output from the decoder after codes are accumulated in the buffer for the period of time determined by the NMP signal.

If the maximum amount of codes are generated in the first frame as indicated by $F_1$ in FIG. 25(a), the maximum buffer delay is caused in the buffer of the decoder. In this case, a proper video signal can be output after received codes are accumulated for the period of time corresponding to "buffer delay" in FIG. 26(b). In this case, after the buffer of the decoder is filled with received codes, a proper video signal can be output.

More specifically, received codes are accumulated in the interval between $F_0$ and $F_8$, and a proper video signal is output after the buffer memory is filled with the codes to complete initialization. When video codes are output at $F_1$ in FIG. 26(c), the buffer of the decoder underflows. When no video codes are output in the interval between $F_1$ and $F_9$, the buffer of the decoder overflows at $F_9$. This state is equivalent to a state wherein the buffer state of the encoder is delayed by 8 frames, and the overflow and underflow are inverted.

When the subscriber changes the channel, in order to output a proper video signal, the buffer of the coder must accumulate codes for the period of time determined by the NMP signal. However, an imperfect image can be output at the time of initialization, as indicated by the broken line in FIG. 26(c).

Figure 27:
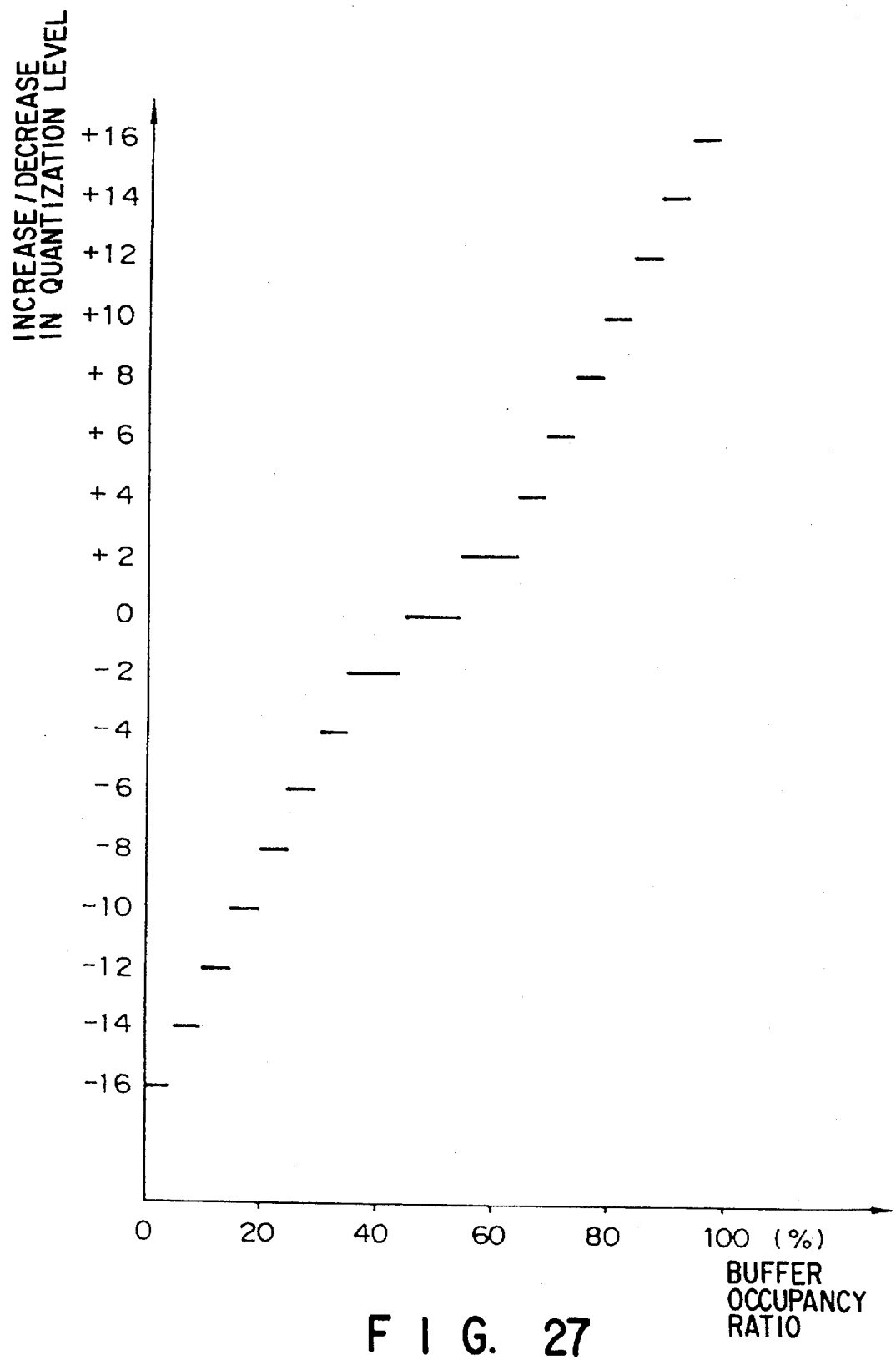
FIG. 27 is a graph showing increases/decreases in buffer occupancy ratio and quantization level.

FIG. 27 shows a relationship between the occupancy ratio of the buffer and an increase/decrease in quantization level set in units of macro-blocks. While the occupancy ratio of the buffer is kept at a predetermined value, the quantization level is not changed. If it exceeds a predetermined value, the quantization level is changed. Referring to FIG. 27, while the occupancy ratio of the buffer is 45 to 55%, the quantization level is not changed. If it exceeds 45 to 55%, the quantization level is changed. With this operation, rate control of the buffer can be performed.

As the value of j is increased, coarser quantization is performed, and the generation amount of codes is reduced. Therefore, the quantization level is lowered with a decrease in the occupancy ratio of the buffer, and vice versa.

Figure 28:
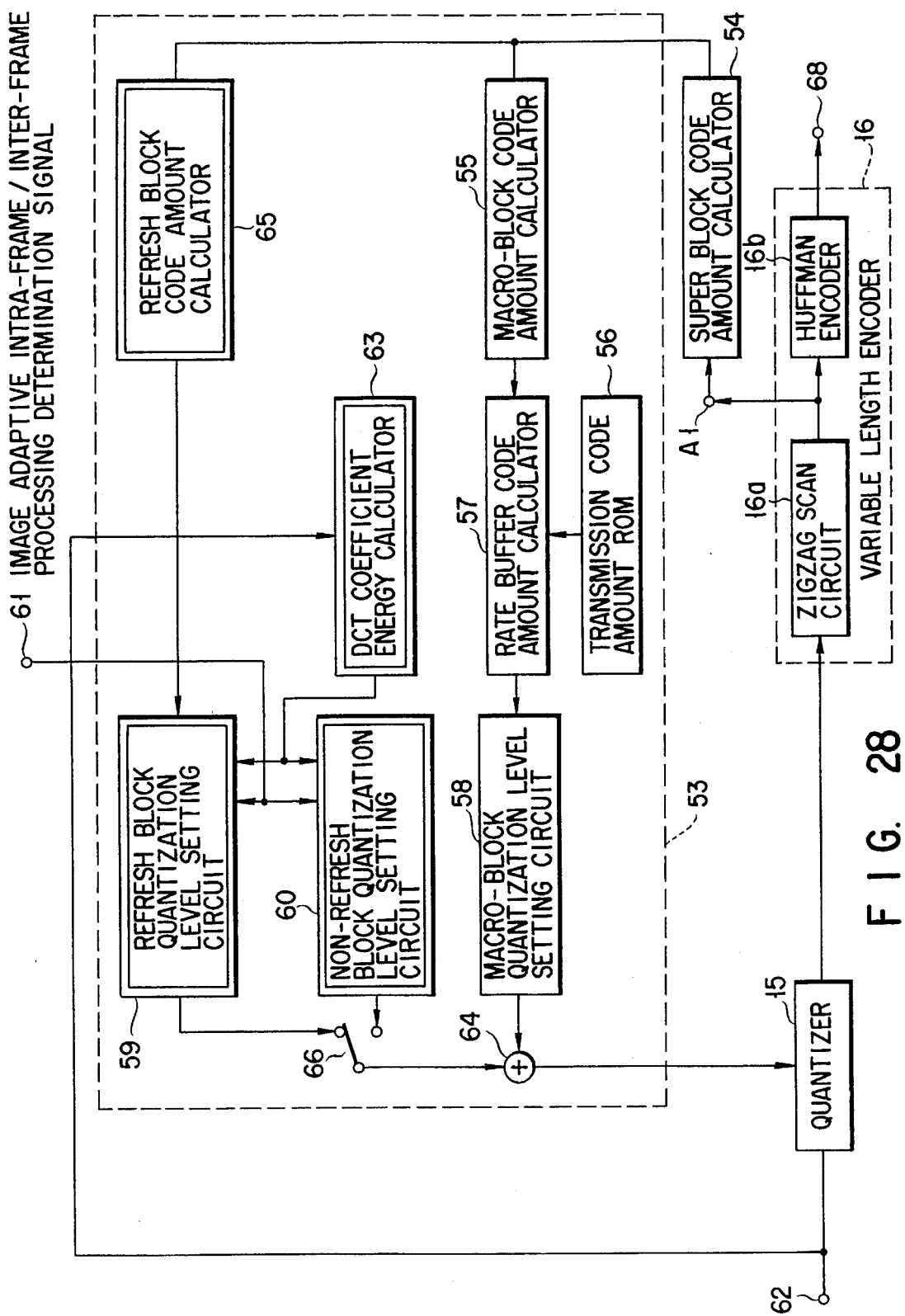
FIG. 28 is a block diagram showing a detailed arrangement of a quantization level setting circuit in the embodiment.

FIG. 28 shows an arrangement for realizing the above-described operation.

In order to determine a macro-block quantization level, a quantization level setting circuit 53 and a super block code amount calculator 54 are used.

A method of calculating a super block code amount will be described in detail first with reference to FIG. 28.

An output from the quantizer 15 is input to the variable length encoder 16. In the circuit 16, a zigzag scan circuit 16a reads 8×8 DCT coefficients by the scan method shown in FIG. 10, combines zero coefficient counts and the amplitudes of non-zero coefficients, and supplies the resultant sets to a Huffman encoder 16b.

In addition, the zero coefficient counts and the amplitudes of non-zero coefficients are input to the super block code amount calculator 54. The super block code amount calculator 54 calculates the amount of generated codes by using a ROM storing the table shown in FIG. 29.

The table shown in FIG. 29 is also used in the conventional system. The abscissa indicates the amplitudes of non-zero coefficients, and the ordinate indicates the number of continuous zero coefficients. The numbers in FIG. 29 indicate code bit counts. The generation amounts of codes are calculated in units of super blocks by adding these code bit counts.

In addition, in order to determine a quantization level for macro-blocks, a macro-block code amount is calculated by adding the code amounts of 11 super blocks.

A transmission code amount stored in a transmission code amount ROM 56 is subtracted from the calculated value, and the occupancy ratio of the rate buffer included in the code switching circuit 45 is calculated by a rate buffer code amount calculator 57.

Quantization levels are set in units of macro-blocks by the macro-block quantization level setting circuit 58 on the basis of this rate buffer occupancy ratio and the graph shown in FIG. 27.

10.2 Super block code amount control

Code amount control in units of super blocks can only be performed in the direction in which the number of quantization levels is smaller than that of quantization levels determined by macro-blocks.

The reason for this is that if, for example, an intra-frame-processed super block is present, since a code amount obtained after intra-frame processing is larger than a code amount obtained after inter-frame processing, the code amount of the intra-frame-processed super block may be greatly increased.

According to the human visual characteristics, if, for example, a scene change occurs or a portion hidden by an object appears (this phenomenon is called "covered back"), the eyes cannot quickly respond to the definition of the appearing image, and it takes a predetermined period of time for adjustment.

For this reason, even if the number of quantization levels is decreased with respect to an intra-frame-processed portion produced by a change in content of an image, a deterioration in image quality is difficult to detect. That is, the code amount of a portion which has undergone image adaptive intra-frame processing can be reduced.

An arrangement for realizing this operation will be described below with reference to FIG. 28.

Figure 30A:
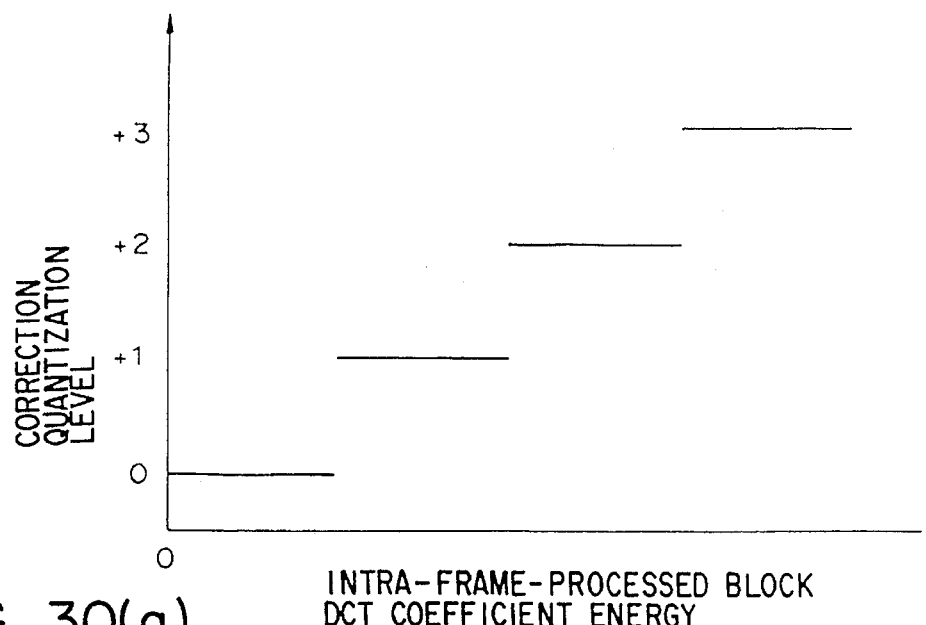
FIGS. 30(a) and 30(b) are graphs each showing the relationship between DCT coefficient energy and correction quantization level.

A refresh block quantization level setting circuit 59, which corresponds to a super block quantization level setting circuit, and a non-refresh block quantization level setting circuit 60 receive an image adaptive intra-frame/inter-frame processing determination signal output from the energy comparator 36 in the intra-frame/inter-frame processing determination circuit 31 through an input terminal 61. In addition, an output signal from the DCT circuit 14 is input to a DCT coefficient energy calculator 63 through an input terminal 62. The calculator 63 then calculates the energy of DCT coefficients. A correction level for the quantization level is determined on the basis of the calculated energy. This value is added to the macro-block quantization level by an adder 64, and the resultant value is input to the quantizer 15. FIG. 30(a) shows the relationship between the energy and the correction level.

Figure 30B:
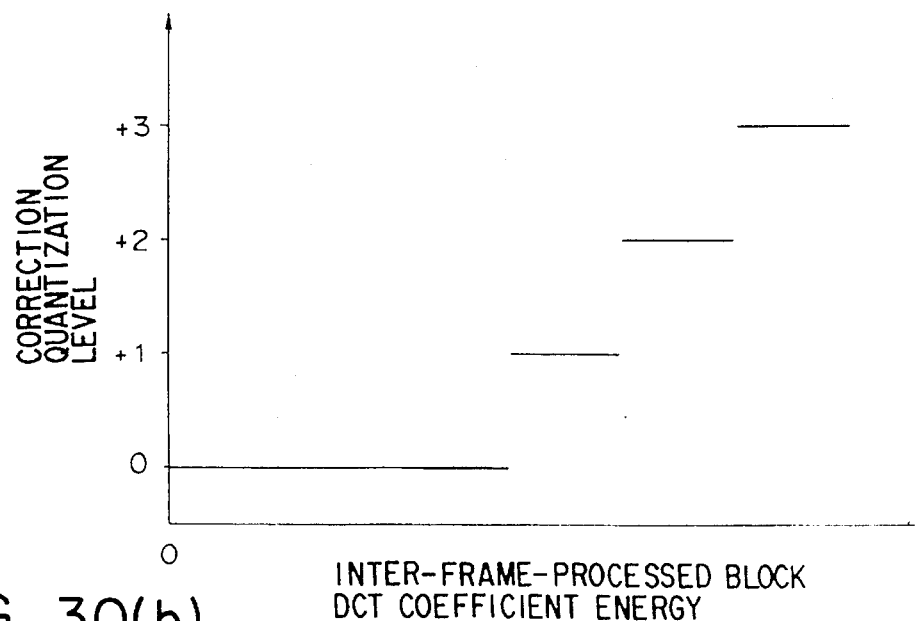

If an intra-frame-processed super block has an excessively high energy, it means that the block includes many high-frequency components. In this case, it is also difficult to detect a deterioration in image quality. Therefore, coarse quantization can be set. In this case, a correction level is set, as shown in FIG. 30(b).

10.3 Refresh block code amount control

As described in Part 9.2, the generation amount of codes of a refresh block must be limited to a predetermined code amount determined by a recording medium such as a VCR.

In order to realize this, in this embodiment, the code amounts of refresh blocks are independently calculated, and quantization levels for the refresh blocks are set by using the calculated values. For this purpose, a refresh block code amount calculator 65 and the refresh block quantization level setting circuit 59 are used.

The generation amounts of codes of refresh blocks are output from the super block code amount calculator 54, and the code amounts of the refresh blocks are sequentially added by the refresh block code amount calculator 65. In this embodiment, addition of code amounts is repeatedly performed in a period of 120 super blocks set in one sector on the tape 26.

By inputting the resultant value to the refresh block quantization level setting circuit 59, a correction value is determined from the macro-block quantization level.

Note that the refresh block quantization level setting circuit 59 is also used to realize the super block code amount control method described in Paragraph 10.2.

An output from the refresh block quantization level setting circuit 59 is input to the quantizer 15 through a switch 66 and the adder 64 for adding a correction value to the macro-block quantization level.

Figure 31:
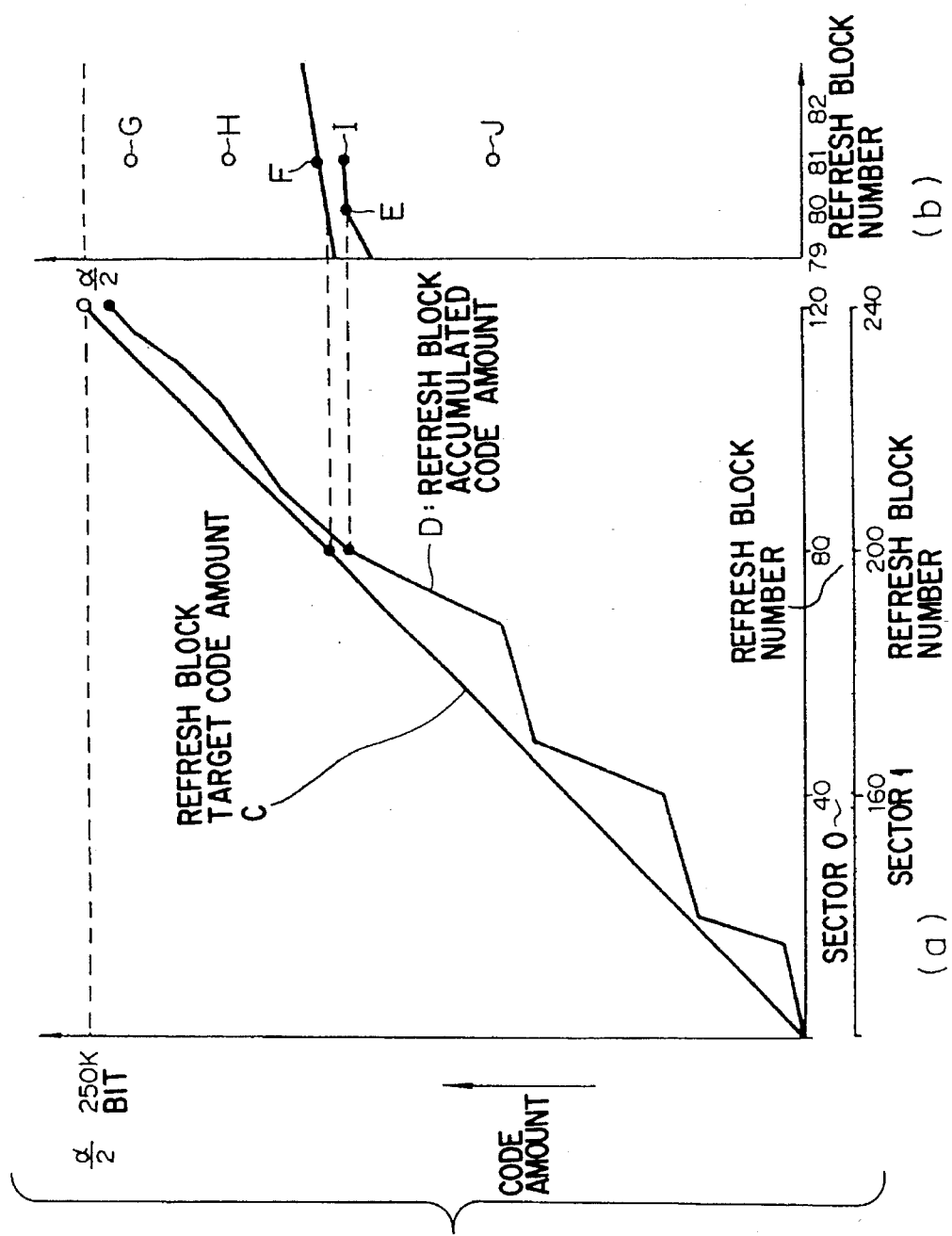
FIG. 31 is a graph for explaining a control operation of the code amount of refresh blocks.

FIG. 31 shows a method of setting a refresh block quantization level.

Referring to FIG. 31, the abscissa indicates refresh block numbers. In the embodiment, since the refresh blocks of one frame are recorded on two sectors, refresh block numbers corresponding to sectors 0 and 1 are exemplified. In this case, 120 refresh blocks are set so as not to exceed the recording code amount $\alpha/2$ of one sector.

The ordinate in FIG. 31 indicates the code amounts of the refresh blocks. As described above, the maximum code amount is set to be $\alpha/2$. Assume that $\alpha/2=250$ kbits. Referring to FIG. 31(a), a solid line C represents the target code amount of a refresh block. A generation amount of codes is controlled so as not to exceed this line. Note that the solid line C is an example used for control, and hence need not be a straight line. It is only required that the generation amount of codes per sector be limited to $\alpha/2$ or less. A polygonal line D represents changes in accumulation amount of refresh block codes. The polygonal line D corresponds to an output signal from the refresh block code amount calculator 65. A quantization level is determined so as not to exceed the target refresh block code amount (solid line C).

An operation of setting a macro-block quantization level and a refresh block quantization level will be described below with reference to FIG. 32.

As shown in FIG. 28, a macro-block quantization level is determined on the basis of the occupancy ratio of the buffer memory. This macro-block quantization level is increased as needed to set a refresh block quantization level only in the direction in which the generation amount of codes is reduced. A quantization level correction level indicating the quantization level difference between the macro-block quantization level and the refresh block quantization level can be transmitted as additional data.

Referring to FIG. 32, the abscissa indicates macro-block quantization levels j=31 to 0. When j=31, no codes are generated. When j=0, codes are generated in a maximum amount. In addition, numbers written below the quantization levels indicate bit counts used to indicate quantization level correction levels.

The ordinate in FIG. 32 indicates refresh block quantization levels j=31 to 0. The circles in FIG. 32 represent quantization levels which can be set as levels assigned to refresh blocks. Each refresh block quantization level is assigned such that the generation amount of codes is smaller than that based on a corresponding macro-block quantization level.

Since an output from the DCT circuit 14 is input to the refresh block quantization level setting circuit 59, a quantization table can be selected so as not to exceed a target refresh block code amount, by comparing the output signal with a refresh block accumulation code amount.

This operation will be described in detail below with reference to FIG. 31(b).

FIG. 31(b) is an enlarged view of the abscissa of FIG. 31(a). The process of determining a quantization level in the interval between refresh block numbers 80 and 81 will be described with reference to FIG. 31(b). Assume that a code amount up to refresh block number 80 is calculated by the refresh block code amount calculator 65, and that reference symbol E in FIG. 31(b) indicates the calculated code amount. A target code amount is determined by a refresh block number. Assume that reference symbol F in FIG. 31(b) indicates a target code amount at refresh block number 81.

Assume that a macro-block quantization level j=15 is set. In this case, according to the quantization level relationship shown in FIG. 32, as a refresh block quantization level, j=15, 19, 23, and 27 can be set.

Since a coefficient signal obtained by performing DCT of a video signal is input, as an output signal from the DCT circuit 14, to the refresh block quantization level setting circuit 59, amounts of codes generated when the quantization level j=15, 19, 23, and 27 can be calculated. Assume that the calculation results are respectively represented by G, H, I, and J. If these generation amounts G, H, I, and J are compared with the target code amount F, the refresh block quantization level j=23 with which the code amount I is obtained can be selected.

By controlling the code amount of each refresh block in this manner, and inputting and recording the result in the code switching circuit 45 and the index inserting circuit 47, refreshing can be reliably performed when fast reproduction is performed.

13. Bit stream structure

The bit stream structure of each block will be described below.

Referring to FIG. 1, overhead data output from an overhead data generator 67 is added to an output from the variable length encoder 16, and the resultant data is output to an output terminal 68.

A package medium such as a VCR or a video disk requires the code switching circuit 45 in order to realize fast reproduction. In transmitting a broadcast wave, however, code switching is not necessarily required.

In addition, a code switching technique is dependent on the rotational speed of the drum of a VCR, the number of heads, the tape format, the recording code amount per track, and the special reproduction speed.

Figure 36:
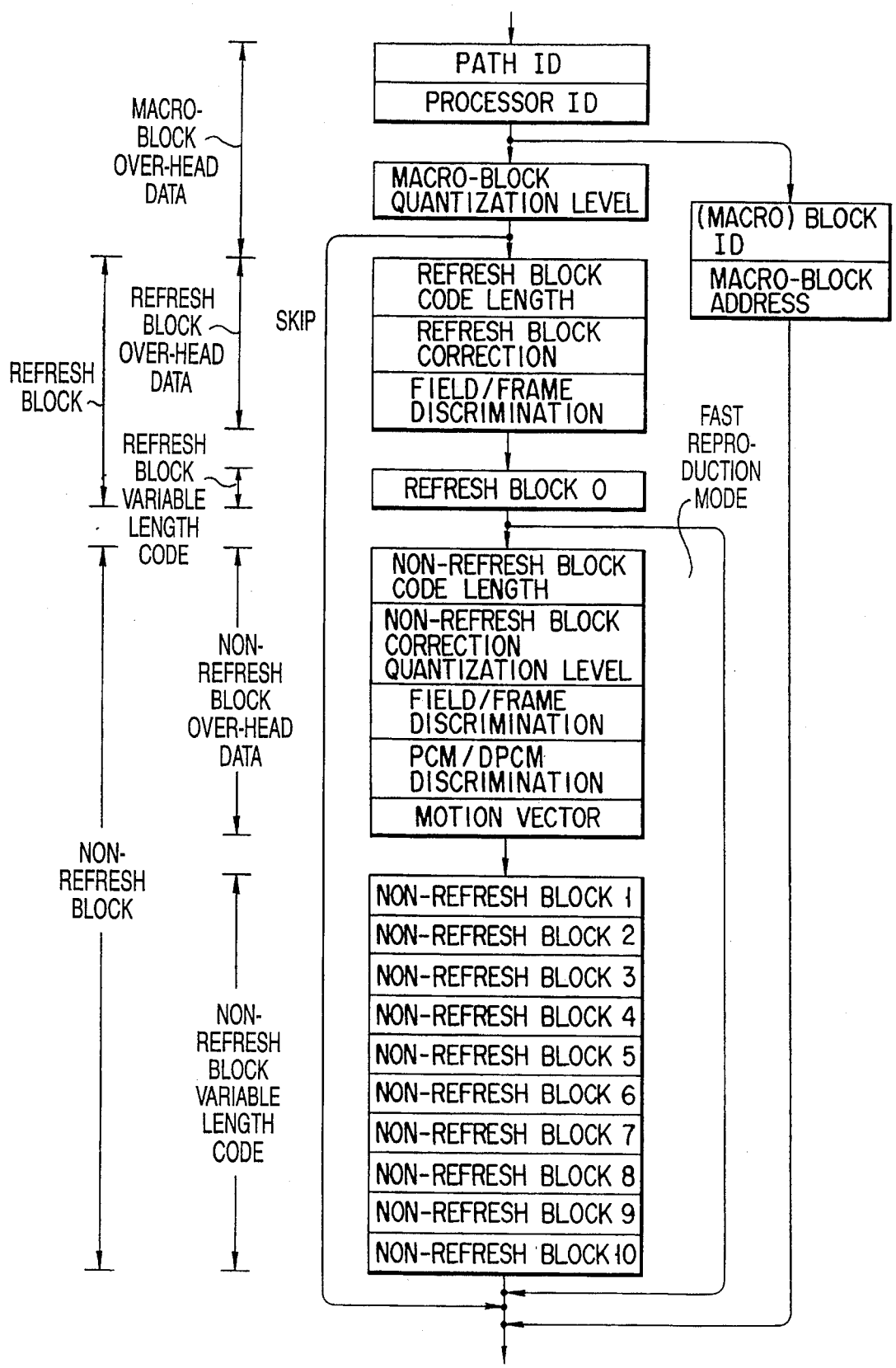
FIG. 36 is a view for explaining a macro-block bit stream structure.
Figure 39:
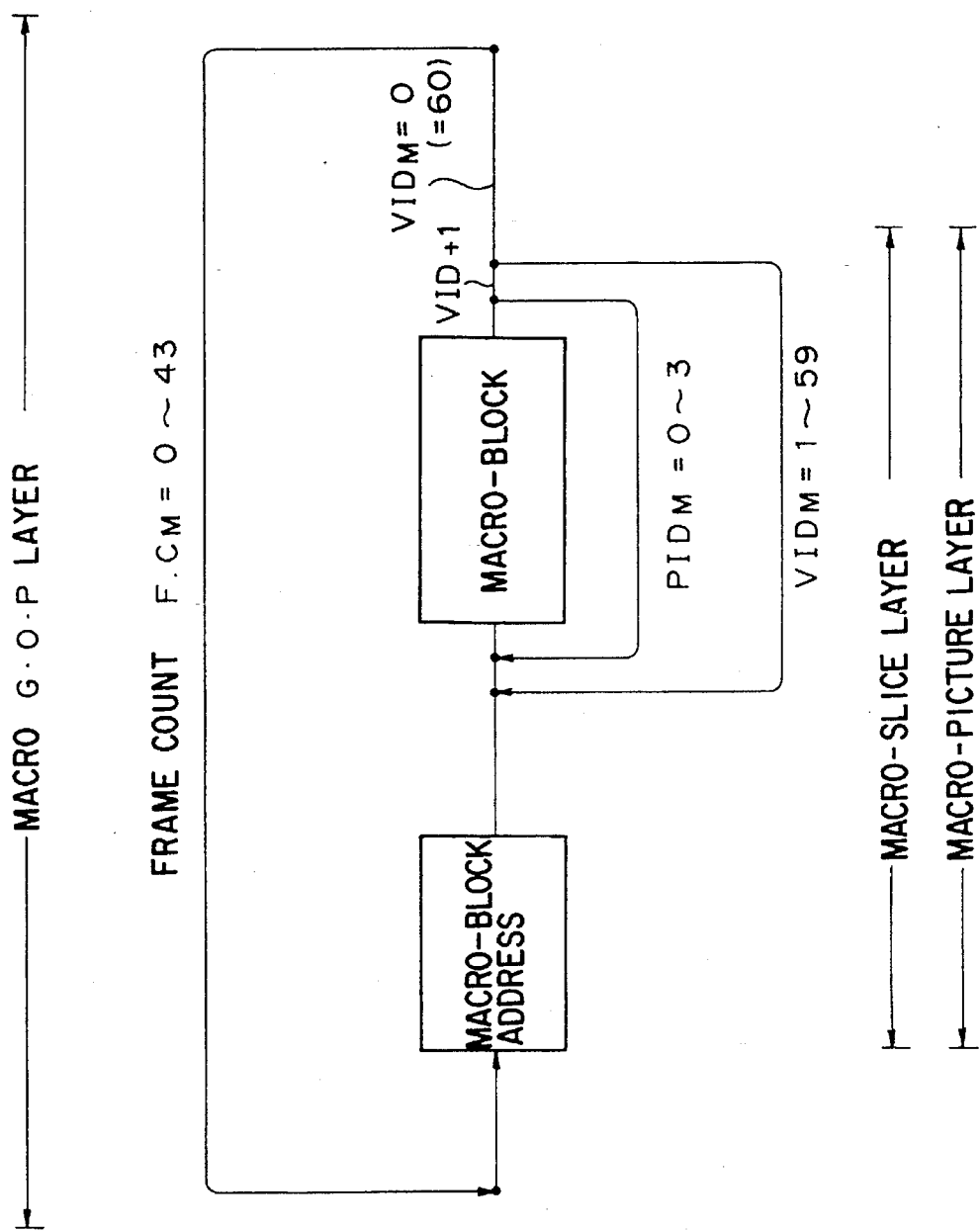
FIG. 39 is a view showing the structure of a macro-slice layer, a picture layer, and a G.O.P. layer.

For this reason, the bit stream of a broadcast wave is transmitted by using the bit stream of a macro-block shown in FIGS. 36 and 39.

In addition, the bit stream of the VCR, as an output from the code switching circuit 45, is transmitted by using the bit stream of (non-) refresh blocks shown in FIGS. 37 and 38 and FIGS. 40 to 43. 14. Bit stream structure of block layer A block is constituted by 64 DCT coefficients obtained by performing DCT of 8×8 pixels which are adjacent to each other in terms of luminance or color difference. 64 DCT coefficients are subjected to zigzag scanning in the order shown in FIG. 10 and to two-dimensional Huffman coding to be converted into codes, each constituted by a zero coefficient count as a run length and the amplitude of a non-zero coefficient, thereby forming a bit stream. EOB, a Huffman code, is added to the end of the codes of one block subjected to DCT.

15. Bit stream structure of super block layer

A super block is constituted by ten blocks, i.e., eight adjacent luminance blocks (4 in the horizontal direction×2 in the vertical direction), and color difference blocks U and v at the same position on an image. The transmission order is $Y_0, Y_1, Y_2, Y_3, Y_4, Y_5, Y_6, Y_7, U$, and V. In addition, the difference between the luminance signal DC components of adjacent blocks is calculated, and the calculated value is transmitted.

16. Macro-block and (non-refresh) refresh block addresses

As described in Part 9.1, in order to realize fast reproduction in a VCR, the rearrangement of refresh blocks is required. A description associated with this rearrangement will be made below.

Figure 35:
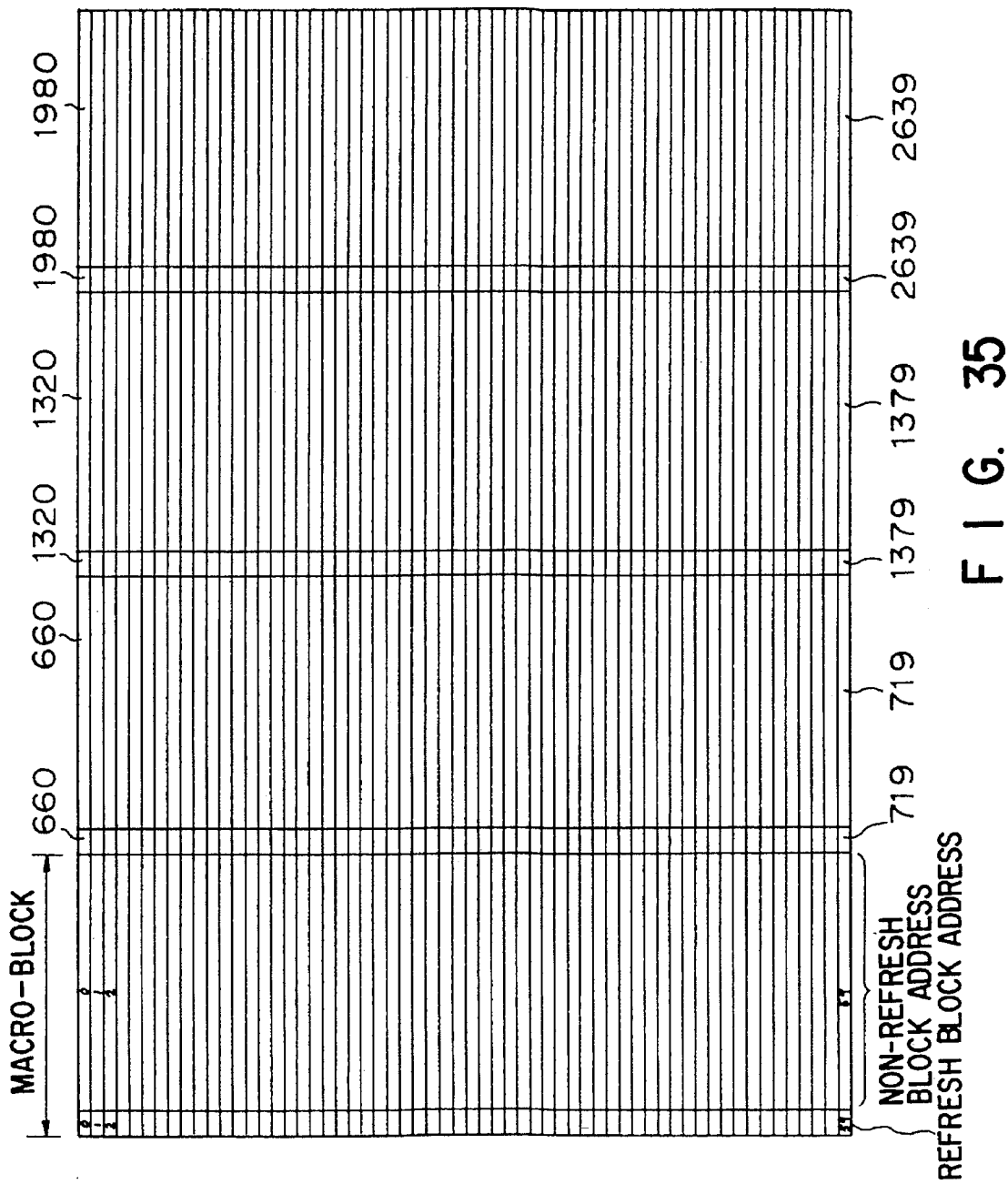
FIG. 35 is a chart for explaining (non-) refresh block addresses.

The relationship between the positions of a macro-block and (non-) refresh block on a frame and their addresses will be defined first. FIGS. 34 and 35 show a method of setting addresses.

Figure 33A:
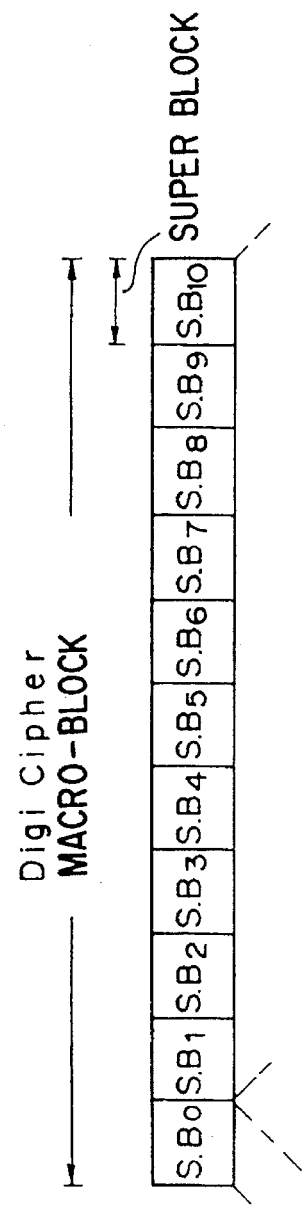
FIGS. 33(a) and 33(b) are charts showing macro-blocks and (non-) refresh blocks.
Figure 33B:
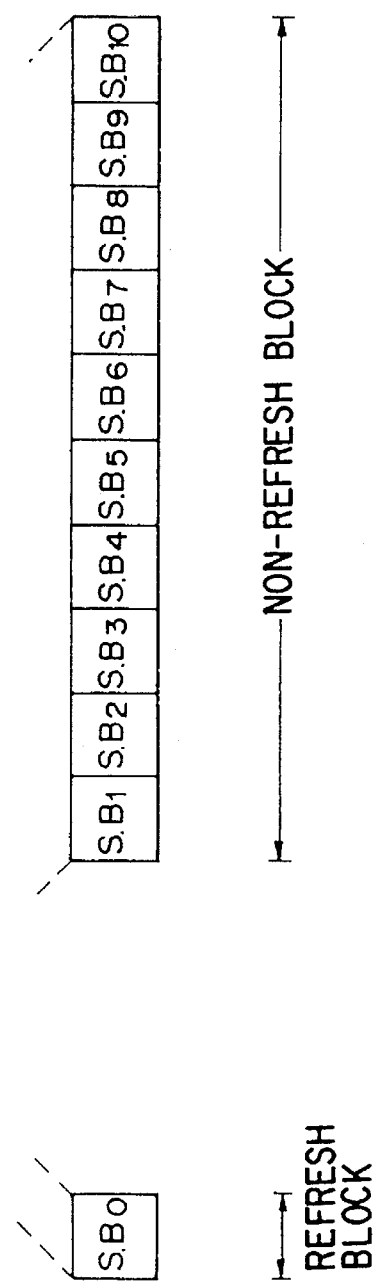

As shown in FIG. 33, a macro-block is constituted by 11 super blocks, more particularly, one refresh block and 10 non-refresh blocks. In addition, super block addresses on one frame are set according to FIG. 3.

16.1 Macro-block address

As shown in FIG. 34, as the address of a macro-block, the same address value as that of the first super block of the macro-block is assigned.

16.2 Refresh-block address

If a macro-block address is set as in Part 16.1, since the first block of the macro-block is a refresh block, as shown in FIG. 33, the address value of the refresh block coincides with the address value of the macro-block.

16.3 Non-refresh block address

As the address of each non-refresh block, an immediately preceding address value in the horizontal direction of the non-refresh blocks is used.

That is, the same address value is used as the addresses of a macro-block and (non-) refresh block.

16.4 Address value

This address value, as shown in FIG. 3, can be represented by $$S.B.\text{Address} = 60x + y$$

where $\underline{x}$ is the position of a super block in the horizontal direction, and $\underline{y}$ is the position of the super block in the vertical direction.

In DigiCipher, since four processors are used in the horizontal direction, ID identifying each processor is represented Dy PID, and ID indicating the vertical position of each processor is represented by VID. In this case, address values are represented as follows:

$$M.B.A \text{ (Macro Block Address)} = (60z11) \cdot PID + 60 \cdot x0 + VID.$$

$$R.B.A \text{ (Reference Block Address)} = (60 \cdot 11) \cdot PID + 60 \cdot x0 + VID.$$

$$N.R.B.A \text{ (Non Refresh Block Address)} = (60 \cdot 11) \cdot PID + 60 \cdot x0 + VID.$$

In this case, $X_0$ indicates the horizontal position of a macro-block/(non-) refresh block when PID=0 and VID=0.

Although FIGS. 34 and 35 show the case of $x_0 = 0$, it is clear that $x_0 = 0$ to 43 can be set. Furthermore, the value $x_0$ corresponds to a frame count in the conventional system.

17. Macro-block/(non-) refresh block bit stream structure 17.1 Macro-block bit stream structure A macro-block bit stream (FIG. 36) is constituted by macro-block overhead data, refresh block overhead data, non-refresh block overhead data, and non-refresh block and refresh block variable length codes.

Macro-block overhead data includes the following data:

Path ID ($PSID_M$): Path ID is ID data indicating a path in the bit stream. When PSID=1 and PID=1, a path indicating (macro) block ID and a (macro) block address is taken. When PSID=1 and PID=2, a path indicating a fill bits code length and fill bits codes is taken. Fill bits will be described here. Since the transmission amount of codes is fixed, if the amount of band-compressed codes is smaller than the transmission amount of codes, predetermined codes which complement the transmission amount of codes are forcibly inserted. Such codes are called fill bits codes, and the length of the codes is called a fill bits code length. When path $ID_M=0$, a path including variable length codes is taken.

Processor ID ($PID_M$): Processor ID is ID data indicating four processors in one frame.

(Macro) block ID (BID): (Macro) block ID is ID data indicating the type of a bit stream constituted by a plurality of blocks and over-head data. There are three types of block ID, namely macro-block ID, refresh block ID, and non-refresh block ID. For a macro-block, macro-block ID is used. When PSID and PID are set to be predetermined values, a path indicating block ID is taken.

(Macro) block address (M.B.A): A (macro) block address is an address indicating the position of a macro-block on a frame. The macro-block address described in Part 13.1 is shown. Similar to block ID, when PSID and PID are set to be predetermined values, this path is taken.

Macro-block quantization level: Macro-block quantization levels are set in units of macro-blocks in accordance with the capacity of the rate buffer described in Part 10.1. When no data is to be generated, if this quantization level is set to be a predetermined value, the processing can advance to the next macro-block without generating (non-) refresh block over-head data and variable length codes of (non-) refresh blocks. This operation is called a skip.

vertical ID ($VID_M$): Although $VID_M$ is not present in a bit stream, it is defined as follows. $VID_M$ is ID data indicating the vertical position of a macro-block in one frame. Since 60 macro-blocks are present in the vertical direction, $VID_M=0$ to 59.

The over-head data and variable length code of a refresh block included in a macro-block will be described with reference to "Refresh block bit stream structure" in Part 17.2.

Figure 37:
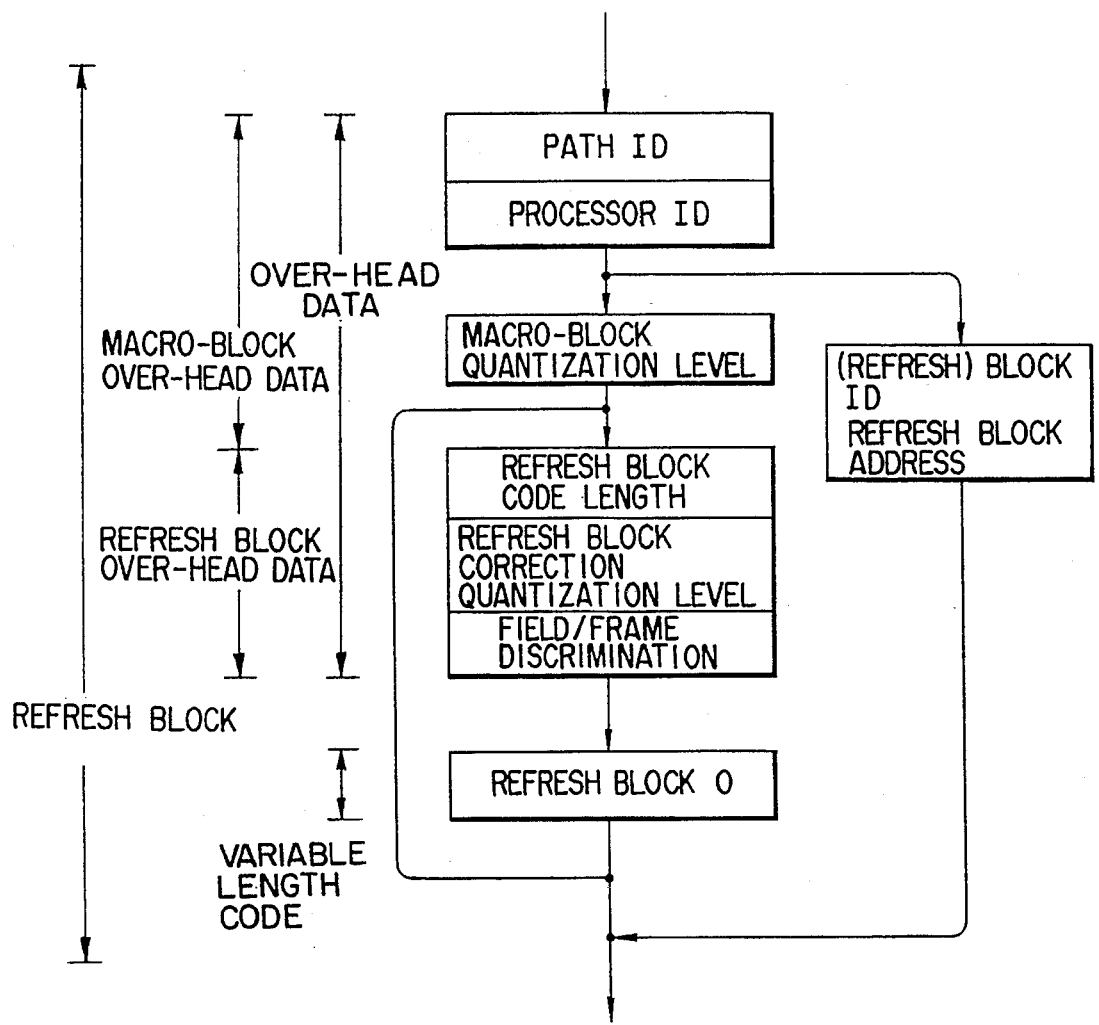
FIG. 37 is a view for explaining a refresh block bit stream structure.

The over-head data and variable length codes of non-refresh blocks included in a macro-block will be described with reference to "Non-refresh block bit stream structure" in Parts 17.3. 17.2 Refresh block bit stream structure A refresh block bit stream structure, as shown in FIG. 37, is constituted by macro-block overhead data, refresh block overhead data, and one refresh block variable length code 0. This refresh block can be realized by selecting the fast reproduction mode in the macro-block bit stream structure.

Although this macro-block over-head data is basically the same as that described in Paragraph 17.1, the block ID has refresh block ID. In addition, the address indicates the refresh block address.

The refresh block overhead data includes the following data:

Refresh block code length: A refresh block code length indicates the total code length of the refresh block over-head data and the refresh block variable length code.

Refresh block correction quantization level: A refresh block correction quantization level is a correction value based on a macro-block quantization level and a refresh block quantization level. This level is an output from the refresh block quantization level correction value setting circuit described in Part 10.3.

Field/frame discrimination: It is determined whether the pixels of the refresh block are field- or frame-based pixels.

A variable length code is set as a refresh block variable length code (refresh block 0), or the variable length code of a block, of the 11 super blocks in the macro-block, which is subjected to refreshing.

17.3 Non-refresh block bit stream structure

Figure 38:
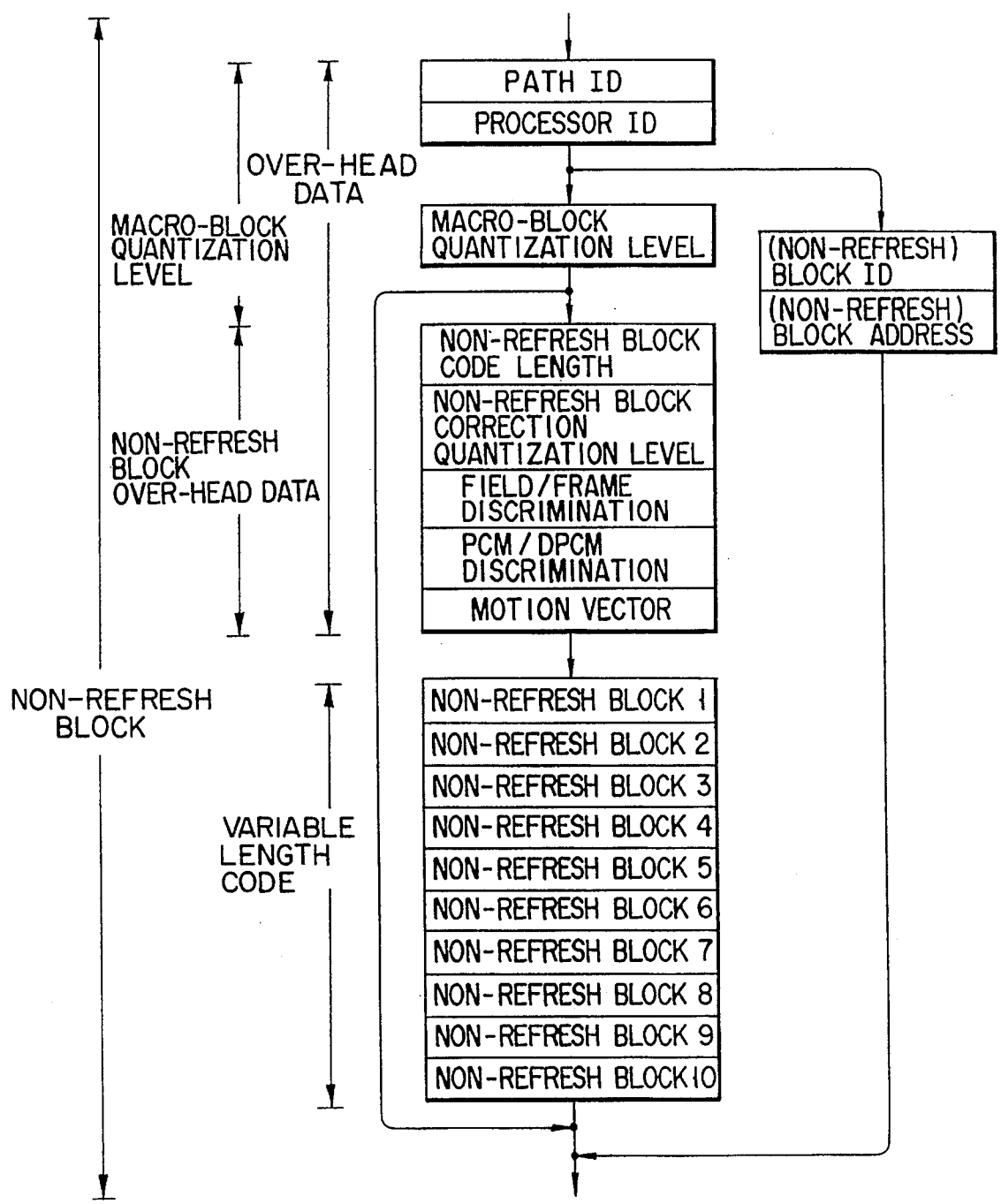
FIG. 38 is a view for explaining a non-refresh block bit stream structure.

A non-refresh block bit stream structure, as shown in FIG. 38 is constituted by macro-block over-head data, non-refresh block overhead data, and ten non-refresh block variable length codes 1 to 10.

Although this macro-block overhead data is the same as that described in Part 17.1, "block ID" includes the ID data of the non-refresh blocks, and "address" indicates a non-refresh block address.

The non-refresh block over-head data includes the following data:

Non-refresh block code length: A non-refresh block code length is a total code length of the data length of the non-refresh block overhead data and the code length of the ten non-refresh blocks.

Non-refresh block correction quantization level: A non-refresh block correction quantization level is based on the difference between the quantization level of the macro-block and the quantization level of each of the ten non-refresh blocks.

Field/frame discrimination: It is determined whether the pixels of the ten non-refresh blocks are field- or frame-based pixels.

PCM/DPCM discrimination: It is determined whether each of the ten non-refresh blocks is subjected to intra-frame processing (PCM) or inter-frame processing (DPCM).

Motion vector: A motion vector is a moving amount of a super block, which is predicted from a previous frame, when the non-refresh blocks are in the DPCM mode.

Variable length codes are non-refresh block variable length codes, including variable length codes of the non-refresh blocks 1 to 10. More specifically, non-refresh block variable length codes are variable length codes of ten super blocks, of the 11 super blocks, which are not subjected to refreshing.

18. Slice layer, picture layer, and G.O.P layer 18.1 Slice layer

A slice layer is constituted by one or a plurality of macro (non-) refresh blocks.

A head portion of a slice includes discrimination data for discriminating a macro-slice, a refresh slice, and a non-refresh slice and an address value indicating the position of the slice in an image. That is, a slice is designed to allow the use of data even in fast reproduction or at the time of occurrence of an error.

Such discrimination data and address value of a slice can be set by setting PSID and PID, in the macro and (non-) refresh block bit stream structures shown in FIGS. 36 to 38, to be predetermined values, and selecting a path indicating block ID and an address value.

18.2 Picture layer

A picture, i.e., an image, is constituted by at least one or a plurality of slices.

18.3 G.O.P layer (group-of-picture layer)

A G.O.P is constituted by a plurality of picture layers. In DigiCipher, 44 super blocks are present in the horizontal direction, and the position of each macro-block is determined on the basis of a frame count value (F.C). Therefore, 44 pictures are included in one G.O.P layer.

19. Macro-slice layer, picture layer, and G.O.P layer

A macro-slice layer indicates the transmission order of macro-blocks in transmission of a broadcast signal in DigiCipher, as shown in FIG. 39.

Since this macro-slice layer is processed with respect to one frame, it becomes identical to a macro-picture layer. One macro-block address is inserted for one frame. This macro-block address can be obtained by selecting a path indicating a macro-block address when path ID and processor ID are set to be predetermined values in FIG. 36. In addition, since macro-block addresses are set in units of frames, the addresses have a one-to-one correspondence with frame count values $F \cdot C_M$ of macro-blocks.

The macro-blocks of a macro-slice layer are sequentially transmitted in units of processors $PID_M=0$ to 3, from the top to the bottom of a frame, according to $VID_M=0$ to 59.

That is, in the case of the macro-block addresses shown in FIG. 34, after a macro-block address value is transmitted, macro-blocks are transmitted according to the following macro-block addresses:

```
0,   660,   1320,   1980
1,   661,   1321,   1981
 .    .      .       .
 .    .      .       .
 .    .      .       .
```

For the next frame, the horizontal direction $x_0$ of a macro-block is shifted by one. After the resultant macro-block address value is transmitted, macro-blocks are sequentially transmitted according to the following macro-block addresses:

```
60,   720,   1380,   2040
61,   721,   1381,   2041
 .     .      .       .
 .     .      .       .
 .     .      .       .
```

After the horizontal position $x_0$ is sequentially shifted from 0 to 43, $x_0=0$ is set again. Assume that a macro-G.O.P layer is constituted by these 44 images. This value is the same as the period at which one processor processes the entire area of one frame and corresponds to the frame count $F \cdot C_M$. These values also have a relationship defined by $x_0=f(F \cdot C_M)$.

Since one frame is constructed by four processors, refreshing is performed at a period of 11 frames.

In the normal reproduction mode in a recording medium such as a VCR, images are output from the recording medium by using the bit stream structures of such macro-slice layers, picture layers, and G.O.P layers.

20. Refresh slice layer, picture layer, and G.O.P layer

As described in Part 9.1 ("Refresh block code switching"), in order to realize fast reproduction in a VCR, recording must be performed such that a predetermined number of refresh blocks are arranged in a sector on the tape pattern of the VCR.

A refresh slice layer indicates the arrangement of this predetermined number of refresh blocks. More specifically, a refresh slice layer indicates the positions of refresh blocks on a frame and the number and arrangement of refresh blocks set in the refresh slice.

Figure 40:
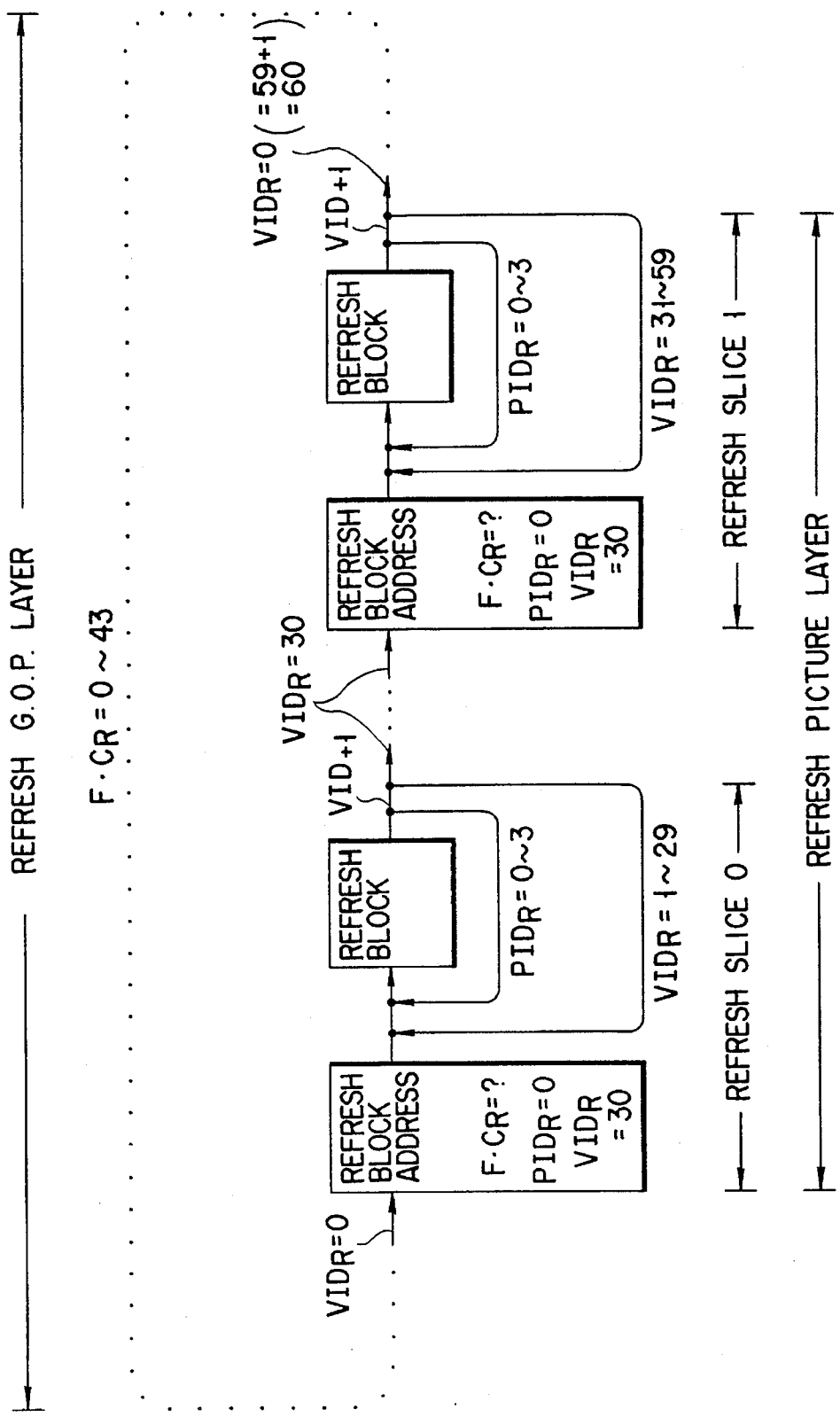
FIG. 40 is a view showing the structure of a refresh slice layer, a picture layer, and a G.O.P. layer No. 1.
Figure 41:
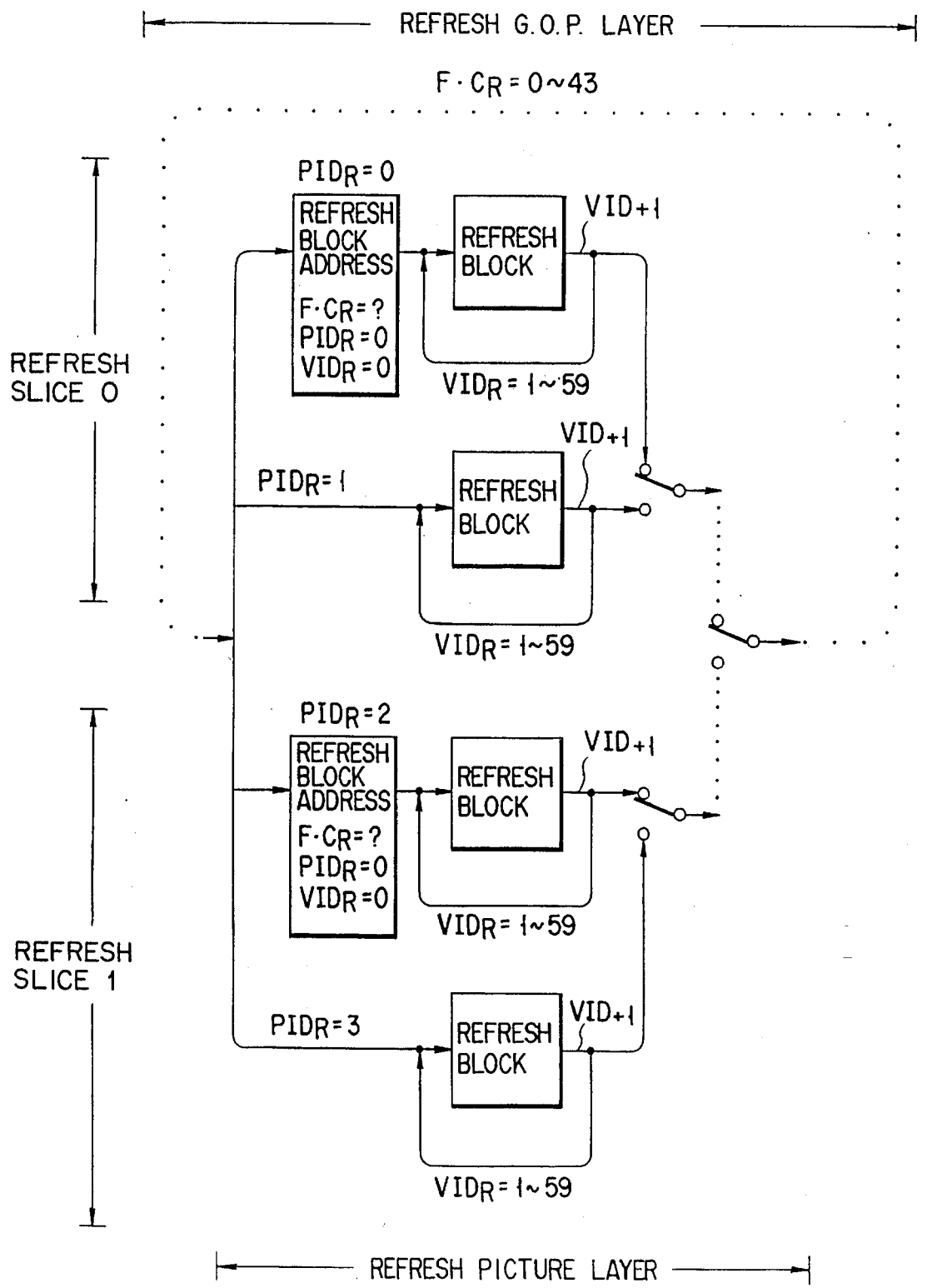
FIG. 41 is a view showing the structure of a refresh slice layer, a picture layer, and a G.O.P. layer No. 2.

The specifications of fast reproduction are determined by the arrangement of a refresh slice. FIGS. 40 and 41 show a refresh slice layer.

A refresh picture layer indicates refresh blocks of one frame. A refresh G.O.P layer is constituted by refresh picture layers of 44 frames. Since refreshing of one frame is completed at a period of 11 frames, the entire area of one frame is scanned by each processor at a period of 44 frames. Therefore, a G.O.P layer is formed at a period of 44 frames indicated by frame count $F \cdot C_R=0$ to 43.

The number of refresh blocks in one sector on the tape 26, i.e., one refresh slice layer, is determined by the number of tracks on which an average number of codes per frame are recorded, the rotational speed of the drum, the number of heads per scan, and a fast reproduction speed.

The simplest case will be described below.

When the tape format shown in FIGS. 18 and 23 is used, i.e., one frame is recorded on one track to realize double-speed reproduction, one refresh picture layer has two refresh slice layers. Since the number of refresh blocks in one frame is 240, in order to insert 120 (=240÷2) refresh blocks in one sector, 120 refresh blocks are set in a refresh slice layer. There are two methods of obtaining such refresh blocks, which methods will be described in Parts 20.1 and 20.2, respectively.

If the number of tracks per frame, the rotational speed of the drum, and the fast reproduction speed are determined otherwise, a predetermined number of refresh blocks may be set in one refresh picture layer.

If a system for a VCR is determined, the number of refresh blocks in a refresh slice is uniquely determined. In addition, the number of refresh slices in a refresh picture layer is also uniquely determined.

20.1 Refresh slice layer structure No. 1

FIG. 40 shows the first method of arranging refresh blocks in a refresh slice layer.

The refresh block address of the first refresh block of a refresh slice is set at the start portion in a refresh slice layer.

Since a refresh slice 0 is the first refresh slice of the refresh slice layer, this refresh block address coincides with the macro-block address in the macro-slice layer described in Part 19.

Subsequently, refresh blocks are arranged.

The refresh blocks are arranged in the refresh slice in such a manner that while processors $PID_R=0$, 1, 2, and 3 are sequentially transmitted, refresh blocks are transmitted according to vertical ID $VID_R=0$ to 29. This means that while four refresh blocks in the horizontal direction on a frame are sequentially transmitted, refresh blocks are transmitted from the top to bottom in the vertical direction.

With this operation, 120 refresh blocks corresponding to the upper half of a frame are transmitted. Upon transmission of the refresh blocks through the refresh slice 0, PIDR=0 to 3 are transmitted up to $VID_R=31$ to 59 through the refresh slice 1.

A refresh block address determined by $PID_R=0$, $VID_R=30$, and $F \cdot C_R$ is inserted in the start portion of the refresh slice 1.

At the decoder, the initial position of a refresh block can be recognized by using a refresh block address. In addition, the positions of refresh blocks in the horizontal direction can be recognized by using $PID_R=0$, 1, 2, 3, and the positions of refresh blocks in the vertical direction by counting $PID_R$.

Although a refresh slice delimiter is set at each switching point of $VID_R$ in FIG. 40, a refresh slice delimiter may be set at each switching point of $PID_R$.

20.2 Refresh slice layer structure No. 2

FIG. 41 shows the second method of arranging refresh blocks. In this method, refresh blocks adjacent to each other in the vertical direction for each processor are sequentially transmitted.

In this case, while $PID_R$ is fixed, refresh blocks are transmitted in the order of $VID_R=0$ to 59. Thereafter, $PID_R$ is changed, and refresh blocks are transmitted in the order of $VID_R=0$ to 59.

The second method is advantageous in terms of image quality at a high reproduction speed because adjacent refresh blocks in the same frame can be transmitted. This is because adjacent areas in the same frame can be reproduced as a large image.

In the decoder, the initial position of a refresh block can be recognized by using a refresh block address, and the positions of refresh blocks in the vertical direction can be recognized by counting $PID_R$ for a certain fixed period of time. In addition, when $PID_R$ is changed, a shift amount in the horizontal direction can be recognized by using $PID_R=0$ to 3. 21. Non-refresh slice layer, picture layer, and G.O.P layer 21.1 Structure of non-refresh slice layer A non-refresh slice layer indicates a transmission order and transmission delimiters in transmitting the non-refresh blocks shown in FIG. 42.

The transmission order of non-refresh blocks is always the same as that of macro-blocks, and $PID_{N.R}$ is sequentially and repeatedly set to be 0, 1, 2, and 3 in the order named. In addition, transmission is performed in the order of $VID_{N.R}=0$ to 59.

Figure 42:
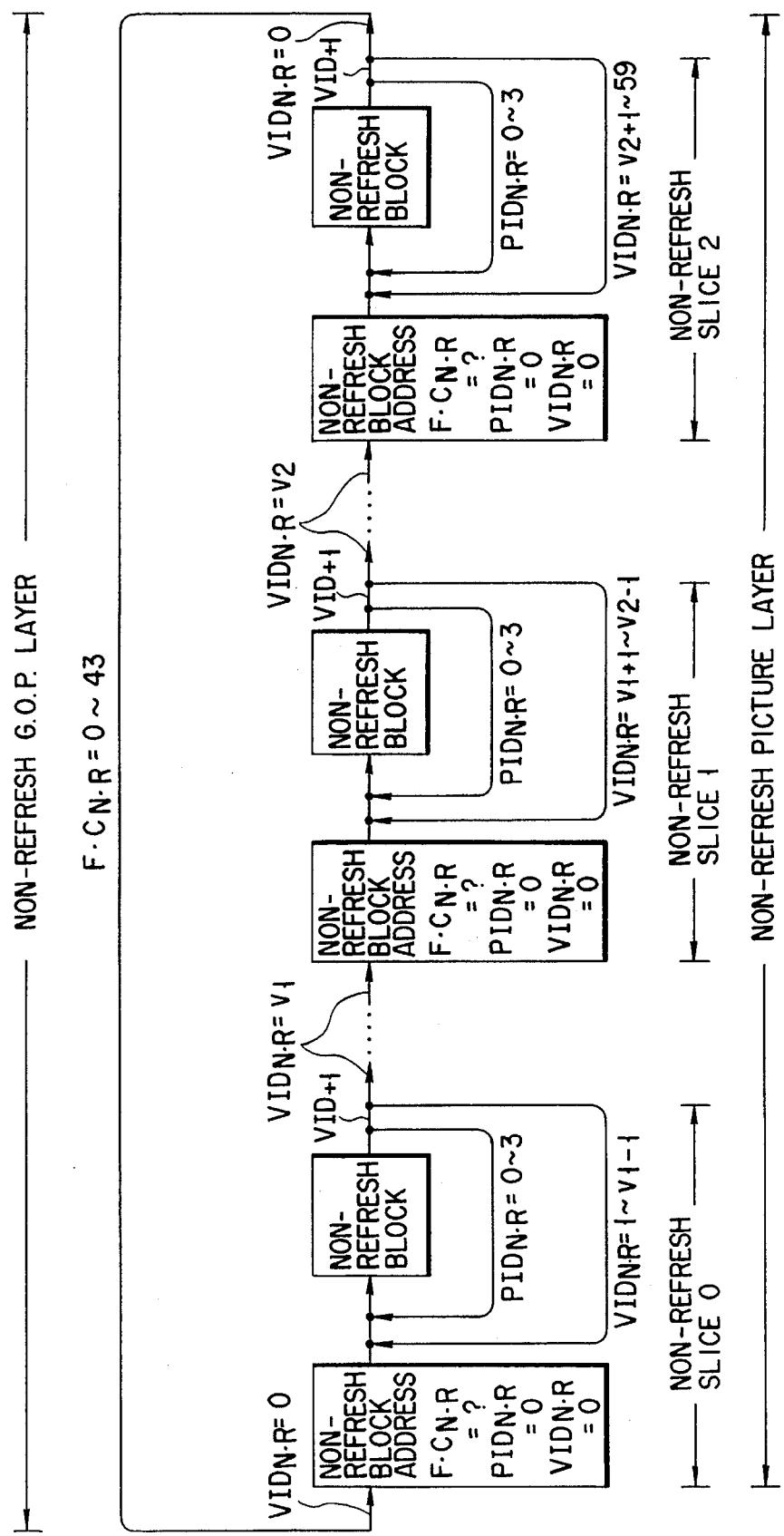
FIG. 42 is a view showing the structure of a non-refresh slice layer, a picture layer, and a G.O.P. layer.

In the case shown in FIG. 42, non-refresh blocks are transmitted in the order of non-refresh block addresses 0, 660, 1320, 1980, 1,661, 1321, 1981, . . . For the next frame, the horizontal position $x_0$ is shifted by an amount corresponding to one super block, and non-refresh blocks are transmitted in the order of addresses 60, 720, 1380, 2040, 61,721, 1381, 2041, . . . .

By making the transmission order of macro-blocks coincide with that of non-refresh blocks, signal processing in the normal reproduction mode is simplified. In addition, in order to satisfy this condition, refresh slice layers are sequentially transmitted as in the order of refresh slices 0 to 2.

21.2 Non-refresh slice layer delimiters Non-refresh slice layer delimiters will be described next.

One or a plurality of non-refresh slices are included in a non-refresh picture including non-refresh blocks of one frame. There are two types of non-refresh slice delimiters.

According to the first technique, a non-refresh slice delimiter is set at a switching point of a frame, i.e., a division of a non-refresh picture layer.

According to the second technique, in order to realize fast reproduction in a VCR, a non-refresh slice delimiter is set.

As described in Part 9.1 ("Refresh block code switching"), in order to realize fast reproduction in a VCR, refresh slices must be arranged in each sector on the tape pattern of the VCR.

In order to realize this arrangement, non-refresh slice layer delimiters must be set such that refresh slices are arranged in each sector.

Note that the number of refresh blocks in a refresh slice layer is arbitrarily changed depending on the amount of codes assigned to a non-refresh slice layer.

In addition, a non-refresh block address is set at the start portion of a non-refresh slice layer.

22. VCR picture layer and G.O.P layer

When recording is to be performed with respect to a VCR, the above-described refresh slices and non-refresh slices are transmitted in sets.

Figure 43:
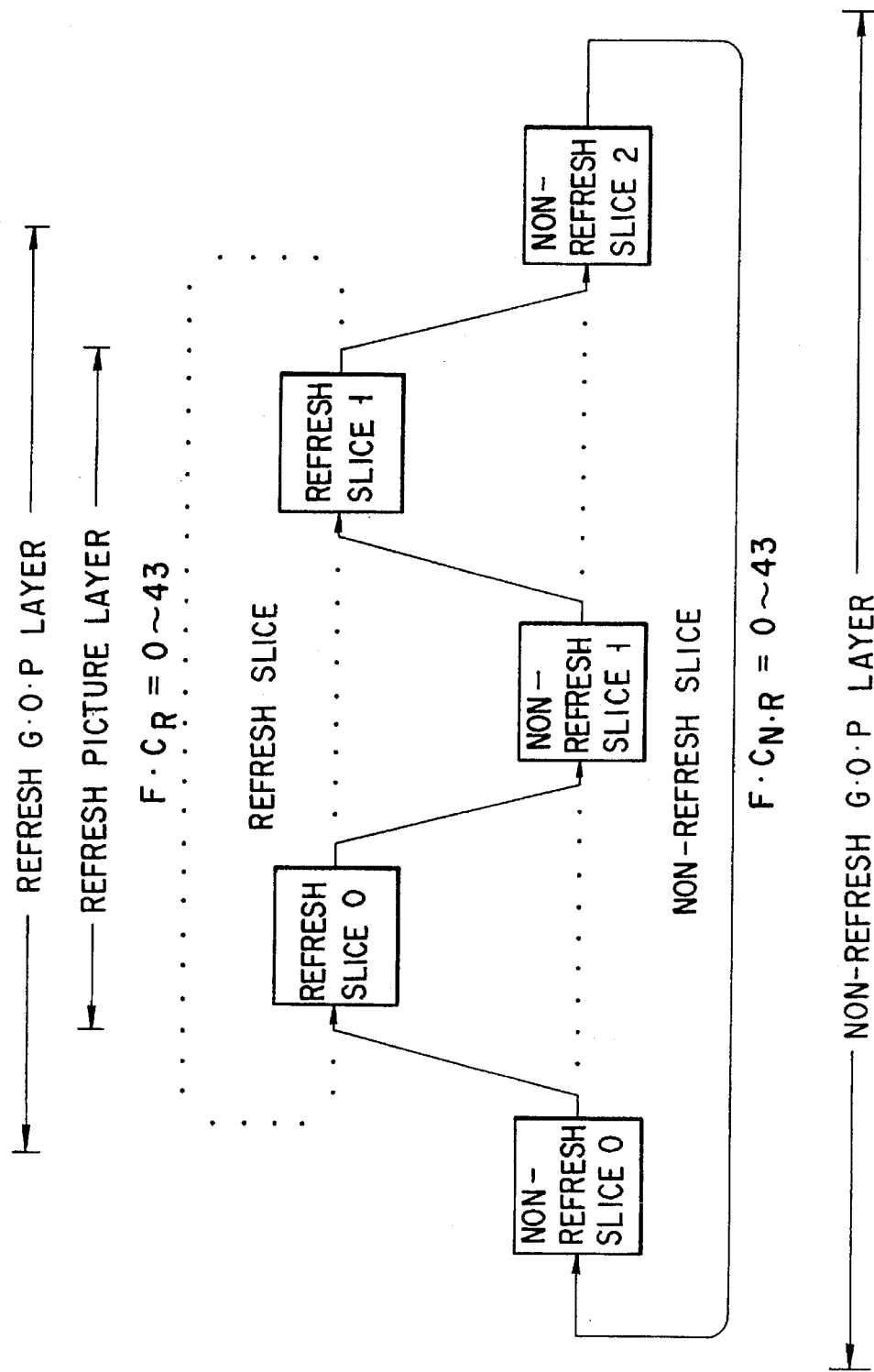
FIG. 43 is a view showing the structure of a picture layer of a VCR.

FIG. 43 shows a method of combining such slices. In this method, code transmission is performed in the manner indicated by the solid lines.

As described in Part 21, the non-refresh slices 0, 1, and 2 are transmitted in the order named. Refresh slices are inserted between these non-refresh slices. If non-refresh and refresh slices are respectively represented by NRS (Non Refresh Slice) and RS (Refresh Slice), transmission is performed in the order of NRS0, RS0, NRS1, RS1, and NRS2.

Although the non-refresh slices 0, 1, and 2 are always transmitted in the order named, refresh slices may be transmitted in the order of NRS0, RS1, NRS1, RS0, and NRS2.

The transmission order of refresh slices is determined depending on a method of designing a reproduced image in the fast reproduction mode of the VCR.

Referring to FIG. 43, the portions indicated by the broken lines represent the relationship between the picture layer and the G.O.P layer of the refresh slices and the non-refresh slices in transmitting recording codes to the VCR.

Refresh slices are arranged, considering that they are recorded in each sector of the VCR, and non-refresh slices are arranged between the refresh slices. However, the switching points of the respective picture layers can be independently set. In addition, the respective picture layers are transmitted in the order of $F \cdot C_R=0$ to 43 and $F \cdot C_{NR}=0$ to 43.

23. Data multiplex format

When the bit streams described in Parts 13 to 22 are recorded by the heads A and B through the output terminal 69 in FIG. 1, recording is performed by adding necessary signals to the VCR.

FIG. 44 shows a VCR data multiplex format.

FIG. 44 shows transmission data for a track 0. In FIG. 44, the abscissa corresponds to a one unit period to be described later, and the ordinate corresponds to a unit count recorded on one track. In this case, in order to describe a case wherein the average number of codes of one frame are recorded on one track, the ordinate is also made to correspond to the average amount of codes of one frame.

In addition, a switching point between a video signal and an audio signal, and a switching point between sectors are exemplified at the right end in FIG. 44.

According to the non-refresh block bit stream structure shown in FIG. 42, $VID_{N.R}=v2$ and $VID_{N.R}=v_2$ are determined in such a manner that the refresh slice 0 is set in a sector $S_O$ of the track $T_0$, and a refresh slice 1 is set in a sector $S_1$ of the track $T_0$.

After the non-trick blocks and the trick blocks are arranged in the manner described above, a sync signal, (non-) refresh block position data, non-refresh block address data, other additional information, an error correction signal, and the like are added, thereby performing a recording operation.

23.1 Unit sync

In a VCR, since jitter due to instable rotation of the cylinder, a track jump in a special reproduction mode, and the like tend to occur, unit sync signals must be added at a predetermined period. In this case, one period of this sync signal is termed one unit.

Definition of term

Unit: A unit is one period of a sync in transmission data to the VCR. In this period, a sync, additional information, a non-refresh block position code, (N-) R.B.P, a non-refresh block address code (N-) R.B.P, a (non-) refresh slice code, an error code, and the like are added.

In addition, a signal for the VCR, set in this unit period, is termed a unit sync.

Definition of terms

Unit sync: A unit sync is a sync for the VCR, set in a unit. After a unit sync, additional information for the VCR and the like are recorded.

Additional information includes a unit sync number, video/audio identification data, a track number, a unit number, and the like.

Furthermore, an error correction parity is added to correct an error in the VCR.

23.2 (Non-) refresh block ID (Non-) refresh block ID indicates (N-) R.B.ID=0, when a block indicating the (non-) refresh block frame address position described in Parts 23.3 to 23.5 is a non-refresh block, and indicates (N-) R.B.ID =1, when the block is a refresh block.

23.3 (Non-) refresh block frame

A (non-)refresh block frame indicates the frame number of a block designated by a (non-) refresh block position.

23.4 (Non-) refresh block address (N-) R.B.A (Non-) refresh block address (N-) R.B.A represents coding position information of each block.

Since each block is constituted by variable length codes, the switching point of each block is not fixed. For this reason, address (N-) R.B.A of the first (non-) refresh block set in each unit is indicated.

23.5 (Non-) refresh block position (N-) R.B.P

Since variable length codes and inter-frame DPCM processing are used, the start point of each block is not fixed. For this reason, each start point is indicated by (non-) refresh block position data.

Note that when a refresh slice is to be arranged between non-refresh slices, the start block of the refresh blocks is always indicated by a refresh block position code.

A plurality of refresh blocks or non-refresh blocks may be present in a unit. In this case, the position represented by a refresh block position code indicates the position of a (non-) refresh block which appears first. For this purpose, the start block of a refresh slice is arranged to appear first in a unit.

If a recordable code amount is larger than a transmission data code amount, a free area may be set so that the start block of a refresh slice may be set at the start position in a unit. In a fast reproduction operation, since a head crosses and traces tracks, when the head completely coincides with a track, the maximum envelope is obtained. Otherwise, the envelope is always reduced. This means an increase in error rate, which may cause a reproduction failure.

On the other hand, in order to use a refresh slice as a reproduction signal, the start position of the start code of the refresh slice must be obtained. For this purpose, the (N-) R.B.P signal must be reproduced. In order to detect this (N-) R.B.P signal, a unit sync signal must be detected.

If a refresh block is arranged from the start position in a unit, the influence of a decrease in envelope can be minimized.

In addition, if a free area is set, and the start block of a (non-) refresh slice is arranged at the start position in a unit, refresh blocks and non-refresh blocks can be distributed to different FIFO memories by using only (non-) refresh block ID data, in a code switching operation by the decoder. Therefore, code switching can be easily performed.

23.6 Detailed example

FIGS. 45(a) to 45(c) show a detailed example of an index signal containing (non-) refresh block ID data, frame data, address data, and position data.

FIG. 45(a) is an enlarged view of a unit associated with the video signal shown in FIG. 44. FIG. 45(a) shows the insertion positions of the following data contained in the index signal:

(non-) refresh block ID [(N-) R.B.ID]

(non-) refresh block address [(N-) R.B. Address]

(non-) refresh block position [(N-)

R.B. Position]

In addition, FIG. 45(a) shows the insertion positions of variable length codes. In order to indicate the switching positions of the blocks in the unit, positions 0 to 150 are shown as the positions of the codes.

FIG. 45(b) shows the values of an index signal to be inserted when a refresh block $R.B_0$ corresponding to frame number $F_6$ is the start block in the unit. The values are:

R.B.ID=1

R.B.F=6

R.B.A=0

R.B.P=50

FIG. 45(c) shows the values of an index signal to be inserted when a non-refresh block $N.R.B_{710}$ corresponding to frame number $F_{10}$ becomes the start block in the unit. The values are:

R.B.ID=0

R.B.F=10

R.B.A=710

R.B.P=50

According to the VCR data multiplex format, only additional information such as index data is added, but there is no requirement for video signal coding processing in terms of the format.

For this reason, the content of video information is not degraded by the format.

23.7 Additional information

As the additional information shown in FIG. 44, a unit number, a track number, and the like are set. By setting these pieces of information, slow reproduction can be realized by rearranging units in accordance with unit numbers.

Furthermore, this unit number is used to reproduce data at a specific position on a track. That is, servo processing is performed to maximize the envelope at the position where a refresh slice is arranged.

24. Code switching circuit

Figure 46:
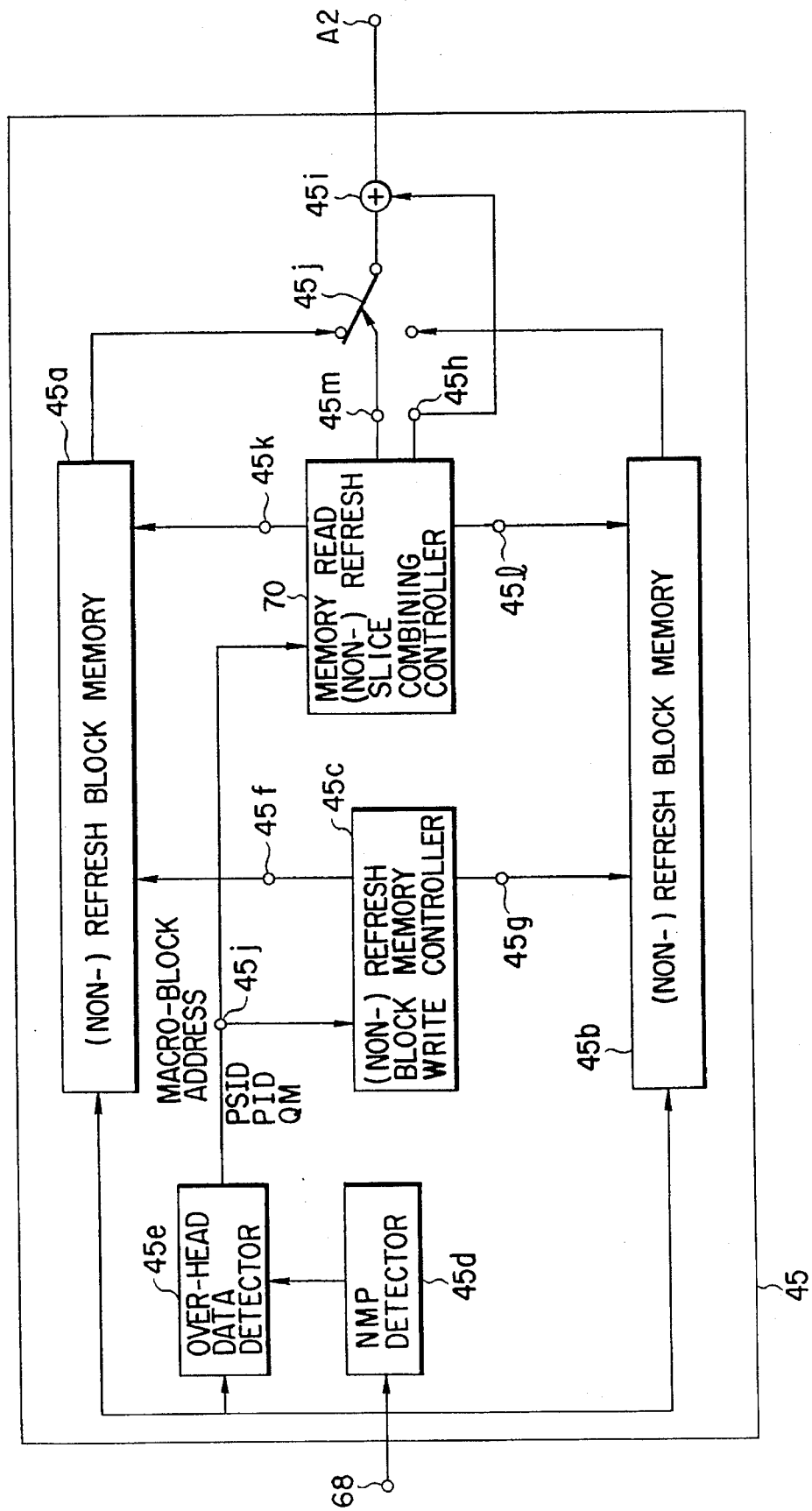
FIG. 46 is a block diagram showing a detailed arrangement of a code switching circuit.

The arrangement of the code switching circuit 45 used in the recording mode will be described in detail below with reference to FIG. 46.

A case where a bit stream to be transmitted with a broadcast wave is input to the output terminal 68 will be described below. If the bit stream of a broadcast wave is input and corresponding processing can be performed, requirements for recording of data only on a VCR are included. Therefore, this case will be described below.

Since the bit stream input to the output terminal 68 has the macro-block format shown in FIG. 36, this macro-block is separated into a refresh block and non-refresh blocks. These separated (non-) refresh blocks are stored in (non-) refresh block memories 45a and 45b.

In order to perform this separation, a required timing signal is generated by a (non-) refresh block memory write controller 45c.

In order to generate this timing signal, the start position of a frame is detected first by an NMP detector 45d, and overhead data including path ID (PSID), processor ID (PID), a macro-block quantization level $Q_M$, a refresh block code length $L_R$, and non-refresh block code length $L_{NR}$ is detected by an over-head data detector 45e.

A (non-) refresh block memory write controller 45c generates write timing signals required for the (non-) refresh block memories 45a and 45b by using these overhead data and outputs the signals from terminals 45f and 45g.

This write timing will be described below with reference to FIGS. 47(a) to 47(d).

FIGS. 47(a) and 47(b) show a bit stream transmitted as a broadcast wave. FIG. 47(a) shows over-head data. Referring to FIG. 47(a), reference symbol PSID denotes a path in the bit stream; and VID and PID, ID data identical to those shown in FIG. 34. Note that the data VID is not set in the bit stream. When the macro-block quantization level $Q_M=31$, a skip operation is performed.

Referring to FIG. 47(b), the black square indicates a macro (non-) refresh block address; and the white squares, macro-block overhead data. In addition, reference symbol $L_R$ denotes the code length of over-head data and a variable length code.

Only the bit streams shown in FIGS. 47(c) and 47(d) are extracted from the macro-block bit stream in FIG. 47(b) and are respectively stored in the (non-) refresh block memories 45a and 45b.

FIG. 47(c) shows a signal written in the refresh block memory 45a. That is, a macro-block address, macro-block overhead data, refresh block overhead data, and a variable length code are written in the memory 45a.

Since an address is inserted in the start portion of a slice layer, a refresh block address is inserted in the start portion of a refresh slice layer as indicated in the refresh slice 1. This operation is performed as follows. An address is generated first by a (non-) refresh block address generator 70a. The address is then output from a terminal 45h and is inserted in a refresh slice layer by an address inserting circuit 45i in FIG. 46.

FIG. 47(d) shows a signal written in the (non-) refresh block memory 45b. That is, a macro-block address, macro-block over-head data, (non-) refresh block overhead data, and a variable length code are written in the memory 45b.

Furthermore, as indicated in the (non-) refresh slice 1, a refresh block address is inserted in the head portion of a non-refresh slice. The insertion of this (non-) refresh block address is performed by using the refresh block address generator 70a in FIG. 48 and the address inserting circuit 45i.

A memory read (non-) refresh slice combining controller 70 will be described next.

The main points of a (non-) refresh slice combining operation will be described first. FIG. 49(b) shows an envelope obtained when the VCR operates in the fast reproduction mode.

Figure 49A:
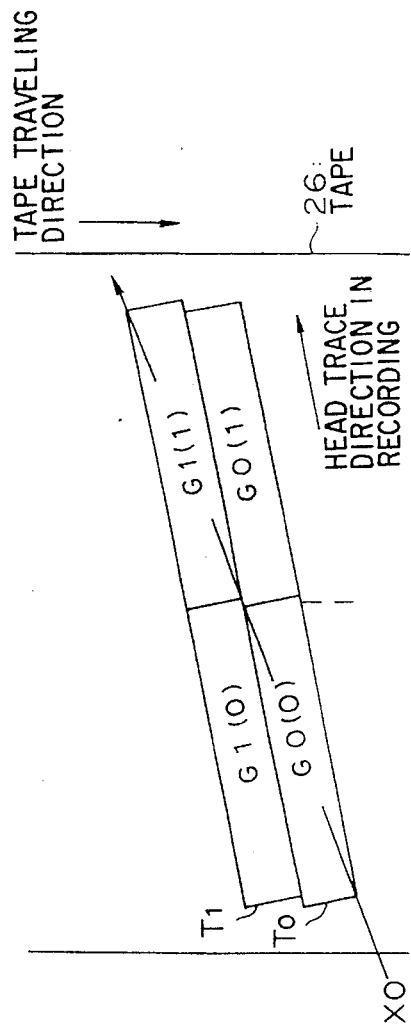
FIGS. 49(a) and 49(b) are views for explaining an envelope in a fast reproduction operation of the VCR.
Figure 49B:
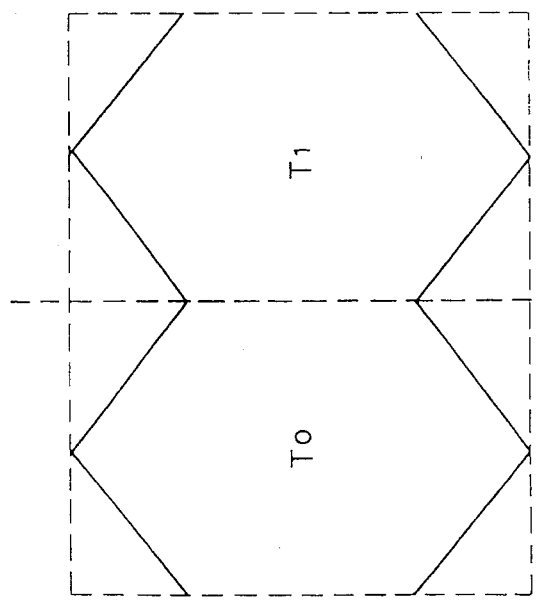

FIG. 49(a) partly shows the tape, the tracks, and the head trace in the double-speed reproduction operation shown in FIG. 23. The corresponding envelope is shown in FIG. 49(b).

Referring to FIG. 49(b), the solid lines indicate the shape of the envelope which can be reproduced by the head. The error rate is reduced with an increase in magnitude of the envelope.

Therefore, in arranging a refresh slice between non-refresh slices, it is required that the refresh slice be arranged around a point where the envelope is maximized.

In the recording mode, a refresh slice is arranged at a predetermined position on a track, as the center. In the fast reproduction mode, servo control is performed to cause the head to trace the central value of each refresh slice.

In the memory read (non-) refresh slice combining controller 70, a refresh slice code amount is calculated first by a refresh slice code amount calculator 70b using the refresh block length $L_R$ input from a terminal 45j.

The recording code amount per sector and the position of each track where the head traces in the fast reproduction mode are stored in a refresh slice position designation ROM 70c.

A (non-) refresh slice/refresh slice combining point determination circuit 70d determines a switching point between a refresh slice and a non-refresh slice by using refresh slice code amount data and refresh slice position data. In order to perform this determination, a non-refresh block code amount calculator 70e calculates the sum total of the code amounts of the respective non-refresh blocks. By using this sum total data, (non-) refresh slice combining points $v_1$ and $v_2$ shown in FIG. 42 are determined so that the center of each refresh slice is arranged at a predetermined position on a track.

By using these (non-) refresh slice combining points, (non-) refresh block memory read controllers 70f and 70g read out the corresponding codes from the (non-) refresh block memories 45a and 45b, respectively.

In accordance with this operation, a switch 45j is operated.

The above-mentioned (non-) refresh block address generator 70a generates (non-) refresh block addresses by using the (non-) refresh slice combining points. These addresses are inserted in a bit stream by the address inserting circuit 45i.

25. Basic arrangement of decoder

The basic arrangement of the decoder will be described in detail below with reference to FIG. 50.

A VCR mode signal designating the normal reproduction/ fast reproduction mode or the like, which is input by the user, is supplied to a reproduction speed setting circuit 72 through a terminal 71.

A tape feed controller 73 and a track reproduction controller 74 perform servo control of the VCR to control the rotational phase of the drum and a tape feed rate phase. Especially in the fast reproduction mode, servo control is performed to read out data from an area where a refresh slice is recorded.

with this operation, a signal recorded on the tape 26 is read by the heads A and B. The read signal is input to an error correction circuit 76 and a unit sync detector 77 through a switch 75 after it undergoes reproduced waveform equalization.

The unit sync detector 77 detects a sync signal inserted in each unit. With this operation, adverse effects such as jitter on the VTR are removed. Each unit is detected by detecting this sync signal, and the index signal shown in FIG. 44 is detected by the index detector 78. In FIG. 44, the thick line indicates the index signal. The start point of a (non-) refresh block is detected in accordance with the (non-) refresh block position signal detected by the index detector 78. In addition, it is detected on the basis of (non-) refresh block ID whether a non-refresh block or a refresh block is started from the start point.

Furthermore, by detecting a (non-) refresh block frame and an address, the decoding position of each (non-) refresh block and the decoding sequence of frames can be known.

A code length detector 79 detects the head position of a (non-) refresh block by using a (non-) refresh block position [(N-) R.B.P]input from a terminal 80, thus detecting a (non-) refresh block code length set in the overhead data of the (non-) refresh block.

A (non-) refresh block delimiter can be detected by using this (non-) refresh block code length so that overhead data can be sequentially detected, and the position of each variable length code can be detected.

Figure 50:
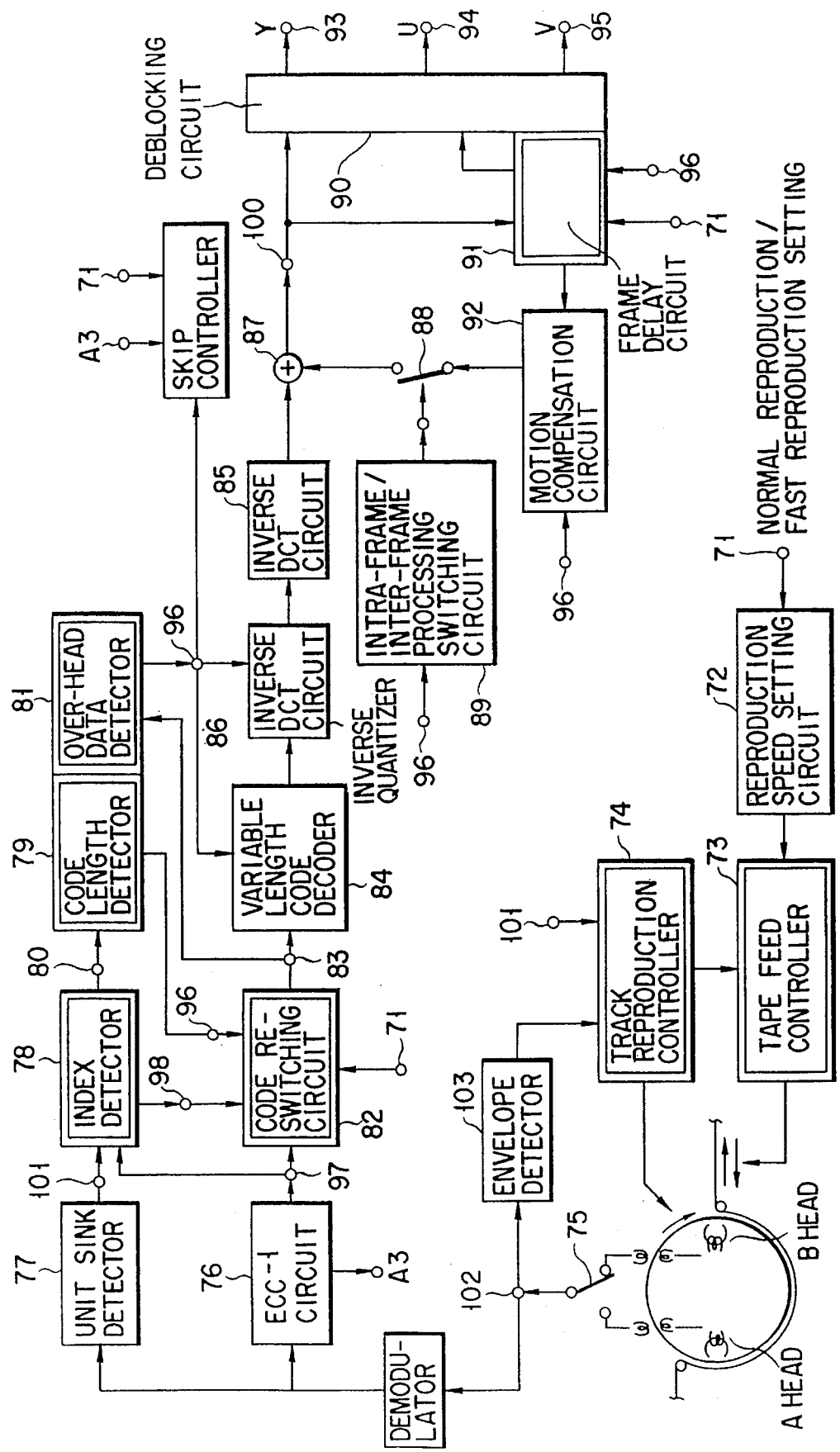
FIG. 50 is a block diagram showing the arrangement of an embodiment on the decoder side according to the present invention.

Referring to FIG. 50, although the code length detector 79 and an overhead data detector 81 are separately arranged, the code length detector 79 is included in the overhead data detector 81.

FIG. 51 shows the relationship between index data and overhead data used by each circuit. In each circuit, signal processing is performed by using index data and overhead data indicated by circles.

A code re-switching circuit 82 separates the (non-) refresh slices and refresh slices from the VCR picture layer bit stream shown in FIGS. 40 to 43 by using (non-) refresh block ID.

The separated (non-) refresh slices are respectively stored in a refresh memory and a non-refresh memory in the code re-switching circuit 82.

In the normal reproduction mode, a read operation is performed while the refresh memory and the non-refresh memory having the same (non-) refresh block addresses as are in the code re-switching circuit 82 are switched, and the read non-refresh and refresh blocks are combined to constitute a macro-block. The macro-block is then output from the code re-switching circuit 82 through a terminal 83.

In the VCR, a bit stream for normal reproduction has the same macro-block arrangement as that of a bit stream of a broadcast wave. For this reason, a bit stream of a broadcast wave is input through the terminal 83.

When a broadcast wave bit stream is to be processed, overhead data is detected by the overhead data detector 81, and decoding is performed. Since an operation in the normal reproduction mode is the same as an operation of decoding a broadcast wave, this operation will be described first.

Of the macro-block bit stream at the terminal 83, which is shown in FIG. 36, the variable length codes of the (non-) refresh blocks are input to a variable length code decoder 84. These variable length codes are extracted from the bit stream by using (non-) refresh block code length data in the overhead data and decoding the overhead data. The variable length code decoder 84 sequentially detects Huffman codes by comparing a Huffman table with the codes from the start position of the variable length codes. By using the detected Huffman codes, a zero coefficient count (run length) and a non-zero coefficient (amplitude) of quantized DCT coefficients are obtained. Since these coefficients are arranged in the order in which they are zigzag-scanned, the order of the coefficients are rearranged in accordance with the need of an inverse DCT circuit 85.

A signal obtained by decoding the variable length codes is input to an inverse quantizer 86. The inverse quantizer 86 corrects the macro-block quantization level with a (non-) refresh block correction quantization level, thus obtaining a quantization level in units of super blocks.

Subsequently, 64 coefficients of each block are multiplied by weighting values according to a weighting table.

The 64 coefficients are then multiplied by quantization scale values according to quantization levels in units of super blocks, thus performing inverse quantization and obtaining DCT coefficients. (Note that in this case, the second quantization method described in Part 8 is exemplified.)

The 64 DCT coefficients are processed by the inverse DCT circuit 85 to be transformed from the frequency region to the time axis region, thus obtaining a 64-pixel signal (8 pixels in the horizontal direction ×8 pixels in the vertical direction).

The output from the inverse DCT circuit 85 is input to an adder 87.

The adder 87 also receives a signal from a switch 88 and adds it to the output signal from the inverse DCT circuit 85. The switch 88 is controlled by an intra-frame/inter-frame processing switching circuit 89. The output signal from the adder 87 is input to a deblocking circuit 90 and a frame delay circuit 91.

The frame delay circuit 91 is constituted by a frame memory. An output signal from this frame memory is input to a motion compensation circuit 92 and the deblocking circuit 90.

An output signal from the motion compensation circuit 92 is input to the switch 88.

The deblocking circuit 90 performs processing to make band compression signal processing coincide with the scan sequence of the scanning lines of a TV by using the signals output from the adder 87 and the frame delay circuit 91, and outputs a luminance signal and color difference signals U and V from output terminals 93 to 95.

The operation of the decoder includes intra-frame processing and inter-frame processing. When the switch 88 is turned off, intra-frame processing is performed. When the switch 88 is turned on, inter-frame processing is performed. ON/OFF control of the switch 88 is performed by the intra-frame/inter-frame processing switching circuit 89.

A PCM/DPCM determination signal in overhead data is input to the intra-frame/inter-frame processing switching circuit 89 through a terminal 96. In this case, PCM and DPCM respectively indicate intra-frame processing and inter-frame processing. The switch 88 is turned off and on in response to PCM and DPCM, respectively. As described in Part 3, intra-frame/ inter-frame processing includes image adaptive intra-frame processing and refreshing (forcible intra-frame processing).

Intra-frame processing will be described first.

When intra-frame processing is to be performed, an output signal from the inverse DCT circuit 85 is input to the frame delay circuit 91 and the deblocking circuit 90, and the luminance signal Y and color difference signals U and V are output.

Inter-frame processing will be described next.

In this case, a predictive signal one frame ahead of the current frame is read out from the frame delay circuit 91 and is input to the motion compensation circuit 92.

In addition, a motion vector of overhead data is input to the motion compensation circuit 92 through a terminal 96 to shift the position of the predictive signal on a frame. The motion compensation circuit 92 outputs a predictive signal whose position coincides, on the frame, with the position of an output signal from the inverse DCT circuit 85. The output signal is then input to the adder 87 through the switch 88. The adder 87 adds the output from the inverse DCT circuit 85 to the predictive signal, and supplies the resultant signal to the frame delay circuit 91 and the deblocking circuit 90. Subsequently, the luminance signal Y and the color difference signals U and v are separated from each other and are respectively output from the terminals 93 to 95.

In the normal reproduction mode using a broadcast wave and a recording medium, the above-described write processing with respect to the variable length code decoder 84, the inverse quantizer 86, the inverse DCT circuit 85, and the frame delay circuit 91 is always performed in units of macro-blocks.

That is, processing of these circuits per processor is based on sequential processing of 11 super blocks in a macro-block, and macro-blocks are sequentially processed from the top to bottom of a frame.

26. Fast reproduction

The code re-switching circuit 82 reads data only from the refresh memory in which a refresh slice of a bit stream is stored.

Since this refresh slice includes a refresh block address, frame ID, and processor ID, a decoding position can be obtained by detecting the overhead data of the refresh slice through the overhead data detector 81.

With this operation, the position of an image written in the frame memory in the frame delay circuit 19 and a corresponding write memory address can be determined.

In the fast reproduction mode, only a refresh block is effective as decoding data but non-refresh block data 1B is not effective. For this reason, write processing with respect to the variable length code decoder 84, the inverse quantizer 86, the inverse DCT circuit 85, and the frame delay circuit 91 is performed on the basis of only refresh blocks.

Since a refresh block is always subjected to intra-frame processing, the intra-frame/inter-frame processing switching circuit 89 designates intra-frame processing. That is, the switch 88 is kept off.

Only one refresh block is present in a macro-block. For this reason, in one frame, a refresh block is transmitted every 11 super blocks in the horizontal direction, or refresh blocks are consecutively transmitted in the vertical direction. This transmission order is different from that of pixels according to the scanning lines. In the fast reproduction mode, therefore, refresh block data are sequentially written in the frame memory of the frame delay circuit 91. Thereafter, the data stored in the frame memory of the frame delay circuit 91 are read out in the transmission order of pixels according to the scanning lines, thus obtaining a reproduced image in the fast reproduction mode.

27. Code re-switching circuit

FIG. 52 shows the arrangement of the code re-switching circuit 82. A signal obtained by performing error correction of a reproduction bit stream from the VCR is input to a terminal 97.

This bit stream structure is the same as that shown in FIGS. 37 and 38 and FIGS. 40 to 43. First, a refresh slice and a non-refresh slice are separated through a switch 82a. The switch 82a is switched by inputting (non-) refresh block ID and (non-) refresh block position signal, as index data of the VCR data multiplex format shown in FIG. 44, to a terminal 98.

With this operation, the refresh slice and the non-refresh slice are respectively stored in the refresh block memory 82b and the non-refresh block memory 82c.

In the normal reproduction mode, signals are read out from the refresh block memory 82b and the non-refresh block memory 82c through a switch 82d by using a refresh block memory read circuit 82e and a non-refresh block memory read circuit 82f.

In this case, a read operation is performed such that the refresh block address and the non-refresh block address shown in FIG. 35 coincide with each other.

With this operation, in the normal reproduction mode, a signal having the same arrangement as that of macro-block variable length codes is output to the terminal 83, as shown in FIG. 34.

The non-refresh block memory read circuit 82f calculates the address of each refresh block on the basis of the non-refresh block address and processor ID of a refresh slice layer. By using the calculated addresses, a macro-block is formed. In addition, codes are read out from the non-refresh block memory 82c on the basis of each non-refresh block code length.

The refresh block memory read circuit 82e calculates the address of a refresh block on the basis of a refresh block address and processor ID of a refresh slice layer. There are two methods of arranging a refresh slice, as shown in FIGS. 40 and 41. In either method, the refresh block memory read circuit 82e generates addresses so that an output from the refresh block memory 82b can constitute a macro-block bit stream. That is, the refresh block memory circuit 82e can switch refresh blocks.

When this read operation is to be performed, the refresh block memory read circuit 82e performs processing by using refresh block code length data.

In the fast reproduction mode, the switches 82a and 82d select only the refresh block memory 82b so that only refresh blocks are transmitted from the terminal 83. Note that in the above-described arrangement, data are separately supplied to the four processors through a switch 99.

Figure 53:
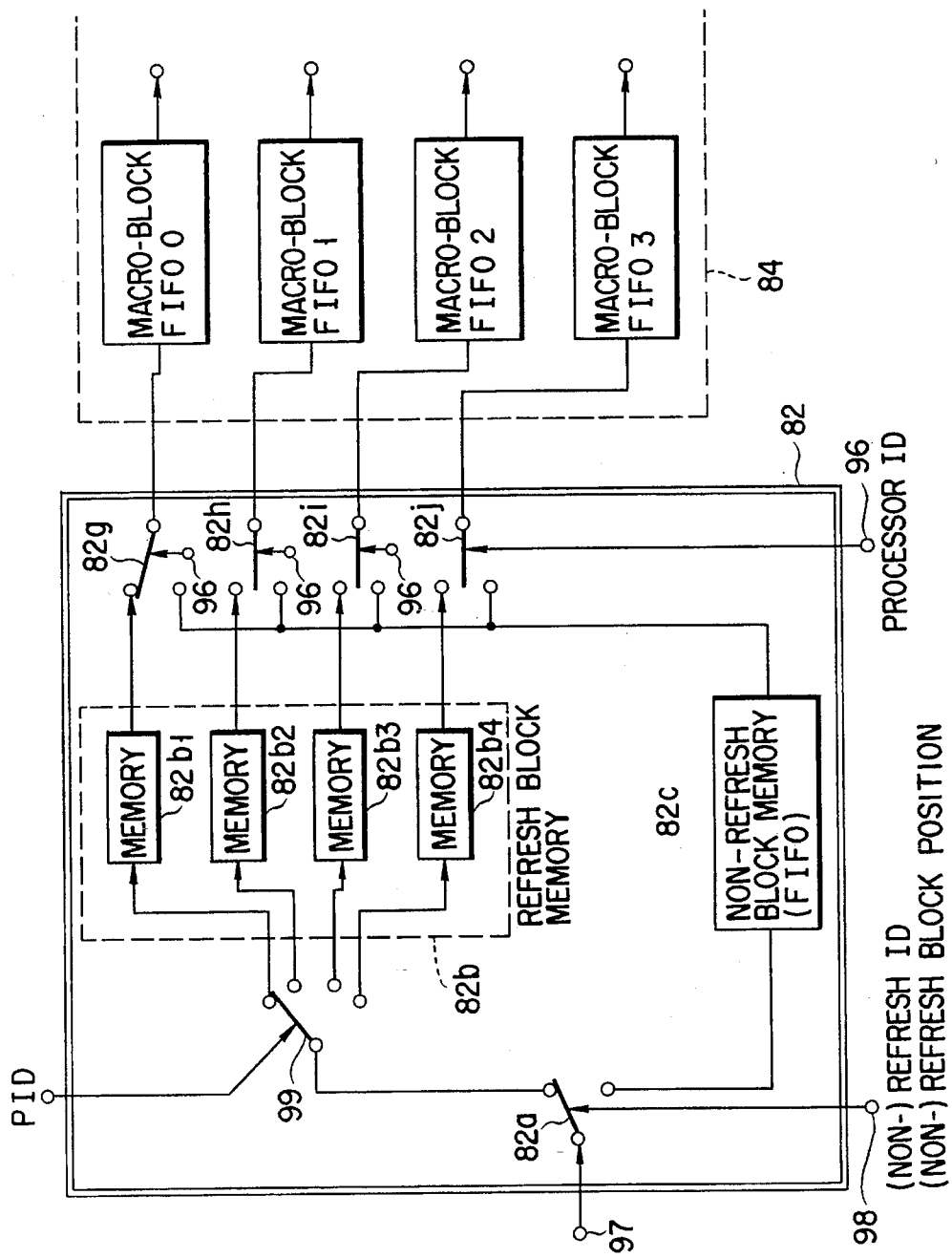
FIG. 53 is a block diagram showing the arrangement of another example of the code re-switching circuit.

FIG. 53 shows another embodiment of the code re-switching circuit 82. This circuit arrangement is suitable for the refresh slice layers shown in FIG. 41.

Referring to FIG. 41, in each refresh slice layer, refresh blocks are consecutively arranged to be adjacent to each other in the vertical direction. For this reason, a refresh block memory 82b in the code re-switching circuit 82 includes refresh block memories 82b1 to 82b4 assigned to the respective processors. Each memory stores a refresh block corresponding to each processor. When a read operation is performed in the normal reproduction mode, the refresh blocks are combined with non-refresh blocks through switches 82g to 82j, thereby constituting a macro-block.

In the fast reproduction mode, the switch 82a selects only refresh blocks and writes them in the refresh block memory 82b. In addition, the switches 82g to 82j read out only data from the refresh block memory 82b.

28. Frame delay circuit

The frame delay circuit 91 includes two memory write address generators 91a and 91b, as shown in FIG. 54. In addition, outputs from the two address generators 91a and 91b are switched by a switch 91c on the basis of a normal/fast reproduction setting signal input from the terminal 71.

In DigiCipher, four processors are used to perform processing, and four macro-blocks are present in the horizontal direction. Therefore, each processor processes one macro-block in the horizontal direction.

That is, in each processor, a macro-block is processed from the top to bottom in units of 11 super blocks.

A circuit for performing processing by using four processors is constituted by the variable length code decoder 84, the inverse quantizer 86, the inverse DCT circuit 85, the adder 87, the motion compensation circuit 92, the intra-frame/inter-frame processing switching circuit 89, the switch 88, and the write address generators 91a and 91b in the frame delay circuit 91.

Distribution of codes to the four processors is performed by using processor ID (PID) data included in macro-block overhead data.

Since the four processors operate in the same manner, an operation of one processor will be described below.

In the normal reproduction mode, the switch 91c selects the normal reproduction write address generator 91a. Since a bit stream in the normal reproduction mode is identical to the macro-block bit stream shown in FIGS. 36 and 39, a first decoding position is determined by using a macro-block address located at the start portion of a macro-picture layer, i.e., a macro-slice layer. Thereafter, addresses for the normal reproduction mode are sequentially generated by using the processor ID data.

Figure 55:
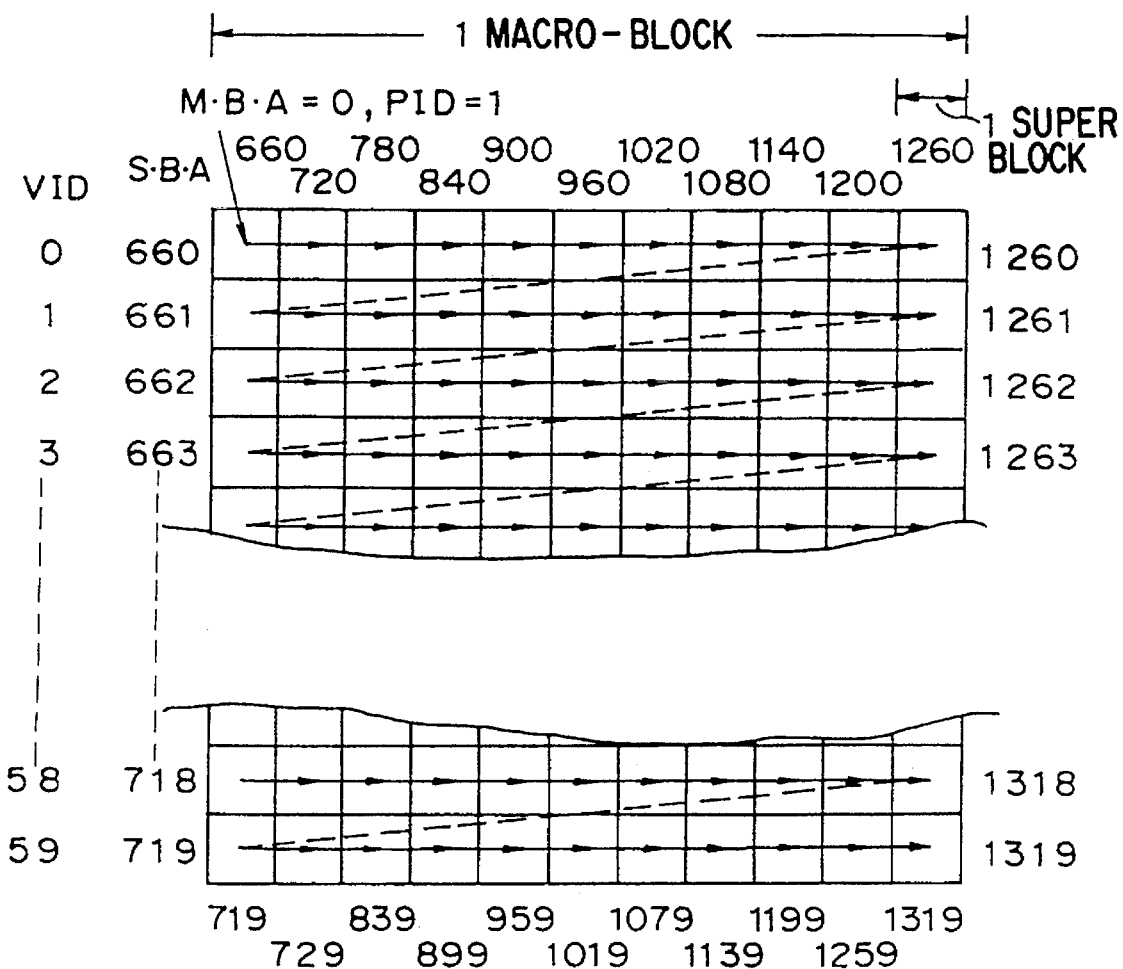
FIG. 55 is a chart for explaining an operation of the frame delay circuit in a normal reproduction operation.

FIG. 55 shows an operation of the normal reproduction write address generator 91a.

A macro-block address at the head portion of a macro-slice layer is detected by the overhead data detector 81. The detected address is then input to the normal reproduction write address generator 91a through the terminal 96.

FIG. 55 shows a case of a processor 1.

First, M.B.A=0 in a bit stream is read out. M.B.A=0 indicates the decoding position of the first super block of the macro-block of a processor 0.

Since the decoding position of the first super block on the macro-block of processor PID is given by the following equation, if processor PID=1, the start super block address of the macro-block is 660:

$$S.B.A. = M.B.A. + 660 \times PID$$
$$= 0 + 660 \times 1$$
$$= 660$$

In a normal reproduction operation, as indicated by the arrows in FIG. 55, one macro-block, i.e., 11 super blocks up to S.B.A=660,720, . . . 1260, is processed in the horizontal direction, and macro-blocks are processed one by one in the vertical direction. That is, after S.B.A=1260, processing is performed according to S.B.A =661, 721, . . . , 1261.

In a fast reproduction operation, fast reproduction mode data is input to the terminal 71, and the switch 91c selects the fast reproduction write address generator 91b. The fast reproduction write address generator 91b is used for fast reproduction in the package medium such as a VCR. In the fast reproduction mode, since only intra-frame-processed blocks are effective, only refresh block data are written.

Furthermore, in the fast reproduction mode, the code re-switching circuit 82 outputs only refresh blocks from the terminal 83. The variable length code decoder 84, the inverse quantizer 86, and the inverse DCT circuit 85 process only these refresh blocks, and supply only the refresh blocks to the frame memories 91d to 91f through a terminal 100.

In DigiCipher, only the data of one refresh block in one macro-block is written. More specifically, since refresh blocks are adjacent to each other in the vertical direction, the fast reproduction address generator 91b generates only super block addresses in the vertical direction in the fast reproduction mode. Note that non-refresh blocks are not processed. In DigiCipher, since a refresh slice constituted by refresh blocks is processed by four processors, the number of refresh blocks per processor is one in the horizontal direction.

For this reason, the fast reproduction write address generator 91b operates in the same manner with respect to either one of the bit streams of the refresh slice layers numbers 1 and 2 shown in FIGS. 40 and 41.

In the fast reproduction mode, only the bit stream of the refresh slice layer shown in FIGS. 40 and 41 is used. Since a refresh block address (R.B.A) indicating the first decoding position of the refresh slice is set in the start portion of the bit stream of the refresh slice layer, the initial position of fast reproduction signal processing in each processor is obtained by using this R.B.A and processor ID (PID).

Figure 56:
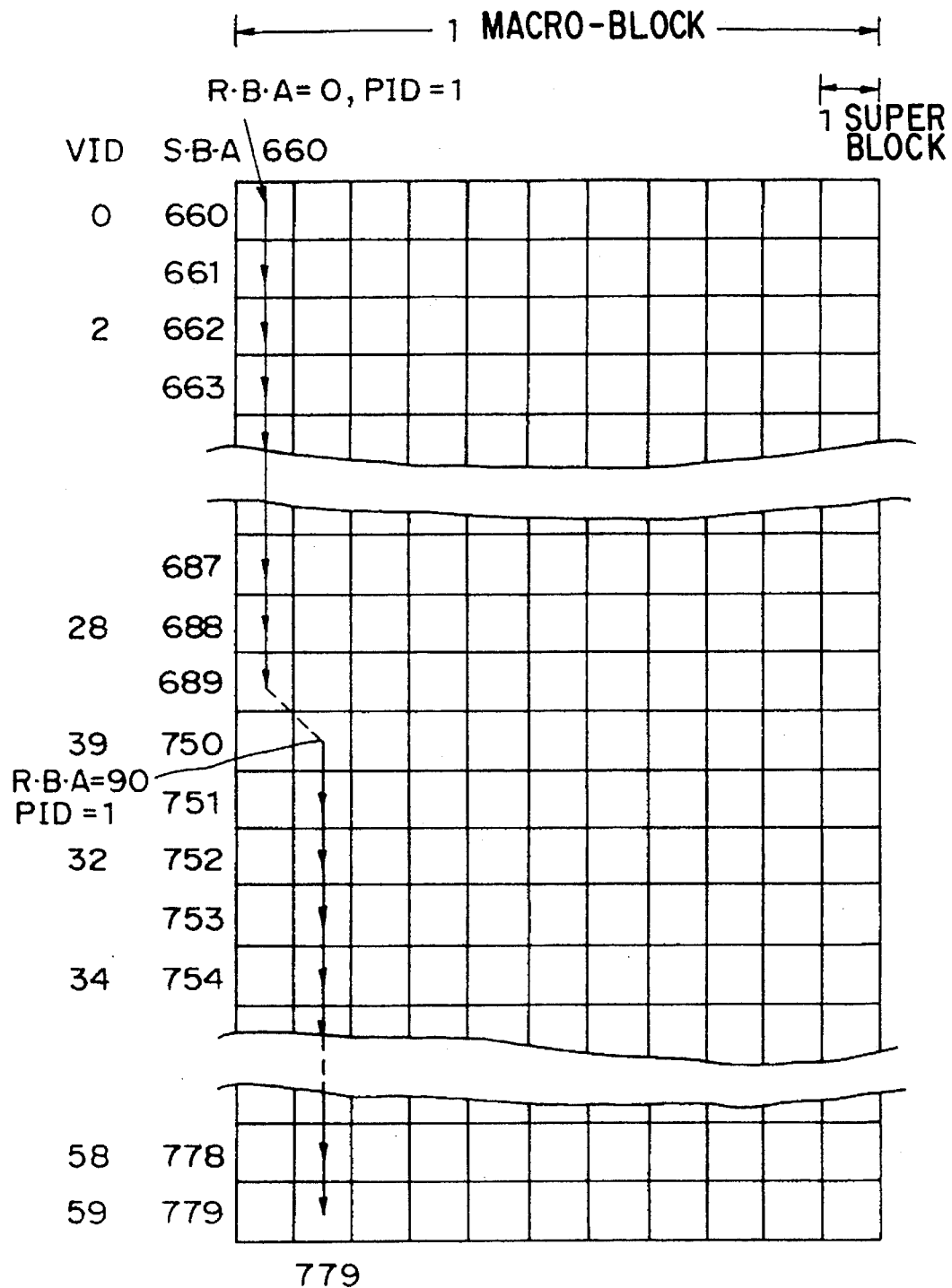
FIG. 56 is a chart for explaining an operation of the frame delay circuit in a fast reproduction operation.

The case shown in FIG. 56 will be described below.

Refresh block address R.B.A of overhead data is input to the fast reproduction write address generator 91b through the terminal 96. Consider that the following correspondence is set between the refresh slices shown in FIG. 40 and the refresh blocks $G_n$ of the track pattern shown in FIG. 23, and that the trace $x_0$ for double-speed reproduction is made:

refresh slice 0 : $G_n(0)$ refresh slice 1 : $G_n(1)$

In this case, as refresh block addresses, R.B.A=0 in the refresh slice 0, and R.B.A=90 in the refresh slice 1 are reproduced. R.B.A=0 and R.B.A=90 respectively indicate the decoding positions of the first refresh blocks in the processor 0.

The decoding positions of the first super blocks of the refresh blocks of processor PID are given by the following equations. If processor PID=1, the start super block address of the refresh blocks is S.B.A=660 in the refresh slice 0, and S.B.A=750 in the refresh slice 1.

$$S.B.A_0 = R.B.A. + 660 \times PID$$
$$= 0 + 660 \times 1$$
$$= 660$$
$$S.B.A_1 = R.B.A. + 660 \times PID$$
$$= 90 + 660 \times 1$$
$$= 750$$

Furthermore, in DigiCipher, since refresh blocks are always arranged in the vertical processor for each processor, the fast reproduction address generator 91b generates super block addresses in the vertical direction. That is, super block addresses are generated in the following order:

$S.B.A_0$ : 660, 661,..., 687, 688, 689

$S.B.A_1$ : 750, 751,..., 777, 778, 779

A read address generator 91g reads the luminance signal Y and the color difference signals U and V in accordance with the scan line order of a TV.

The frame delay circuit 91 and the memory write/read address generators 91a, 91b, and 91g also serve as the deblocking circuit 90.

29. Track reproduction controller

Since a refresh slice is recorded at a predetermined position on a track with the predetermined position being considered as the center in the recording mode, tape feed processing and the rotational phase of the drum are controlled to reproduce data at the predetermined position in the fast reproduction mode. There are various methods of performing such control:

1. A position where the head is to trace in the fast reproduction mode is recorded on a linear track.
2. A signal identifying a track is recorded on a helical track. As this identification signal, a pilot signal or the like may be used.
3. A track number and a unit number are recorded on a helical track, and servo control is performed such that the envelope is maximized at the unit number at which data is to be read in the fast reproduction mode.

The third method will be described in detail below.

First, a unit number and a track number are read as additional information arranged after the unit sync in the VCR transmission data shown in FIG. 44. The data are read out from a terminal 101 in FIG. 50. In the refresh slice position designation ROM 70c in FIG. 48, a refresh slice is recorded at a predetermined position on a track with the predetermined position considered as the center. This predetermined position is determined by a track number and a unit number. In the fast reproduction mode, an RF signal reproduced from the head is input to an envelope detector 103 through a terminal 102.

The envelope detector 103 detects an envelope shape as in FIG. 49(b) in the fast reproduction mode. The track reproduction controller 74 controls the rotational phase of the drum and tape feed processing such that the envelope defined by the track number and the unit number, at which the central position of the abovementioned refresh slice is located, is maximized.

30. Another example of macro-block bit stream structure

The macro-block bit stream structure, as shown in FIG. 36 described in Part 17.1 allows the VCR to have a simple format converter.

According to the bit stream structure shown in FIG. 36, the format converter of the VCR requires no variable length code decoder. In addition, since detection of only macro-block overhead data is required, the overhead data detector can be simplified.

Since a broadcast wave bit stream can be formed by setting only necessary data in a broadcast wave, various types of bit streams may be considered. In this case, the format converter of the VCR only needs to have circuits required to form a bit stream (FIGS. 37 and 38 and FIGS. 40 to 43) necessary for the VCR.

Figure 57:
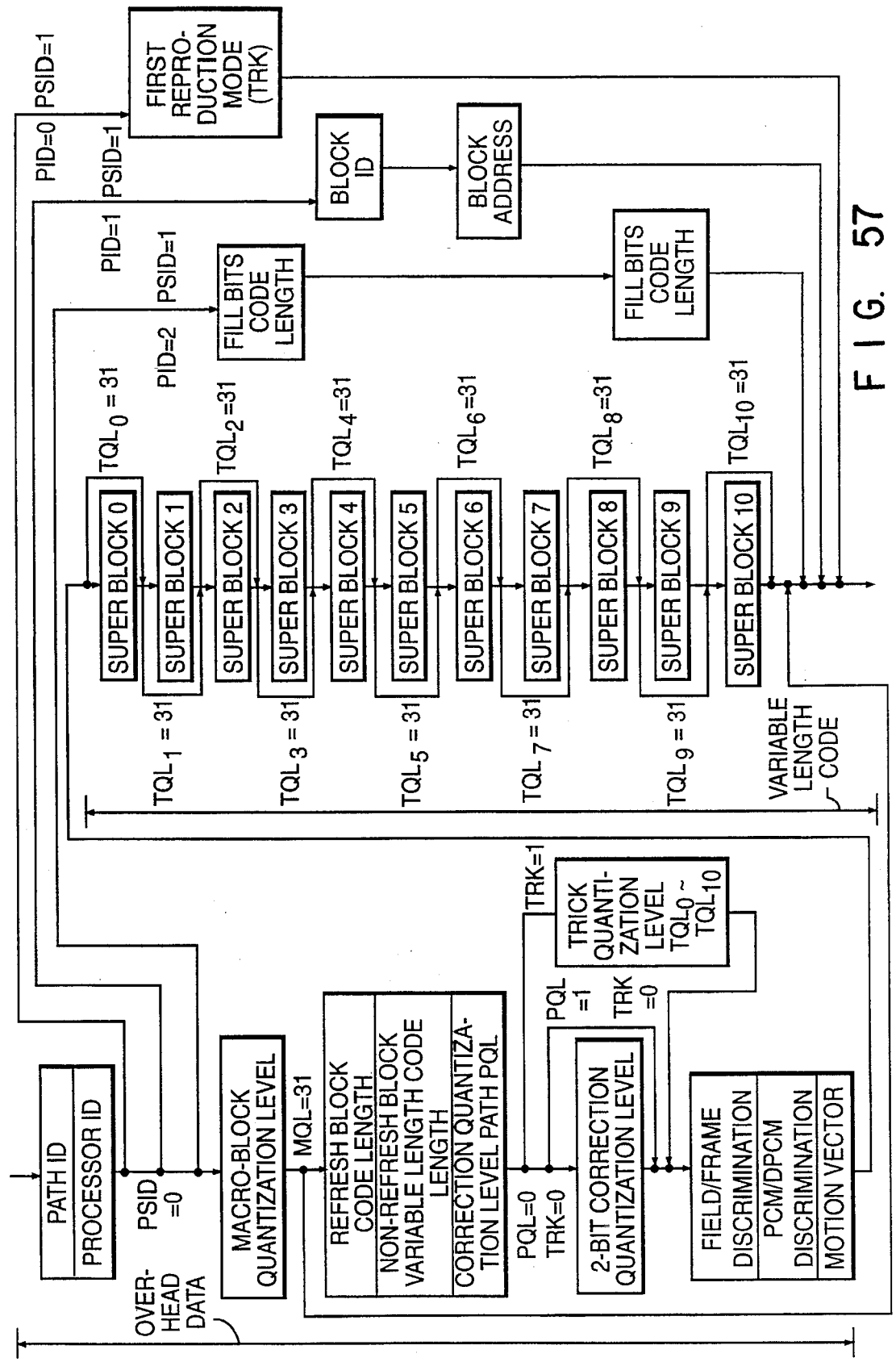
FIG. 57 is a block diagram showing another example of the macro-block bit stream structure.

FIG. 57 shows another example of the macro-block bit stream. According to this bit stream structure, all the overhead data must be detected. In the recording mode, since a refresh block code length is set in this bit stream structure, variable length codes need not be decoded.

The bit stream in FIG. 57 will be described first with reference to items conventionally employed. The description is based on the following two literatures:

(a) "Digicipher Description", Aug. 22, 1991

(b) "Channel compatible Digicipher HDTV System", Apr. 3, 1992

Each item of the bit stream will be described in detail below.

Referring to FIG. 57, the bit stream structure in a macro-block is constituted by overhead data and variable length codes.

Processor ID: Since four processors are used in Digicipher, each processor number is expressed by 2 bits (b).

Macro-block quantization level (MQL):

A quantization level QL is represented by 5 bits. As the value is increased, coarser quantization is performed. Macro-block quantization level MQL=31 indicates a state wherein no codes are generated. When QML=31, as shown in FIG. 57, the flow of control skips over "overhead data" and "variable length code" after QML and advances to the next macro-block.

2-bit correction quantization level: A correction quantization level is set in the direction in which coarser quantization is performed as compared with the macro-block quantization level MQL (a). In addition, this correction quantization level is constituted by 2 bits per super block (b). Furthermore, this level is set for 11 super blocks (a).

Correction quantization level path PQL: If the quantization level for all super blocks is the same as that of a macro-block, all the 2-bit correction quantization levels are set to be "0". In this case, no 2-bit correction quantization level is set. That is, when PQL=1, a path to 2-bit correction quantization level data is not taken, but when PQL=0, the path indicating 2-bit correction quantization level data is taken (b).

Field/frame discrimination: Field/frame discrimination data is set to designate whether a DCT pixel arrangement of 8×8 pixels uses field pixels or frame pixels, which data is set in units of super blocks (a).

PCM/DPCM discrimination: PCM/DPCM discrimination data is used to discriminate whether each super block is intra-frame-processed (PCM) or inter-frame-processed (DPCM) (a).

Motion vector: Motion vector data indicates the motion vector of each super block (a).

A new bit stream structure will be described next.

Path ID (PSID) : When PSID=0, a path in which macro-block quantization level data is present is taken. When PSID=1, the path in which macro-block quantization level data is present is not taken, but one of the following paths designated by processor ID (PID) is taken.

If PID=0, a path in which the fast reproduction mode (TRK) is present is taken.

If PID=1, a path in which block ID and block address data are present is taken.

If PID=2, a path in which fill bits code length data and fill bits codes are present is taken.

Trick quantization level TQL: When the VCR operates in the fast reproduction mode, only refresh blocks can be used. In addition, a plurality of refresh blocks may be present in one macro-block. If a plurality of refresh blocks are present, the following two requirements must be satisfied.

First, if a plurality of refresh blocks of different frames are present in one macro-block, 5-bit quantization levels are required for the respective refresh blocks.

Second, the position of each refresh block in the macro-block must be designated.

In order to designate this position, a skip operation must be performed in units of super blocks. For this reason, in the fast reproduction mode of the VCR, a path in which the trick quantization level TQL is present is taken.

The trick quantization level TQL has a 5-bit absolute quantization level in units of super blocks. That is, 55-bit quantization level data is set for 11 super blocks.

If TQL=31 is set, a skip operation of variable length codes can be performed in units of super blocks.

With this operation, refresh block variable length codes can be arranged at arbitrary positions in a macro-block.

As shown in FIG. 57, the trick quantization levels TQL and the variable length codes of the respective super blocks have the following correspondence:

$TQL_0$ corresponds to super block 0.

$TQL_1$ corresponds to super block 1.

.

.

.

In the fast reproduction mode, of super blocks 0 to 10, refresh block variable length codes are arranged only at the super block position where refresh blocks are arranged. At the remaining super block positions, trick block quantization level TQL=31 is set to perform a skip operation in units of super blocks.

In the recording and normal reproduction modes, with regard to the variable length codes of the bit stream of a broadcast wave, super block 0 corresponds to refresh block 0, and super blocks 1 to 10 correspond to non-refresh blocks 1 to 10.

Fast reproduction mode (TRK): When the bit stream of a broadcast wave is to be transmitted, or a bit stream in the normal reproduction mode is to be transmitted, TRK=0 is set, and a path in which 2-bit correction quantization level (PQL=0) data or 2-bit unused correction quantization level (PQL=1) data is present is taken.

In the fast reproduction mode of the VCR, TRK=1 is set, and a path in which the above-described trick quantization level data is present is taken.

Block ID: Block ID is ID data discriminating a macro-block and a (non-) refresh block.

Block address: A block address is an address indicating the absolute position of a macro-block or a (non-) refresh block on a frame.

Fill Bits code: When the generation amount of variable length codes is small, a predetermined amount of codes are forcibly inserted. The forcibly inserted codes are called fill bits. Especially in the fast reproduction mode of the VCR, since only refresh blocks are used, but non-refresh blocks are not used, it is highly possible that the generation amount is reduced. Since the transmission amount of codes is fixed, fill bits must be forcibly inserted.

Fill bits code amount: If the code length of the above-mentioned fill bits is set before the fill bits, the end point of the fill bits can be clearly detected. With this operation, a clear boundary can be set between macro-blocks.

By using the above-described bit stream as the bit stream of a broadcast wave, a signal which has undergone special reproduction processing of the VCR can be received by the decoder which receives the broadcast wave.

By using the above-described bit stream, the format converter of the VCR can realize special reproduction by simply detecting the overhead data of each macro-block and switching refresh block codes.

31. Another example (2) of macro-block stream structure

A case where the refresh block code length data and the non-refresh block code length data in FIG. 57 are combined, and only macro-block code length data is set will be described below.

Figure 58:
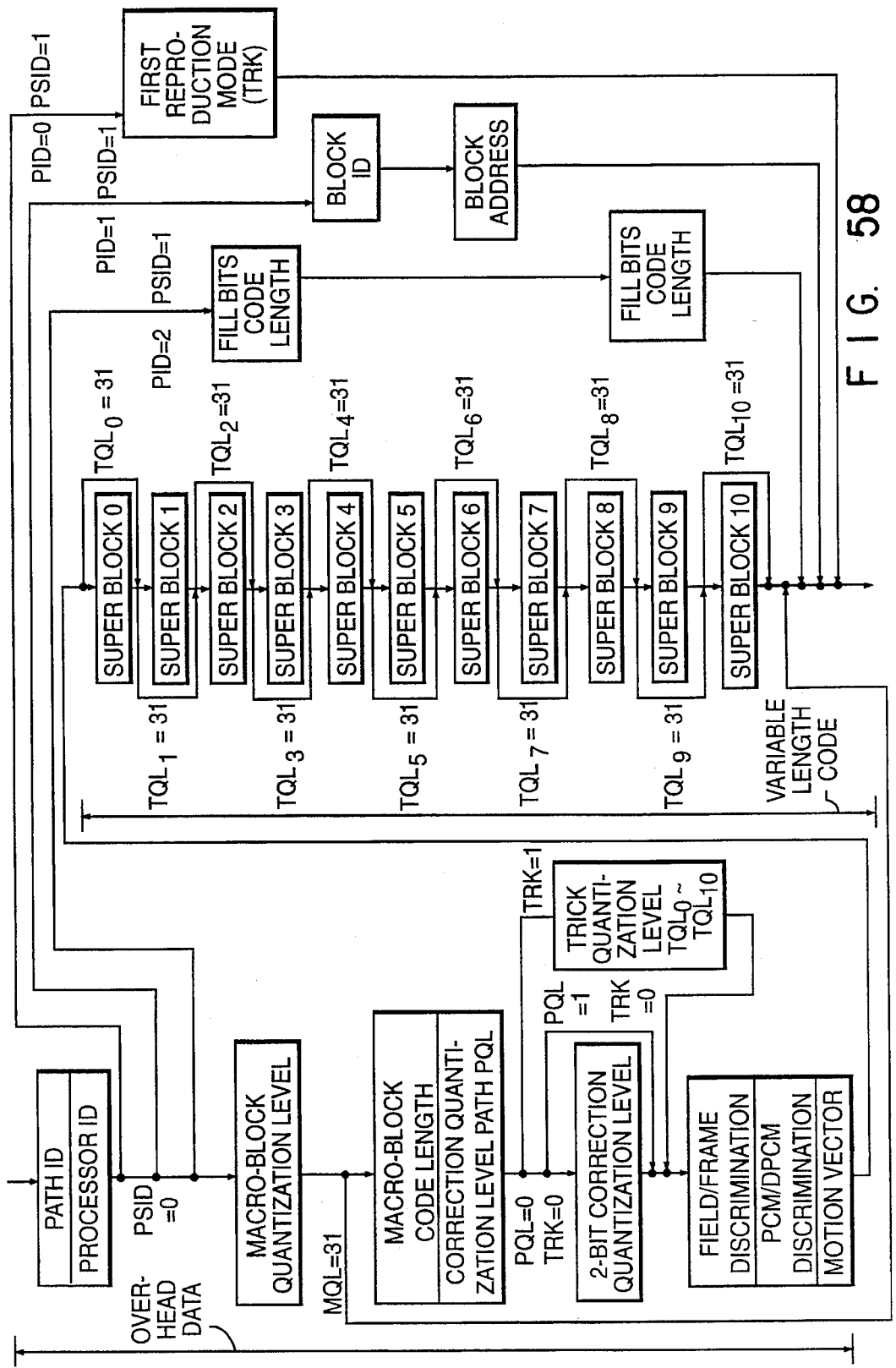
FIG. 58 is a block diagram showing still another example of the macro-block bit stream structure.

FIG. 58 snows the resultant bit stream. In this case, a variable length code decoder is used to perform separation of refresh blocks in the recording mode. This circuit is identical to the variable length decoder 84 in FIG. 50.

Separation of refresh blocks can be performed by performing variable length decoding. Upon this separation, the refresh blocks are recorded at predetermined positions on a tape.

In addition, a method of forming bit streams in the normal reproduction mode and the fast reproduction mode is the same as that described in Part 30.

The present invention is not limited the abovedescribed embodiments. Various changes and modifications can be made within the spirit and scope of the invention.

We claim:

1. A band compressing signal processor, comprising:

means for forming a (where a is a positive integer) picture areas for a frame;

means for generating a refresh signal by intra-frame-coding a video signal at a period of f frames (where f is an integer$\geq 2$) using an inter-frame-coded signal and an intra-frame-coded signal, said video signal being formed of a set of successive pictures, said inter-frame-coded signal being formed by inter-frame-coding the video signal using a difference between a video signal of a present picture and that of a predicted picture, said intra-frame-coded signal being formed by intra-frame-coding the video signal using intra-frame information;

means for outputting and transmitting said refresh signal, said inter-frame-coded signal, and said intra-frame-coded signal of a picture areas, from a band compression encoder at a predetermined transmission sequence during normal transmission;

means for, after transmission, inputting the output refresh signal, inter-frame-coded signal, and intra-frame-coded signal to a band compression decoder;

means for obtaining a decoded picture;

means for, while recording the decoded signal on the recording means, adding an address signal to the refresh signal of each of c areas (where c is an integer, $a \geq c \geq 0$), said address signal indicating a position of each of said c areas on a frame, said c areas being set for every frame;

means for designating a special reproducing mode using a flag during a high-speed reproducing process, while allowing the refresh signal, inter-frame-coded signal and intra-frame-coded signal of a picture areas, to be transmitted irrespectively of the predetermined transmission sequence; and means for inputting said address signal indicating the position on the frame along with said refresh signal to said band compression decoder, said band compression decoder displaying the refresh signal in accordance with said address signal in a predetermined sequence;

where said flag is maintained by said signal processor for indicating the special reproducing mode which includes a high-speed reproducing mode and a high-speed inverse reproducing mode, while recording and reproducing the decoded signal on a recording medium and transmitting the decoded signal.

2. A band compression signal processor according to claim 1, further comprising:

means for, while recording the decoded signals on the recording medium, adding an address signal to the refresh signal of each of c picture areas (where c is an integer, $a \geq c \geq 0$) and an overhead data to the refresh signal, inter-frame-coded signal and intra-frame-coded signal of each of said c picture areas on a frame, said overhead data only relating to said c picture areas;

means for recording the address signal and the overhead data.

3. A band compression signal processor according to claim 1, further comprising:

means for generating b refresh signals by intra-frame-coding the video signal of b pictures areas (where b is an integer, $a \geq b \geq 0$) out of said a picture areas for a frame at a period of f frames (where f is an integer$\geq 2$), said b picture areas being set for every frame; and means for adding and recording an address signal indicating a position of said b refresh signals, which is set for every frame, on the frame.

4. A band compression signal processor according to claim 3, wherein:

said signal processor connects and records at least two out of b refresh signals irrespectively of said transmission sequence, while recording the decoded picture.

\* \* \* \* \*

UNITED STATES PATENT AND TRADEMARK OFFICE
CERTIFICATE OF CORRECTION

PATENT NO.   : 5,537,215
DATED        : July 16, 1996
INVENTOR(S)  : Kazuharu Niimura et al.

It is certified that error appears in the above-identified patent and that said Letters Patent is hereby corrected as shown below:

Column 48,
Line 5, change "the decoded" to -- an ecoded --.
Lines 28, 29 and 32, change "decoded" to -- encoded --.
Line 57, change "decoded picture" to -- encoded signal --.

Signed and Sealed this

Thirtieth Day of September, 2003

JAMES E. ROGAN
*Director of the United States Patent and Trademark Office*